US006629547B1

(12) United States Patent
Yamaguchi et al.

(10) Patent No.: US 6,629,547 B1
(45) Date of Patent: Oct. 7, 2003

(54) COMPOSITE HIGH-PRESSURE PIPE AND METHOD OF JOINING SAME

(75) Inventors: Koji Yamaguchi, Kyoto (JP); Mitsuhide Nogami, Kyoto (JP); Yasuo Yamabe, Shiga (JP); Masanori Nakamura, Kyoto (JP); Katsuo Matsuzaka, Kyoto (JP); Takehiro Yamada, Kyoto (JP); Satoshi Koma, Shiga (JP); Kenji Mizukawa, Shiga (JP); Hideki Sakakihara, Shiga (JP); Toshihide Nonaka, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/821,466

(22) PCT Filed: Sep. 24, 1999

(86) PCT No.: PCT/JP99/05242

§ 371 (c)(1),
(2), (4) Date: Apr. 9, 2001

(87) PCT Pub. No.: WO00/22334

PCT Pub. Date: Apr. 20, 2000

(30) Foreign Application Priority Data

Oct. 9, 1998 (JP) ........................................... 10-288124
Apr. 1, 1999 (JP) ........................................... 11-095451

(51) Int. Cl.$^7$ ............................................... F16L 11/00
(52) U.S. Cl. ......................... 138/129; 138/172; 138/144; 138/125
(58) Field of Search ................................. 138/129, 126, 138/130, 144, 172, 140, 125

(56) References Cited

U.S. PATENT DOCUMENTS 4,243,712 A * 1/1981 Hoheisel et al. ........... 428/35.1
4,410,011 A * 10/1983 Andra et al. .............. 138/118.1
4,764,406 A * 8/1988 Hisazumi et al. ........... 426/105
4,851,245 A * 7/1989 Hisazumi et al. ........... 426/105
4,944,987 A * 7/1990 Cordia et al. .............. 428/192
5,236,765 A * 8/1993 Cordia et al. .............. 428/192

FOREIGN PATENT DOCUMENTS

| JP | 57-208216 A | * | 12/1982 |
| JP | 2-141447 A | * | 5/1990 |
| JP | 3-243333 A | * | 10/1991 |
| JP | 3-244527 A | * | 10/1991 |
| JP | 4-4132 A | * | 1/1992 |
| JP | 4-69227 A | * | 3/1992 |
| JP | 4-160284 A | * | 6/1992 |
| JP | 5-84847 A | * | 4/1993 |
| JP | 6-331066 A | * | 11/1994 |
| JP | 10-146892 A | * | 6/1998 |
| JP | 11-90885 A | * | 4/1999 |
| JP | 11-101383 A | * | 4/1999 |

* cited by examiner

Primary Examiner—Patrick Brinson
(74) Attorney, Agent, or Firm—Armstrong, Westerman & Hattori, LLP

(57) ABSTRACT

As the first object, the present invention intends to provide high-pressure composite pipes which show remarkable pressure resistance and optimum applicability in various uses and which can be economically manufactured in a light weight. To achieve this object, a high-pressure composite pipe of the present invention comprises a pipe-shaped inner layer made of a synthetic resin, a reinforcing layer made of a stretched polyolefin resin sheet and wound on an external circumferential surface of the inner layer, and an outer layer made of a synthetic resin and disposed on an external circumferential surface of the reinforcing layer. The winding direction of the reinforcing layer is oriented at a predetermined angle relative to the axis of the pipe. Between the inner layer and the reinforcing layer and between the outer layer and the reinforcing layer, adhesion layers having affinity to these layers are interposed.

19 Claims, 29 Drawing Sheets

(a)

(b)

(c)

(d)

(a)

(b)

(c)

(a)

(b)

(a)

(b)

(c)

(d)

(e)

COMPOSITE HIGH-PRESSURE PIPE AND METHOD OF JOINING SAME

TECHNICAL FIELD

The present invention relates to high-pressure composite pipes to be used as high-pressure-resistant pipes or hoses which require a high internal pressure resistance strength.

The present invention also relates to a method for joining a pair of high-pressure composite pipes.

BACKGROUND ART

With regard to pipes for transporting a medium like water and gas, steel pipes are conventionally employed as such. While steel pipes exhibit a high internal pressure resistance strength and an excellent creep resistance, they are poorly quakeproof and develop rust and corrosion. In these days, therefore, synthetic resin pipes such as unplasticized polyvinyl chloride (PVC) pipes and polyethylene pipes are frequently employed.

A method for producing synthetic resin pipes is disclosed, for example, in Japanese Patent Application Laid-open No. H10-225988. A hollow article made of a crystalline thermoplastic resin is drawn by a clamp, from between a die and a former whose circumferential side surface is formed with a plurality of ridges having a section with a curvature radius of 0.5 mm or greater. Thereby, the pipe is formed as stretched in the axial and circumferential directions.

Synthetic resin pipes are exceptionally remarkable in terms of quakeproof property and impact resistance. On the other hand, they show a limited internal pressure resistance strength and a poor creep resistance. When a pipe element like a pipe or a hose is employed to transport various substances including liquid, gas, etc. in a flowing manner, the pipe element requires sufficient pressure resistance so as not to break under the pressure by an internal flow of substances. In particular, high internal pressure resistance is necessary for hydraulic oil piping, drain pipes and the like for carrying high-pressure fluids. From this point of view, Japanese Patent Application Laid-open No. H8-11250, for example, discloses a composite pipe which comprises a tubular inner layer and a tubular outer layer each made of a synthetic resin or other flexible materials, and which further includes a fiber reinforcing layer and a wire reinforcing layer interposed therebetween.

In this composite pipe, although the fiber reinforcing layer and the wire reinforcing layer improve the pressure resistance, they also cause following problems.

First of all, the resin reinforcing layer is prepared by braiding fibers of suitable thickness or by winding such fibers in spiral form. This process increases the thickness of the resin reinforcing layer by itself. Besides, in the resin reinforcing layer comprising fiber bundles, the strength in the circumferential direction which corresponds to the longitudinal direction of each fiber can be much greater than the strength in the axial direction. Further, because the wire reinforcing layer is laminated on the resin reinforcing layer, this structure increases the overall wall thickness and total weight, and thereby sacrifices the handlability and economical efficiency.

Secondly, when used to transport substances in a flowing manner, such composite pipes may fail to provide stable long-term service, depending on the physical properties and state of the substances to be transported. By way of example, when used as a hot-water pipe, a steampipe or like pipe for ships, or a chemical transport pipe or like pipe at chemical works, etc., an inner layer made of an ordinary synthetic resin may melt because of hot water, drug solution, etc., or deteriorate through chemical reactions. Furthermore, when used for transporting sand, ore and the like, an inner layer made of an ordinary synthetic resin may wear out and break only after a short service.

In addition, current demands include recycling of raw materials and associated economic effects. However, due to the complexity in separating the resin reinforcing layer and the wire reinforcing layer, recycling is a problematic task.

For the purpose of solving the above problems found in conventional technologies, the first object of the present invention is to provide high-pressure composite pipes which show an excellent pressure resistance and optimum applicability to various use, and also to provide lightweight high-pressure composite pipes which can be produced economically.

In another aspect, according to the conventional technologies for joining high-pressure composite pipes, they cannot be joined to each other directly, if the materials for the inner layer and the outer layer are different from those for the resin reinforcing layer and the wire reinforcing layer. Hence, such pipes have been joined by way of a pipe joint or the like. This technique has presented additional problems in terms of the strength, sealing property, etc. at the connection of the pipe joint and the high-pressure composite pipes. In summary, even if a high-pressure composite pipe has an excellent pressure resistance, any trouble in pipe arrangement can cause leakage or rupture at the connection of the high-pressure composite pipes.

For the pipe arrangement which includes a butt-fused connection area between the high-pressure composite pipes, attempts have been made to prevent damage at the butt-fused area under a load of internal pressure. For example, Japanese Patent Application Laid-open No. H11-101383 describes a method for bonding the exterior of the butt-fused area with a reactive resin. According to this method, after the butt fusion, a mold is mounted on the fused area, and a reactive resin is poured into the gap between the pipe and the mold. The resin is allowed to solidify for reinforcement.

However, as far as the reactive resin bonds the outer layers only, the outer layers can peel from the reinforcing layers. In this case, reinforcement is ineffective at the joint area of butt-fused high-pressure composite pipes. Besides, this method is troublesome from the viewpoint of construction, not only because the reactive resin should be handled with care but also because the mold should be removed after the resin has solidified. Further, since the solidified reactive resin is hard but brittle, it cracks easily when the high-pressure composite pipes are flattened.

With an intention of solving these problems, the second object of the present invention is to provide a method for joining high-pressure composite pipes, which method is capable of firmly joining high-pressure composite pipes having an excellent pressure resistance by a simple operation, firmly joining the high-pressure composite pipes by reinforcing the joint strength at the butt-fused area, and making a joint area adjustable to strain of the high-pressure composite pipes.

DISCLOSURE OF THE INVENTION

In order to achieve the first object mentioned above, the present invention includes the following arrangements.

A high-pressure composite pipe according to a first aspect of the present invention (hereinafter mentioned as a high-pressure composite pipe of Invention 1) comprises a pipe-shaped inner layer made of a synthetic resin, and a reinforcing layer which is made of a crosslinked stretched polyolefin resin sheet longitudinally stretched at a ratio of 10 or higher and which is wound on an external circumferential surface of the inner layer, with a winding direction of the reinforcing layer being oriented at a predetermined angle relative to an axis of the pipe.

The present invention utilizes a crosslinked stretched polyolefin resin sheet. With regard to the stretched polyolefin resin sheet used as a reinforcing sheet for a pipe, when the pipe is subjected to a circumferential stress generated by an internal pressure, the stretched polyolefin resin sheet, whose strength and elastic modulus are greater than those of the other layers (inner layer and outer layer), needs to bear a greater share of the stress. For this reason, excellent creep property is an essential requirement. In order to enhance the creep property, a measure is taken to crosslink the stretched polyolefin resin sheet. A stretched polyolefin resin sheet is obtained by stretching a polyolefin resin, and shows a higher strength than a non-stretched polyolefin resin. However, this does not mean stretching improves the creep property. In fact, creep property is dependent on the molecular structure of a polyolefin resin to be used and not very much affected by stretching. Accordingly, when a stretched polyolefin resin sheet that has undergone stretching is crosslinked, the resulting stretched polyolefin resin sheet exhibits high strength and remarkable creep property.

The arrangement of Invention 1 provides a high-pressure composite pipe, in which the inner layer receives substantially uniform reinforcement by the reinforcing layer.

A high-pressure composite pipe according to a second aspect (hereinafter mentioned as a high-pressure composite pipe of Invention 2) comprises a pipe-shaped inner layer made of a synthetic resin, a reinforcing layer which is made of a crosslinked stretched polyolefin resin sheet longitudinally stretched at a ratio of 10 or higher and which is wound on an external circumferential surface of the inner layer, and an outer layer made of a synthetic resin and laminated on the reinforcing layer, with a winding direction of the reinforcing layer being oriented at a predetermined angle in a longitudinal direction of the pipe. The arrangement of Invention 2 provides an outer layer, with an intention of protecting the inner layer and the reinforcing layer mentioned in Invention 1 from an external force. The synthetic resin for the outer layer may be the same as, or different from, the one for the inner layer. Besides, the synthetic resins for the inner and outer layers may be, or may not be, fixed on the reinforcing layer by certain adhesion means. It is desirable, however, that the synthetic resins employed for the inner layer and the outer layer have adhesive properties to the reinforcing layer, in order to achieve a high internal pressure strength with a minimum strain of the high-pressure composite pipe when the high-pressure composite pipe is loaded with an internal pressure or external force.

The arrangement of Invention 2 provides a high-pressure composite pipe, in which the inner layer receives substantially uniform reinforcement by the reinforcing layer.

A high-pressure composite pipe according to a third aspect (hereinafter mentioned as a high-pressure composite pipe of Invention 3) comprises a pipe-shaped inner layer made of a synthetic resin, a reinforcing layer which is made of a crosslinked stretched polyolefin resin sheet longitudinally stretched at a ratio of 10 or higher and which is wound on an external circumferential surface of the inner layer, and an adhesion layer having affinity to the inner layer and the reinforcing layer and disposed between the inner layer and the reinforcing layer, with a winding direction of the reinforcing layer being oriented at a predetermined angle in a longitudinal direction of the pipe.

The arrangement of Invention 3 provides a high-pressure composite pipe, in which the inner layer receives substantially uniform reinforcement by the reinforcing layer. In addition, since the inner layer is fixed with the reinforcing layer by the adhesion layer, the reinforcing layer with a high elastic modulus suppresses strain of the inner layer when an internal pressure is imposed. Eventually, a high internal pressure strength is achieved.

A high-pressure composite pipe according to a fourth aspect (hereinafter mentioned as a high-pressure composite pipe of Invention 4) comprises a pipe-shaped inner layer made of a synthetic resin, a reinforcing layer which is made of a crosslinked stretched polyolefin resin sheet longitudinally stretched at a ratio of 10 or higher and which is wound on an external circumferential surface of the inner layer, an outer layer made of a synthetic resin and laminated on the reinforcing layer, an inner adhesion layer having affinity to the inner layer and the reinforcing layer and disposed between the inner layer and the reinforcing layer, and an outer adhesion layer having affinity to the outer layer and the reinforcing layer and disposed between the outer layer and the reinforcing layer, with a winding direction of the reinforcing layer being oriented at a predetermined angle in a longitudinal direction of the pipe.

The arrangement of Invention 4 provides a high-pressure composite pipe, in which the inner layer receives substantially uniform reinforcement by the reinforcing layer. In addition, since the inner layer and the outer layer are fixed with the reinforcing layer via the adhesion layers, the reinforcing layer with a high elastic modulus suppresses strain of the inner layer and the outer layer when an internal pressure is imposed. Thus, a high internal pressure strength can be achieved.

A high-pressure composite pipe according to a fifth aspect (hereinafter mentioned as a high-pressure composite pipe of Invention 5) comprises a pipe-shaped inner layer made of a synthetic resin, a first reinforcing layer which is made of a crosslinked stretched polyolefin resin sheet longitudinally stretched at a ratio of 10 or higher and which is wound in a circumferential direction, and a second reinforcing layer made of a crosslinked stretched polyolefin resin sheet and laminated along an axis of the pipe, with a winding direction of the first reinforcing layer being oriented at a predetermined angle relative to the axis of the pipe. The order of the first and second reinforcing layers is not critical. The arrangement of Invention 5 provides a high-pressure composite pipe, in which the inner layer receives a substantially uniform reinforcement by the first reinforcing layer. Besides, the second reinforcing layer remarkably enhances the rigidity in the axial direction of the high-pressure composite pipe.

A high-pressure composite pipe according to a sixth aspect (hereinafter mentioned as a high-pressure composite pipe of Invention 6) comprises a pipe-shaped inner layer made of a synthetic resin, a reinforcing layer which is made of a crosslinked stretched polyolefin resin sheet longitudinally stretched at a ratio of 10 or higher and which is wound on an external circumferential surface of the inner layer, an outer layer made of a synthetic resin and laminated on the reinforcing layer, and an insulating layer made of a synthetic resin foam and disposed between the inner layer and the reinforcing layer and/or between the outer layer and the reinforcing layer.

The arrangement of Invention 6 provides an insulating effect deriving from the insulating layer made of a foam. The resulting high-pressure composite pipe is suitable for a hot-water pipe and a water supply pipe.

Preferably, the polyolefin resin sheet is crosslinked to show a gel fraction of 20% by weight or higher. Also, it is desirable to crosslink the polyolefin resin sheet by adding a photopolymerization initiator and irradiating an electron ray or an ultraviolet ray.

In the high-pressure composite pipes of Invention 1 to Invention 6, the inner layer is preferably stretched in at least either of the axial direction or the circumferential direction of the pipe. Namely, the inner layer may be stretched only in either of the axial direction or the circumferential direction, or stretched in both of the axial and circumferential directions, which can be properly determined in accordance with the intended applications (hereinafter mentioned as a high-pressure composite pipe of Invention 7).

When the inner layer is stretched in the axial direction, molecules in the synthetic resin for the inner layer are oriented in the stretching direction, improving the strength and the modulus of elasticity in the stretching direction. As a result, the high-pressure composite pipe is relieved from axial deflection due to its own weight. When the inner layer is stretched in the circumferential direction, its tensile strength (i.e. strength against internal pipe pressure) is improved in the circumferential direction. The resulting high-pressure composite pipe manifests a high internal pressure resistance strength. Preferable stretching ratios for the inner layer are not lower than 1.1 in the axial direction and not lower than 1.3 in the circumferential direction. An axial stretching ratio of lower than 1.1 is ineffective, because the modulus of elasticity hardly improves in the axial direction. Also, a circumferential stretching ratio of lower than 1.3 fails to give any effect, in which case the improvement of the high internal pressure resistance strength is limited while the strength increases in the circumferential direction.

When the present invention refers to the stretching ratio of the inner layer, it should be understood that the stretching ratio in the circumferential direction means the ratio of outer diameters before and after stretching (OD after stretching/ OD before stretching), and that the stretching ratio in the axial direction indicates the ratio of lengths before and after stretching.

Desirably, the inner layer, or each of the inner and outer layers, comprises a polyolefin resin (hereinafter mentioned as a high-pressure composite pipe of Invention 8). In this arrangement, the inner layer, or each of the inner and outer layers, shows affinity to the reinforcing layer made of a stretched polyolefin resin sheet, thereby ensuring high adhesion strength. Further, since the constitutive layers are made of a common material, the high-pressure composite pipe is readily recyclable.

In an arrangement comprising a pipe-shaped inner layer made of a synthetic resin, a reinforcing layer made of a stretched polyolefin resin sheet and wound on an external circumferential surface of the inner layer, and an outer layer made of a synthetic resin and laminated on the reinforcing layer, it is possible that at least one of the inner layer and the outer layer comprises a synthetic resin foam (hereinafter mentioned as a high-pressure composite pipe of Invention 9). According to this arrangement, the inner layer and/or the outer layer made of a synthetic resin foam acquire(s) an insulating effect.

In addition, at least one of the inner layer and the outer layer may include a plurality of hollow portions which extend along an axis of the pipe and which are spaced along a circumference of the pipe at a predetermined distance (hereinafter mentioned as a high-pressure composite pipe of Invention 10). When the inner layer includes the hollow portions, reinforcement is provided by partitions between neighbouring hollow portions. As a result, this arrangement ensures remarkable pressure resistance and also achieves weight reduction. Similarly, the hollow portions formed within the outer layer can accomplish weight reduction and economic efficiency.

Further, an external circumferential surface of the outer layer may be equipped with a plurality of ribs which project radially relative to an axis of the pipe and which are spaced along the axis at a predetermined distance (hereinafter mentioned as a high-pressure composite pipe of Invention 11). In this arrangement, the ribs reinforce the outer layer, by which the reinforcing layer is protected in a stable manner for a long period. In consequence, the reinforcing layer can effectively reinforce the inner layer without fail.

Preferably, in regard to the stretched polyolefin resin sheet for the reinforcing layer, the modulus of tensile elasticity in 0–2% strain range is lower than the modulus of tensile elasticity in 2–5% strain range (hereinafter mentioned as a high-pressure composite pipe of Invention 12). This arrangement is concerned with the pulsation pressure characteristics of the high-pressure composite pipe. In order to improve the rupture strength of a stretched polyolefin resin sheet, stretching should be conducted at a relatively high stretching ratio, which inevitably increases the modulus of elasticity. Above all, the modulus of initial tensile elasticity tends to increase significantly. Due to the high initial elastic modulus, when this stretched polyolefin resin sheet is wound on the inner layer to reinforce a high-pressure composite pipe, the stretched polyolefin resin sheet has to bear a heavy stress while the high-pressure composite pipe is subjected to a repetition of high internal pressures like pulsation pressure. Eventually, the stretched polyolefin resin sheet is likely to develop cracks, which induce rupture of the high-pressure composite pipe. In order to avoid this accident, the above arrangement specifies the treatment of the stretched polyolefin resin sheet such that its initial elastic modulus should be lower than the subsequent elastic modulus, whereby the stretched polyolefin resin sheet can obtain good stretchability. As a result, even when the high-pressure composite pipe is under a repetition of high internal pressures like pulsation pressure, the stretched polyolefin resin sheet receives a smaller stress, because it is readily stretchable at the initial stage. Thus, the stretched polyolefin resin sheet is improved in terms of flexibility to bending strain and durability against pulsation pressure.

The above-mentioned property is imparted to the stretched polyolefin resin sheet in the following manner, based on the principle described below.

The stretched polyolefin resin sheet is obtained in a highly stretched state. When this sheet is folded, fibrils in the sheet are easily dislocated and overlapped on each other. In view of this phenomenon, when the stretched polyolefin resin sheet is treated in the manner mentioned later, a multiplicity of fold structures can be created in the stretched polyolefin resin sheet. In this connection, the stretched polyolefin resin sheet goes through an extreme drop of the modulus of initial elasticity. While the elastic modulus rises later, the total stretchability increases in the end. The stretched polyolefin resin sheet is guided along a zigzag pass line composed of a combination of thin round bars having a diameter of about 10 mm. During this process, the above-mentioned phenomenon is successively repeated to develop multiple folds of fibrils within the stretched polyolefin resin sheet. The stretched polyolefin resin sheet obtained by this treatment shows a very low modulus of initial elasticity and a high rupture elongation. At the same time, the final rupture strength is unaffected and the rupture strength remains substantially unchanged, because this treatment has not broken molecular chains. To be more specific, the high-pressure composite pipe obtained by winding the stretched polyolefin resin sheet is fortified with a sheet with a low modulus of initial elasticity. Therefore, the resulting high-pressure composite pipe shows a remarkable flexibility to the initial load, improving its durability against pulsation pressure and the like. Besides, since the above treatment does not cause a significant change in the final rupture strength, sufficient performance is expected in terms of internal pressure resistance.

As for the structure of the reinforcing layer, the winding direction of the reinforcing layer may be inclined 30° to 90° relative to the axis of the pipe, and the reinforcing layer may be laminated on the inner layer and/or the outer layer at symmetric inclination angles relative to the axis of the pipe (hereinafter mentioned as a high-pressure composite pipe of Invention 13). More preferably, the winding angle (angle of inclination) of the reinforcing layer is in the range of 45° to 70°. According to this arrangement, the high-pressure composite pipe shows a higher internal pressure strength, particularly against an internal pressure of a transported medium. In addition, a plurality of reinforcing layers may be braided (hereinafter mentioned as a high-pressure composite pipe of Invention 14). In this arrangement, the reinforcing layers are locked with each other to ensure a high internal pressure strength and rupture retardation.

Further, the reinforcing layer may be laminated on the inner layer and/or the outer layer, in such winding directions that winding angles relative to the axis of the pipe, in absolute value, are varied in the range of 5° to 30° (hereinafter mentioned as a high-pressure composite pipe of Invention 15). More specifically, when a plurality of stretched polyolefin resin sheets constitute the reinforcing layer, a winding angle is varied relative to an underlying longitudinal reinforcing layer. According to this structure, when a pressure is applied inside the high-pressure composite pipe, the stress transmitted to the stretched polyolefin resin sheets is dispersed in the directions of specified angles. As for the rupture internal pressure performance, the high-pressure composite pipe with winding angle variation is substantially as good as the one without winding angle variation. However, in actual use, the former retains its physical properties for a longer period, excelling in the pulsation pressure resistance property.

As for the adhesion layer, its material may be composed of an elastomer with a tensile elastic modulus in the range of 100 to 2000 kgf/cm$^2$ (hereinafter mentioned as a high-pressure composite pipe of Invention 16). Use of the elastomer (i.e. soft resin) establishes a flexible joint with the reinforcing layer, so that the stress is not concentrated on a certain part of the reinforcing layer. Consequently, the high-pressure composite pipe can be improved in flexibility to bending strain as well as durability against pulsation pressure.

The soft resin used as the adhesion layer establishes a flexible joint with the reinforcing layer and improves the high-pressure composite pipe in terms of flexibility to bending strain and durability against pulsation pressure. Such effects are expected to hinder partial concentration of stress on the reinforcing layer.

As the elastomers, crosslinked rubbers are acceptable, but thermoplastic elastomers are preferable because of their advantage in heat adhesion. Such thermoplastic elastomers include styrene elastomers, vinyl chloride elastomers, polyester elastomers, urethane elastomers, polyolefin elastomers, etc. Above all, thermoplastic polyolefin elastomers are recommended, considering their high affinity particularly for polyolefin resins.

Among the physical properties of an elastomer, flexibility is measured by hardness and modulus of tensile elasticity. In this description, the modulus of tensile elasticity is taken as the measure. Where the tensile elastic modulus exceeds 2000 kgf/cm$^2$, the elastomer shows a poor flexibility and possibly fails to achieve the above effects. On the other hand, below 100 kgf/cm$^2$, the elastomer is too soft to function as the adhesion layer, only to cause dislocation of the reinforcing layer.

The material for the adhesion layer may have a crosslinked structure (hereinafter mentioned as a high-pressure composite pipe of Invention 17). The above-mentioned thermoplastic elastomers contain a so-called pseudo-crosslinked structure in which the crosslinked structure is lost by heating. Despite this pseudo-crosslinked structure, crosslinking is required if the heat resistance is deficient.

Polyolefin resins can be crosslinked, for example, by a chemical crosslinking method using a peroxide, a radioactive crosslinking method using electron rays or other high-energy radioactive rays, and a so-called silane crosslinking method effected by silane-graft treatment and moisuture contact. A crosslinking agent or a crosslinking auxiliary is blended in advance, especially when crosslinking is effected by irradiating an ultraviolet ray or an electron ray onto the stretched polyolefin resin sheet which has undergone stretching. Such crosslinking agents (radical photoinitiators) include benzophenone, thioxantone, acetophenone, benzyl-benzoine, Michler's ketone. As crosslinking auxiliaries, there may be mentioned triallyl isocyanurate, triallyl cyanurate, trimethylolpropane acrylate, and diallyl phthalate. In the stretching step, these crosslinking agents also assist stretching by serving to reduce the pulling force (tensile force) required for the stretching.

In addition, the silane crosslinking method, which comprises simple steps, is also desirable.

In the present invention, the resin for the adhesion layer preferably shows a crosslinking degree in the range of 10 to 80%. On the one hand, heat resistance may not be enhanced under 10%. On the other hand, where crosslinking is continued after the crosslinking degree exceeds 80%, heat resistance does not improve any further.

The degree of crosslinking is evaluated in terms of gel fraction. In the present invention, the method for gel fraction measurement comprises the steps of heating a solution which is a good solvent to a polyolefin resin (i.e. principal constituent of the stretched polyolefin resin sheet), allowing insoluble matters to elute from the heated solution, and expressing the gel fraction as the weight percentage of the insoluble matters relative to the weight of the mixture before elution. For example, in the case of polyethylenes, elution is conducted for 24 hours in a xylene solution heated at 130° C., and, thereafter, the gel fraction is determined as the weight percentage of the insoluble matters relative to the weight of the mixture before elution. In the case of polypropylenes, insoluble matters are obtained by 24 hour elution from a mesitylene solution heated at 135° C., and the gel fraction is calculated as the weight percentage of the insoluble matters relative to the weight of the mixture before elution.

When the resin for the adhesion layer contains a crosslinked structure, the high-pressure composite pipe of the present invention can be employed at a high temperature over 80C., without sacrificing its performance.

<Stretched Polyolefin Resin Sheet>

With regard to the above-mentioned high-pressure composite pipe of the present invention, description is made of the stretched polyolefin resin sheet which is used as a material for the reinforcing layer.

It should be understood that, in the present invention, the stretched polyolefin resin sheet refers to a sheet which is stretched at least in the axial direction of a pipe and which comprises a polyolefin resin as a principal material.

The polyolefin resin includes, but is not particularly limited to, for example, low-density polyethylenes, straight-chain low-density polyethylenes, high-density polyethylenes, homopolypropylenes, propylene random copolymers, propylene block copolymers, poly(4-methyl-1-pentene), etc. Among these polyolefin resins, polyethylenes (in particular, highly crystalline high-density polyethylenes) are advantageous for its high elastic modulus after stretching. Where necessary, polyolefin resins may be mixed with crystal nucleating agents, crosslinking agents, crosslinking auxiliaries, slipping agents, fillers, pigments, other kinds of polyolefin resins, low-molecular-weight polyolefin waxes, etc.

The crystal nucleating agent is added for the purpose of improving the degree of crystallization. For example, calcium carbonate, titanium oxide, etc. can be used as such.

The crosslinking agent and the crosslinking auxiliary are incorporated for partial crosslinking of molecular chains in the polyolefin resin, thereby improving heat resistance, creep property, etc. of the stretched polyolefin resin sheet. The crosslinking agent includes, for example, benzophenone, thioxanthone, acetophenone and other photopolymerization initiators. The crosslinking auxiliary includes triallyl cyanurate, trimethylolpropane triacrylate, diallyl phthalate and other polyfunctional monomers.

For a preferable arrangement for carrying out the crosslinking, a gel fraction is adjusted to not lower than 20%, which is the weight percentage of the residual matter after the non-eluted component is extracted from the stretched polyolefin resin sheet by using a good solvent to a polyolefin resin which principally constitutes the stretched polyolefin resin sheet. When the resin sheet comprises a high-density polyethylene as the main constituent, the solvent can be xylene, methylene, etc. In a resin sheet with a gel fraction of not lower than 20%, the resin sheet is chemically or physically crosslinked by 20% or more, and possesses sufficient creep characteristics to reinforce the inner layer for a long period. Since such characteristics protect the resin sheet from elution by solvents and melting under heating, the resin sheet does not lose its strength during the step of integrally laminating the resin sheet on the inner layer. Therefore, the resin sheet is allowed to exhibit a full reinforcing effect. There is no particular limitation to the process for giving the resin sheet with a gel fraction of not lower than 20%. By way of illustration, a photopolymerization initiator such as benzophenone, thioxanthone and acetophenone is blended as a raw material, and crosslinking is effected during or after the preparation of the stretched sheet.

In addition to the use of these crosslinking agents, electron ray or ultraviolet ray may be irradiated as a supplementary crosslinking method. The crosslinking method may include a process of irradiating an electron ray (preferably 1 to 20 Mrad, more preferably 3 to 10 Mrad) or irradiating an ultraviolet ray (preferably at an intensity of 0 to 800 mW/cm$^2$, more preferably 100 to 500 mW/cm$^2$), after the polyolefin resin is blended with the crosslinking agent, the crosslinking auxiliaries, etc. as mentioned above. This crosslinking step can be conducted simultaneously with the stretching step to be described later, or after the stretching step.

After crosslinked by any of the above processes, the stretched polyolefin resin sheet is enhanced in creep property. Accordingly, while the high-pressure composite pipe is in service, improvement is observed in the creep property with respect to the internal pressure. In particular, if a polyolefin resin having a poor creep property is employed for the inner layer, it is desirable to crosslink the stretched polyolefin resin sheet.

The stretched polyolefin resin sheet is obtained by stretching a polyolefin resin sheet processed in sheet form. The method of preparing this polyolefin resin sheet is not particularly limited, and includes, for example, extrusion forming by T-die method, roll forming by calender method, etc.

In addition, there is no particular limitation to the method for continuous stretching of the polyolefin resin sheet. By way of illustration, a heated polyolefin resin sheet can be stretched between rolls rotating at different speeds. Alternatively, a heated polyolefin resin sheet is fed between rolls rotating in opposite directions and stretched in the axial direction of a pipe, with the thickness being gradually decreased (so-called rolling method). In these methods, the stretching step may be conducted only once, or repeated more than once for gradual stretching. If the stretching step is effected more than once, the above stretching methods may be performed in combination. Especially, in the case of a relatively thick polyolefin resin sheet, it is desirable to conduct the above-mentioned rolling prior to the stretching.

The thickness of the polyolefin resin sheet to be stretched (raw sheet material) is dependent on the use, stretching ratio, etc. of the intended high-pressure composite pipe. Although the thickness is not particularly limited, a desirable thickness is about 0.5 to 15 mm. With a thickness of less than 0.5 mm, the stretched polyolefin resin sheet is so thin as to He sacrifice its handlability and induce troubles in the subsequent operation steps (e.g. laminating operation) On the other hand, when the thickness exceeds 15 mm, excessive stretching load is imposed, only to enlarge the stretching machine needlessly and to complicate the stretching operation. From this raw sheet material, the stretched polyolefin resin sheet is obtained in a thickness of about 50 to 1000 $\mu$m.

The width of the reinforcing layer composed of the stretched polyolefin resin sheet is not particularly limited. The width can be adequately selected according to the diameter, winding angle and winding process (mentioned below) of the high-pressure composite pipe. When the reinforcing layer needs to be in a relatively narrow width, a broad sheet can be slit into a required width.

The stretching ratio of the stretched polyolefin resin sheet is decided, as necessary, based on the properties and the state of the crystalline polyolefin resin used. Although this ratio need not be strictly specified, a preferred stretching ratio is not less than 10 in the longitudinal direction, and more preferably not less than 20. A stretched polyolefin resin sheet with a longitudinal stretching ratio of less than 10 may fail to provide a strength and an elastic modulus as required. Additionally, when stretching is effected in the width direction, stretching in the longitudinal direction is hampered. In this case, it may be difficult to carry out longitudinal stretching at a ratio of 10 or higher.

Where necessary, in order to enhance the adhesive property, the surface of the stretched polyolefin resin sheet may be treated by a physical or chemical method. Considering the simplicity of the operation, it is preferred to adopt a physical surface treatment of creating a microscopically uneven surface on the stretched polyolefin resin sheet. The surface treatment includes embossing methods like sand blasting and local heating methods of heating a part of the surface.

Further, the reinforcing effect of the stretched polyolefin resin sheet can be fully exhibited by attaching the stretched polyolefin resin sheet securely and tightly to the inner layer comprising a synthetic resin. If the stretched polyolefin resin sheet is not securely adhered to the inner layer, a gap created between the inner layer and the stretched polyolefin resin sheet impairs the reinforcing effect. Therefore, under a certain temperature condition for integrally fusion-laminating the stretched polyolefin resin sheet on the inner layer, the stretched polyolefin resin sheet is desired to show a longitudinal shrinkage stress of not less than 0.1 MPa. When the stretched polyolefin resin sheet has a shrinkage stress of less than 0.1 MPa, the integrating lamination process should be conducted under heating, while a tensile stress is applied on the stretched polyolefin resin sheet, which complicates the process. In contrast, when a stretched polyolefin resin sheet has a shrinkage stress of 1.0 MPa or greater, the inner layer and the stretched polyolefin resin sheet can be tightly fused together, simply by winding the stretched polyolefin resin sheet onto the inner layer and heating them at the above-mentioned temperature.

There is no strict limitation as to the manner of giving the stretched polyolefin resin sheet with a shrinkage stress of 0.1 MPa or greater. For example, an excessively stretched polyolefin resin film can be cooled rapidly, or crosslinking can be effected during or just after the stretching step.

Preferably, the melting point of the stretched polyolefin resin sheet is the same as or higher than that of the synthetic resin which is a main component of the inner layer. In the process of integrally laminating the stretched polyolefin resin sheet on the inner layer, the manufacture temperature should be not lower than the temperature at which the surface of the inner layer melts (i.e. melting point of a synthetic resin which principally constitutes the inner layer), in order that the inner layer and the stretched polyolefin resin sheet are fused tightly enough. On the other hand, if the stretched polyolefin resin sheet is melted, it loses the high strength derived from stretching and fails to exhibit a full reinforcing effect. Accordingly, as long as the stretched polyolefin resin sheet has the same or higher melting point than the synthetic resin which principally constitutes the inner layer, the stretched polyolefin resin sheet can be integrally laminated on the inner layer, without sacrificing its high strength.

There is no specific limitation to the manner for giving this melting point to the stretched polyolefin resin sheet. For example, provided the main constituent of the inner layer is a high-density polyethylene having a melting point of 135° C., the stretched polyolefin resin sheet can be prepared by using a homopolypropylene with a melting point of 167° C. as the principal constituent. Otherwise, while the main constituent of the inner layer is a high-density polyethylene having a melting point of 135° C., a sheet which mainly comprises the same or different high-density polyethylene with a melting point of 135° C. is stretched at a ratio of not less than 10, preferably not less than 20. In this way, even if the melting point of the stretched polyolefin resin sheet is equal to or lower than that of the synthetic resin used as the principal inner layer constituent, similar operations and effects can be expected in comparison with a sheet whose melting point is the same as or higher than the synthetic resin used as the principal inner layer constitutent. As stated above, it goes without saying that the stretched polyolefin resin sheet acquires a sufficient reinforcing effect, when processed at a stretching ratio of 10 or greater, preferably 20 or greater. Nevertheless, a highly stretched polyolefin resin sheet prepared at such a high stretching ratio is difficult to handle, because of its tendency to crack in the longitudinal direction. But where the thickness of the stretched polyolefin resin sheet is 100 $\mu$m, cracking is restrained.

<Inner Layer>

The next description relates to the inner layer in the high-pressure composite pipe of the present invention.

In the high-pressure composite pipe of the present invention, the inner layer serves to allow passage of a transported medium. Therefore, the species of the synthetic resin for the inner layer is suitably selected in accordance with the types of the transported medium. The examples include, but are not limited to, polyolefin resins similar to those employed for the stretched polyolefin resin sheet, polyvinyl chloride, polyamides, various rubbers, polyolefin elastomers, chlorinated vinyl chloride resins, fluororesins, crosslinked polyethylene resins, polyurethane resins, etc. Among them, chlorinated vinyl chloride resins show a prominent heat resistance and do not melt even when high-temperature fluid is transported. For this advantage, chlorinated vinyl chloride resins can provide stable and long service as a hot-water pipe for delivering hot water, a steampipe of a ship for delivering high-temperature steam, etc. From another aspect, owing to the excellent chemical resistance, fluororesins are suitable for a pipe arrangement for transporting drug solution and other chemical substances. In addition, crosslinked polyethylene resins are excellent in heat resistance and flexibility. Therefore, for a sheath pipe header-type piping system in a house, where a hot-water pipe or water supply pipe is led through the inside of a sheath pipe which is laid in a bent manner and connected to a header, a composite pipe having a crosslinked polyethylene resin inner layer can be utilized as the hot-water pipe or water supply pipe. Such a composite pipe can be inserted into the bent sheath pipe along its bent configuration. Further additionally, polyurethane resins, which excel in wear resistance, are suitable when the composite pipe is intended for transportation of solid substances like sand, gravel, coal, etc.

The wall thickness of the inner layer is properly decided in accordance with the type of transported medium, the internal pressure in use or the intended application.

Additionally, in consideration of recycling of high-pressure composite pipe fragments produced during manufacture or recycling of used high-pressure composite pipes, polyolefin resins are preferable as the synthetic resin for the inner layer.

<Outer Layer>

The synthetic resin for the outer layer is optionally selected in accordance with the intended application, condition of use, etc. In addition to the above-mentioned synthetic resins for the inner layer, use can be made of polyamides, acrylic resins, polyester resins, etc. Similar to the inner layer, the wall thickness of the outer layer is properly determined in view of its intended application, condition of use, etc.

Additionally, in consideration of recycling of high-pressure composite pipe fragments produced during manufacture or recycling of used high-pressure composite pipes, polyolefin resins may be used as the synthetic resin for both the inner and outer layers.

<Adhesion Layer>

When the stretched polyolefin resin sheet is stretched at a high ratio, crystals are so highly oriented on the surface that the surface cannot fuse readily with other materials in many cases. In order to secure the fixation of the inner layer on the reinforcing layer, or the fixation of the inner and outer layers on the interposed reinforcing layer, it is desirable to dispose a layer having affinity (compatibility) to each of these layers. The high-pressure composite pipe of Invention 3 includes an adhesive layer disposed between the inner layer and the reinforcing layer, and the high-pressure composite pipe of Invention 4 includes adhesive layers disposed between the inner/outer layers and the interposed reinforcing layer. Each of these adhesive layers has affinity (compatibility) to the related layers.

In this description, it should be understood that "to have affinity (compatibility)" is related to the adhesive performance of synthetic resins, indicating that the inner layer and the reinforcing layer, or the inner/outer layers and the interposed reinforcing layer, are substantially attached without peeling from each other, when they are pressed into contact and heated. Even though some synthetic resins may leave a small portion unadhered due to bubble inclusion or the like, as long as the high-pressure composite pipe is practically unaffected, they are encompassed in the synthetic resins having affinity (compatibility) to the reinforcing layer.

A preferable material for the adhesion layer is an elastomer with a tensile elastic modulus in the range of 100 to 2000 $kgf/cm^2$, as mentioned above. Since reference to this elastomer is already made with regard to Invention 16, no further description is repeated here.

As the adhesion layer made of a synthetic resin, use can be made of a styrene-ethylene-butadiene-styrene copolymer (SEBS), which is adhesive to the reinforcing layer and most of the above-mentioned synthetic resins. Where polyolefin resins are used for the synthetic resins for the inner and outer layers, there may be mentioned, for example, polyolefin resins used as the above-mentioned raw sheet material, copolymers comprising an olefin main chain (of which an olefin is the principal component) and other comonomers, acid-modified polyolefins, olefin elastomers, etc. These synthetic resins can be adhered, by thermofusion, to the reinforcing layer made of the stretched polyolefin resin sheet.

It is also possible to use adhesives such as epoxy-based adhesives and acrylic adhesives, curable resins and tackifying adhesives. Since this method enables adhesion without heating the stretched polyolefin resin sheet, the stretched polyolefin resin sheet is unlikely to lose its physical properties during manufacture. Further, use of adhesives or curable resins can prevent decrease of the strength in a relatively high temperature range between 50° C. and 100° C. However, this method is not very much expected to give a higher adhesive strength than thermofusion.

Now, additional description is made on the high-pressure composite pipe of Invention 5 which is mentioned previously.

In this high-pressure composite pipe, the inner layer is provided with a first reinforcing layer made of a stretched polyolefin resin sheet and wound in a circumferential direction, and a second reinforcing layer made of a stretched polyolefin resin sheet and laminated in an axial direction of the pipe. The term "circumferential direction" as used herein means the winding direction which is oriented at a required angle relative to the axis of a pipe.

The second reinforcing layer in the high-pressure composite pipe of Invention 5 is intended to reinforce the pipe in the axial direction, thereby to reduce the deflection caused mainly by its own weight. For this purpose, the stretching direction of the stretched polyolefin resin sheet is preferably oriented along the axis of the pipe (i.e. at the inclination angle of 0°). In practice, however, the stretching direction may be slightly offset from the axis of the pipe, as far as the above object is achieved at such an inclination angle.

Preferably, the second reinforcing layer is laminated with no gap. For gapless lamination, the sheet width should be the same as the external circumference in the cross section of the high-pressure composite pipe. Nevertheless, it is acceptable if some gap is left after lamination. Additionally, a plurality of reinforcing layers may be used for lamination.

In the first reinforcing layer and the second reinforcing layer, the number of layers can be suitably decided, depending on the thickness and stretching ratio of the sheet, and the performances required of the high-pressure composite pipe. These reinforcing layers may be different in stretching ratio and thickness.

Whichever of the first reinforcing layer and the second reinforcing layer may locate on the inner side of the pipe. Instead, these reinforcing layers may be laminated alternately.

The high-pressure composite pipe of the present invention is obtained by winding a reinforcing layer in a laminating manner and as inclined at a predetermined angle relative to the axis of the pipe, thereby providing circumferential reinforcement and enhancing the strength against internal pressure. In order to increase the strength against internal pressure, the winding angle (angle of inclination) of the reinforcing layer is preferably in the range of 30° to 90°, more preferably in the range of 45° to 70°, relative to the axis of the high-pressure composite pipe.

Although the lamination angle of the reinforcing layer can be optionally selected, care should be taken when the reinforcing layer is laminated gaplessly, because the angle is dependent on the sheet width relative to the cross-sectional configuration of the high-pressure composite pipe. While gapless lamination is preferred, the reinforcing layer may be laminated in a slightly spaced manner or an overlapped manner.

The high-pressure composite pipe of the present invention may incorporate additional arrangements, unless the effects of the invention are not adversely affected.

For example, the high-pressure composite pipe of the present invention may include a synthetic resin layer disposed between two layers of the reinforcing layer which are laminated at symmetric angles.

Besides, each of the inner layer and the outer layer may comprise two or more laminated layers of different synthetic resins. Likewise, the reinforcing layer may be composed of two or more laminated layers.

When the reinforcing layer is laminated in two or more layers, the winding direction relative to the axis of the pipe may vary from layer to layer.

The sectional configuration of the high-pressure composite pipe is not particularly limited. A circular section and a near-square section with rounded corners are preferred, because of their good efficiency regarding internal pressure strength and external pressure strength relative to the weight. A complex sectional configuration bothers lamination of the reinforcing layer.

In the present invention, the diameter of the high-pressure composite pipe is not strictly restricted. Thus, the high-pressure composite pipe can be produced in a range from a relatively small-diameter pipe (10 mm to 30 mm in inner diameter), to a large-diameter pipe (300 mm to 500 mm). As for the inner layer, the axial cross-sectional configuration and the circumferential cross-sectional configuration are not particularly specified.

The method for producing the high-pressure composite pipe of the present invention is not particularly limited. To give an example, a synthetic resin pipe for the inner layer is prepared in advance, and the reinforcing layer is laminated on the surface of the synthetic resin pipe.

The inner layer can be obtained in hollow shape by extrusion molding which is usually practised in the production of pipes and hoses.

Methods for circumferentially laminating the reinforcing layer include, but are not limited to, a so-called spiral winding process of winding the reinforcing layer at a desired angle, and a so-called braiding process of winding, in a braided manner, the reinforcing layers prepared in a relatively narrow width. A suitable method can be selected in accordance with various conditions such as the production amount, the production speed and the diameter of the high-pressure composite pipe.

The spiral winding process comprises continuously winding the reinforcing layer on the inner layer (as mandrel) at a fixed angle relative to the axis of the inner layer. In the course of winding, it is allowable that the reinforcing layer may be overlapped or slightly spaced, as far as the performance of the high-pressure composite pipe is not adversely affected. In the case where the reinforcing layer should be wound free from gap and overlap, the winding angle is decided in accordance with the width of the stretched polyolefin resin sheet and the outer diameter of the mandrel. Preferably, the reinforcing layer formed by the spiral winding process comprises an even number of layers, rather than an odd number of layers, such that each layer alternates at the same positive/negative angles relative to the axis of the high-pressure composite pipe.

The braiding process comprises winding, in a braided manner, a plurality of reinforcing layers of relatively small width. In terms of design, the resulting high-pressure composite pipe has an internal pressure strength substantially equivalent to the one obtained by the spiral winding-process. In addition, the following advantages can be noted.

First of all, the mandrel is unlikely to be dislocated during manufacture, because winding is effected under a tension evenly applied in the entire circumferential direction. This prevents creation of a gap between reinforcing layers and decreases the risk of weeping. Besides, the reinforcing layers are locked with each other to suppress local deflection and, as a result, improve the internal pressure strength. Moreover, if a transported medium imposes a high internal pressure on the high-pressure composite pipe, the reinforcing layer which is stronger than the inner layer moves in such a manner as to give a greater braiding angle, thereby delaying rupture of the high-pressure composite pipe. This effect is prominant when the inner layer is made of a synthetic resin with a relatively poor creep resistance.

It should be understood that the above remarks are based on the comparison with the spiral winding process, on the assumption that the reinforcing layer is wound at the same density. The winding process is adequately chosen in accordance with the forming speed and the diameter of the high-pressure composite pipe.

With regard to Invention 5, as a method for laminating the second reinforcing layer along the axis of the pipe, a second reinforcing layer feeder can be disposed along the axis of the pipe, such that the second reinforcing layer can be paid out on the inner layer or the first reinforcing layer. However, this method is not the only option, and a suitable method can be selected, considering various conditions such as the production amount, the production speed and the diameter of the high-pressure composite pipe.

Next, in order to achieve the above-mentioned second object, the method of the present invention for joining high-pressure composite pipes is arranged as described below.

A method for joining high-pressure composite pipes according to an eighteenth aspect of the present invention (hereinafter mentioned as a high-pressure composite pipe joining method of Invention 18) is a method for joining high-pressure composite pipes each comprising a pipe-shaped inner layer made of a synthetic resin, a reinforcing layer made of a stretched polyolefin resin sheet and wound on an external circumferential surface of the inner layer, and an outer layer made of a synthetic resin and laminated on the reinforcing layer. The method comprises the steps of: heating and melting an end of each high-pressure composite pipe; flaring the melted end of each high-pressure composite pipe, with a diameter thereof gradually enlarging toward an end face thereof; and butting the flared ends of both flared high-pressure composite pipes together and fusing internal circumferential surfaces of their inner layers, with their reinforcing layers being turned outwardly.

According to this arrangement, at a joint area of the mutually fused high-pressure composite pipes, the inner layers form a thick bead along the entire circumference, so that the high-pressure composite pipes are firmly joined together. Hence, in a pipe arrangement for a water supply pipe or the like in which high-pressure fluid flows, there is no fear of leakage or fracture at the joint area which is firmly joined along the entire circumference.

The above arrangement may further comprise the steps of: preparing an annular band which has an annular shape and one or more slits therein, in which band a groove runs circumferentially in the middle of an inner circumferential surface, and round-tipped ridges extend circumferentially along both side edges of the inner circumferential surface; approximately centering the annular band over a fusion point of the high-pressure composite pipes; mounting the annular band in such a manner that the groove can house a bulge which is formed by fusion and protrudes outwardly along the fusion point, and that tips of the ridges can contact, on both sides of the bulge, with external circumferential surfaces of the high-pressure composite pipes; and fastening the annular band.

Preferably, the material for the annular band should be flexible enough to adapt to strain. For example, there may be mentioned iron, stainless steel and other metals, polyolefin resins and other soft resins, and the like.

According to this arrangement, the annular band fixes the high-pressure composite pipes, such that its round-tipped ridges bite, in an indenting manner, not only into the outer layer but also into the whole pipe. As a consequence, when each pipe comprises a tubular inner layer made of synthetic resin, a reinforcing layer made of a stretched polyolefin resin sheet and wound around the external circumferential surface of the inner layer, and an outer layer made of synthetic resin and laminated on the reinforcing layer, the high-pressure composite pipes can be butt-fused together, with effectively reinforcing the joint area and making the joint area adaptable to strain of the high-pressure composite pipes. Accordingly, it is possible to prevent fracture at the joint area, in a pipe arrangement for a water supply pipe or the like in which high-pressure fluid flows.

In addition, it is possible to include the steps of approximately centering a heat-shrinkable reinforcing material over the fusion point of the high-pressure composite pipes, and shrinking the reinforcing material by heating.

In this arrangement, the high-pressure composite pipes are butt-fused together, when each pipe comprises a tubular inner layer made of synthetic resin, a reinforcing layer made of a stretched polyolefin resin sheet and wound around the external circumferential surface of the inner layer, and an outer layer made of synthetic resin and laminated on the reinforcing layer. In this state, the heat-shrunk reinforcing material can effectively reinforce the joint area by fixing its perimeter. At the same time, the joint area is made adaptable to strain of the high-pressure composite pipes. Accordingly, it is possible to prevent fracture at the joint area, when the pipes are laid as a water supply pipe or the like in which high-pressure fluid flows.

Furthermore, it is possible to include the steps of: removing a bulge formed along the fusion point of the high-pressure composite pipes; approximately centering a heat-shrinkable reinforcing material over an area from which the bulge is removed; and shrinking the reinforcing material by heating.

In this arrangement, the heat-shrunk reinforcing material is tightly fixed on the butt-fused joint area, so as to reinforce its perimeter more effectively.

The reinforcing material may be a tube-shaped element obtained by integrally winding a stretched polyolefin resin sheet into tubular form. This arrangement facilitates a reinforcing operation on the external circumference of the joint area where the high-pressure composite pipes are butt-fused to each other.

The tube-shaped element can be also obtained by spirally and integrally winding the stretched polyolefin resin sheet on an external circumferential surface of a core, in a plurality of layers which are oriented in reverse inclination directions from each other, and by removing the core thereafter. In this arrangement, the stretched polyolefin resin sheet for the tube-shaped element may be oriented either monoaxially or biaxially. The overall stretching ratio is preferably in the range of 10 to 40. The resins usable for the stretched polyolefin resin sheet are the same as those used for the stretched polyolefin resin sheet which constitutes the reinforcing layer of the high-pressure composite pipe.

In this arrangement, the strength of the reinforcing material prepared by thermally shrinking the tube-shaped element is increased not only in the circumferential direction but also in the axial direction. Accordingly, further effective reinforcement can be provided at the perimeter of the joint area where the high-pressure composite pipes are butt-fused to each other.

As the reinforcing material, use can be made of a tube-shaped element obtained by enlarging a diameter of a thermoplastic resin pipe, in which the resin at the joint area of the high-pressure composite pipes and a vicinity thereof is oriented in a circumferential direction.

According to this arrangement, the tube-shaped element is oriented in the axial direction by the extrusion forming and also oriented in the circumferential direction by enlargement of the diameter. Therefore, the heat-shrunk reinforcing material has its strength increased not only in the circumferential direction but also in the axial direction. Thereby, further effective reinforcement is provided at the perimeter of the joint area where the high-pressure composite pipes are butt-fused.

As the resin for the thermoplastic resin pipe which constitutes the tube-shaped element, polyethylene resins are suitable, for example. However, in addition to polyethylene resins, use can be made of other synthetic resins including polyolefin resins, polyvinyl chloride resins, polyamides and the like which are the same as the materials for the inner layer and the outer layer of the high-pressure composite pipe.

In the tube-shaped element, a suitable inner diameter is 1.05 to 1.2 times larger than the outer diameter of the high-pressure composite pipes to be joined. Preferably, the length of the tube-shaped element is at least 0.8 times longer than the outer diameter of the high-pressure composite pipes to be joined.

In this joining method, the means for heating the heat-shrinkable reinforcing material or tube-shaped element can be judiciously selected from known heating means such as a hot air generator, a band heater, an infrared heater and the like. However, temperature control is required, because the orientation of the resin returns to the original state at an extremely high temperature. As a convenient temperature control method, a temperature-dependent discoloring tape is stuck to the reinforcing material, so that the heating condition of the reinforcing material can be managed by checking the degree of discolorization. By way of example, the orientation in the stretched polyethylene resin sheet returns to its original state, once the temperature exceeds its melting point, 135° C. In this case, a discoloring tape whose color changes at 120° C. can be utilized to make allowance.

When the reinforcing material or tube-shaped element is lacking in weatherability or susceptible to scratch and scar, it is advised to wrap an anti-corrosion tape made of a soft vinyl chloride resin, etc. around the external surface layer of the heat-shrunk reinforcing material or the tube-shaped element.

BEST MODE FOR CARRYING OUT THE INVENTION

Figure 1:
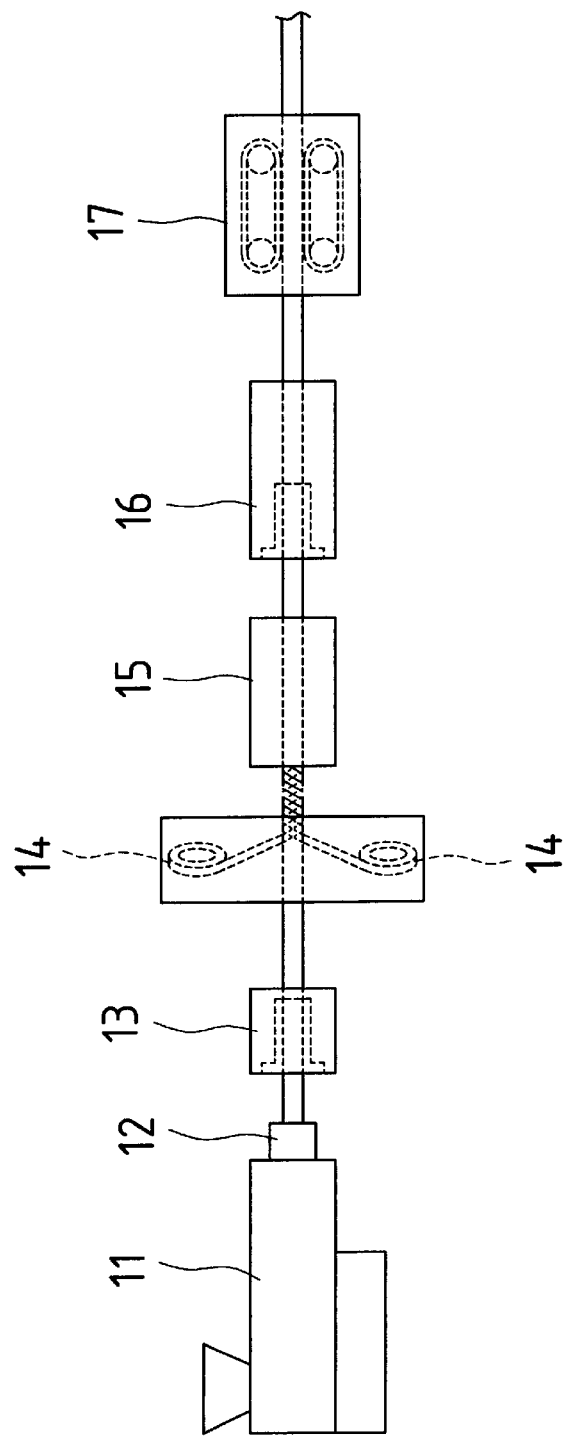
FIG. 1 schematically shows the structure of the apparatus used in Example 2 for manufacturing the high-pressure composite pipe according to the present invention.

Hereinafter, the present invention is specifically described by means of non-limitative Examples of the present invention.

Example 1

Manufacture of a Reinforcing Layer Sheet

A high-density polyethylene (melting point 135° C., melt index MI=1 g/10 mins.) was used as the polyolefin. While the high-density polyethylene was kneaded at 200° C. in a co-rotating twin-screw extruder, 3 parts by weight (relative to the high-density polyethylene) of triallyl cyanurate as a cross-linking auxiliary and 3 parts by weight of benzophenone as a photopolymerization initiator were added and evenly kneaded into the high-density polyethylene. The mixture was extruded from a T-die to give a 3-mm-thick polyolefin sheet.

This polyolefin sheet was paid out at a speed of 1 m/min., guided through a heating oven at 120° C., and taken-up at a speed of 30 m/min. Thus obtained was a stretched polyolefin sheet with a stretching ratio of 30 and a thickness of 0.15 mm. The payout and takeup operations were conducted by pinch rolls.

For crosslinking, the stretched polyolefin sheet was irradiated for 10 seconds using a high pressure mercury lamp. Thereafter, in order to roughen the surfaces of the stretched polyolefin sheet, the stretched polyolefin sheet was guided at a line speed of 20 m/min. and squeezed through two pairs of temperature-controlled pinch rolls, in which each pair is composed of a 200° C. roll and a 50 ° C. roll, such that each surface contacts the 200° C. roll alternately. The stretched polyolefin sheet was measured for surface unevenness by means of a surface profile measuring device (Dektak-303, manufacturedby ULVAC JAPAN, LTD.). The surface roughness Ra (central line average) was 2 µm.

In order to adhere the stretched polyolefin sheet to the inner layer, an adhesive sheet was laminated on one side of the stretched polyolefin sheet. The adhesive sheet was prepared in a thickness of 0.025 mm by inflation forming of a straight-chain low-density polyethylene (melting point 123° C., MI=0.8). The adhesive sheet was continuously laminated on the stretched polyolefin sheet, and thus obtained was a stretched composite sheet ready for winding.

Manufacture of a High-pressure Composite Pipe

A high-density polyethylene pipe (melting point 135° C, melt index MI=0.5 g/10 mins.), having a 60 mm outer diameter and a 3-mm-thick wall, was formed in advance. The above-mentioned reinforcing layer sheet was slit into a width of 90 mm to give elongated reinforcing layer tapes. Two such tapes were wound one after another on the external circumference of the pipe at ±60° relative to the axis of the high-pressure composite pipe, with the adhesive sheet being in contact with the inner layer. The tape-wound resin pipe was put into a far-infrared heating oven and heated until its surface temperature reached 130° C., so that the reinforcing layer sheet was fused to the high-density polyethylene pipe constituting the inner layer. Thus obtained was a high-pressure composite pipe of the present invention.

Example 2

Manufacture of a Reinforcing Layer Sheet

A reinforcing layer sheet comprising a stretched composite sheet was obtained in the same manner as in Example 1.

Manufacture of a High-pressure Composite Pipe

FIG. 1 shows a single-screw extruder 11 whose end is equipped with an extrusion die 12, a cooling die 13, a pair of spiral winders 14, a hot air oven 15, a cooling water pool 16, and a takeup machine 17.

In the above-structured apparatus for manufacturing a high-pressure composite pipe, a thermoplastic polyolefin resin was supplied into the single-screw extruder 11. By means of the extrusion die 12 equipped at its end and the cooling die 13, the resin was molded into an inner layer pipe having a 60 mm outer diameter and a 3-mm-thick wall. Next, two elongated reinforcing layer tapes, obtained by slitting the above-mentioned reinforcing layer sheet into a width of 90mm, were wound one after another on the inner layer pipe at ±60° relative to the axis of the pipe, using a pair of spiral winders 14. The tape-wound resin pipe was carried through the hot air oven 15 and heated to the surface temperature of 130° C. Thereafter, the pipe was cooled in the cooling water pool 16 to give a high-pressure composite pipe.

As the thermoplastic polyolefin resin for the inner layer, use was made of a high-density polyethylene (melting point 135° C., melt index MI=0.5 g/10 mins.), which was extruded under the condition where the temperatures of the extruder barrel and the die were both 200° C. As mentioned above, the reinforcing layer sheet was made up of a stretched composite sheet.

Figure 2:
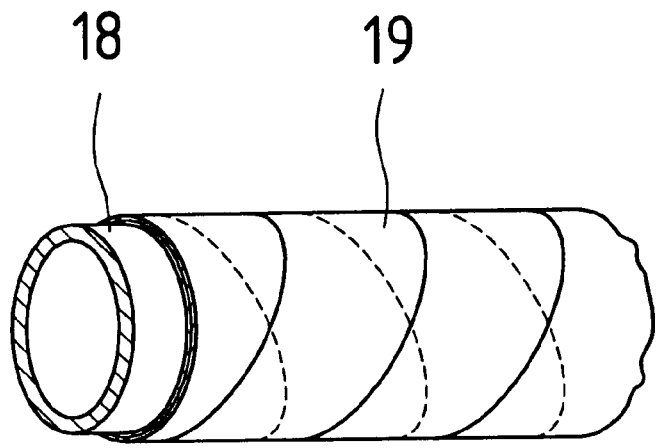
FIG. 2 is a perspective view showing the structure of the high-pressure composite pipe manufactured in Example 2.

The above process gave a high-pressure composite pipe of the present invention as shown in FIG. 2, in which the reinforcing layer sheet was wound one layer after another at symmetric angles relative to the axis of the high-pressure composite pipe, substantially in a gapless manner. In FIG. 2, the inner layer and the reinforcing layer were indicated at 18 and 19, respectively.

Example 3

Manufacture of a Reinforcing Layer Sheet

A reinforcing layer sheet comprising a stretched composite sheet was obtained in the same manner as in Example 1.

Manufacture of a High-pressure Composite Pipe

The operation of Example 2 was followed except for replacing the spiral winders with a sheet braider. As the sheet braider, a braiding machine (braider) which is usually used for the production of a high-pressure hose was utilized by converting its payout apertures from the fiber payout specification to the sheet payout specification. The payout capacity was 32 sheets.

Figure 3:
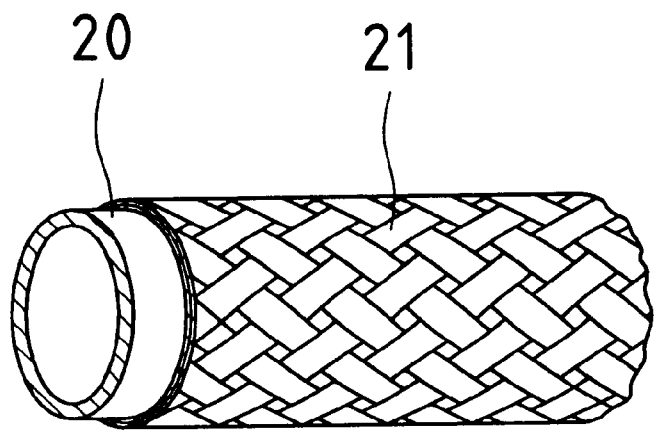
FIG. 3 is a perspective view showing the structure of the high-pressure composite pipe manufactured in Example 3.

Thirty-two (32) elongated reinforcing layer tapes were prepared by slitting the above reinforcing layer sheet into a width of 8 mm. Using the sheet braider, the tapes were wound on the inner layer pipe in a braided manner, at an angle of ±45° each relative to the axis of the pipe. Thereafter, the process of Example 2 was followed to produce a high-pressure composite pipe as illustrated in FIG. 3. In FIG. 3, the inner layer and the braided reinforcing layer were indicated at 21 and 22, respectively.

Example 4

Manufacture of a Reinforcing Layer Sheet

A reinforcing layer sheet comprising a stretched composite sheet was obtained in the same manner as in Example 1.

Manufacture of a High-pressure Composite Pipe

Sixteen (16) elongated reinforcing layer tapes were prepared by slitting the above reinforcing layer sheet into a width of 12 mm. Using 16 of the 32 payout apertures in the sheet braider, these tapes were wound on the inner layer pipe in a braided manner, at an angle of ±60° each relative to the axis of the pipe. Thereafter, the process of Example 3 was followed to give a high-pressure composite pipe as illustrated in FIG. 3.

Example 5

The operation of Example 4 was followed, except that no adhesive sheet was laminated in the manufacture of the reinforcing layer sheet.

As described above, each of Examples 1 to 5 provided a high-pressure composite pipe of the present invention, in which the reinforcing layer sheet was wound one layer after another at symmetric angles relative to the axis of the high-pressure composite pipe, substantially in a gapless manner.

Comparative Example 1

The high-density polyethylene pipe having a 60 mm outer diameter and a 3-mm-thick wall, which was molded in Example 1 as the inner layer, was subjected to the performance evaluation tests.

Example 6

Manufacture of a Reinforcing Layer Sheet

A reinforcing layer sheet comprising a stretched composite sheet was obtained in the same manner as in Example 1.

Manufacture of a High-pressure Composite Pipe

Figure 4:
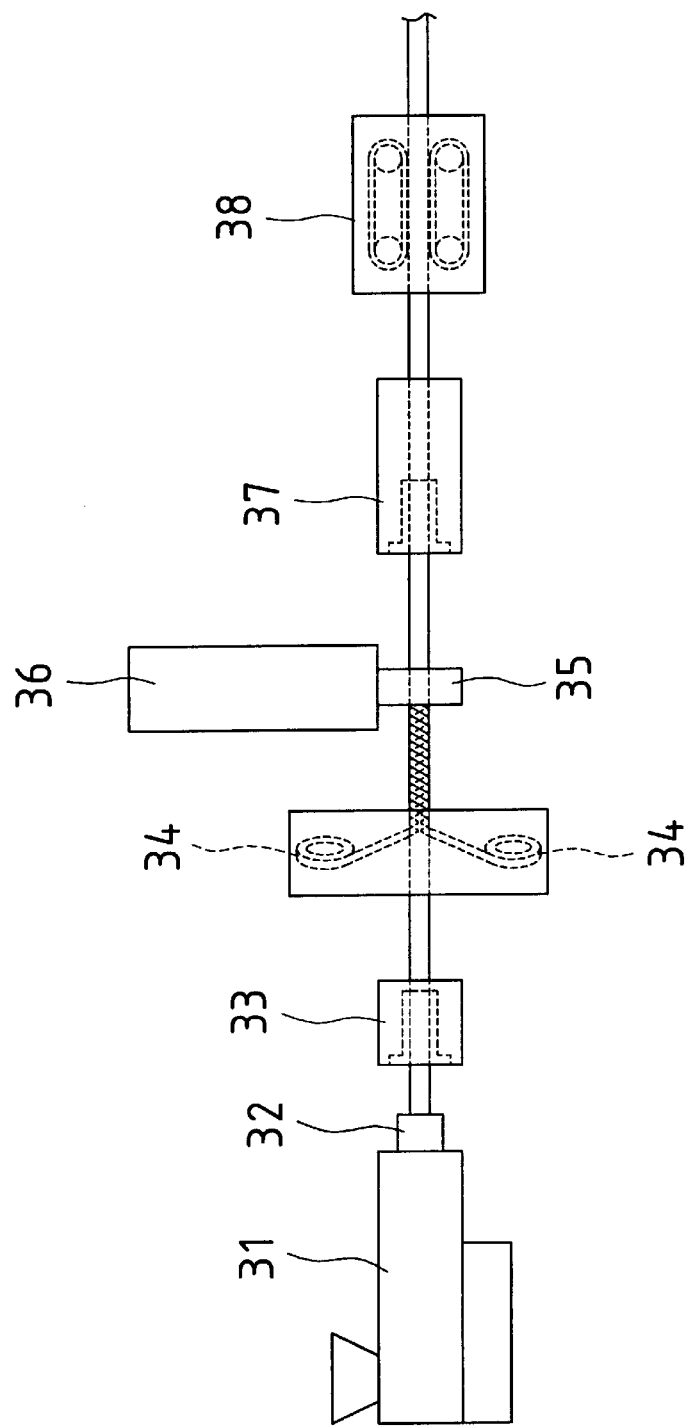
FIG. 4 schematically shows the structure of the apparatus used in Example 6 for manufacturing the high-pressure composite pipe according to the present invention.

FIG. 4 is an illustration of an apparatus for manufacturing the high-pressure composite pipe according to the present Example.

FIG. 4 shows an early-stage single-screw extruder 31 whose end is equipped with an extrusion die 32, a cooling die 33, a pair of spiral winders 34, a late-stage single-screw extruder 36 whose end is equipped with an extrusion coating die 35, a cooling water pool 37, and a takeup machine 38.

In the above-structured apparatus for manufacturing a high-pressure composite pipe, a polyolefin resin was supplied into the early-stage single-screw extruder 31. By means of the extrusion die 32 equipped at its end and the cooling die 33, the resin was molded into an inner layer pipe having a 57 mm outer diameter and a 3-mm-thick wall. Next, two elongated reinforcing layer tapes, obtained by slitting the above-mentioned reinforcing layer sheet into a width of 90 mm, were wound one after another on the inner layer pipe at ±60° relative to the axis of the pipe, using a pair of spiral winders 34. While the tape-wound resin pipe was led through the extrusion coating die 35 of the late-stage single-screw extruder 36, the pipe was coated, as the outer layer, with a polyolefin resin extruded from the late-stage single-screw extruder 36, and later cooled in the cooling water pool 37.

Figure 5:
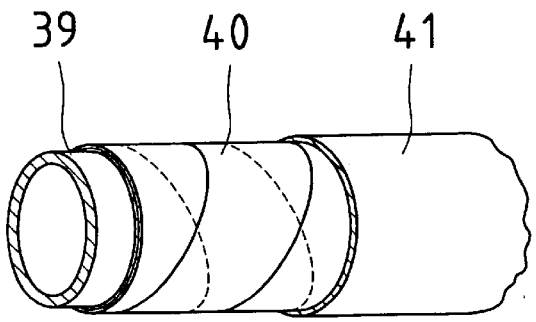
FIG. 5 is a perspective view showing the structure of the high-pressure composite pipe manufactured in Example 6.

The polyolefin resin for the inner layer was a high-density polyethylene (melting point 135° C., melt index MI=0.5 g/10 mins. ) , whereas the polyolefin resin for the outer layer was a straight-chain low-density polyethylene (melting point 125° C., melt index MI=0.7 g/10 mins.) The resins for the inner layer and the outer layer were extruded under the condition where the temperatures of the extruder barrel and the die were both 200° C. As mentioned above, the reinforcing layer sheet was made up of a stretched composite sheet. The above process gave a high-pressure composite pipe (outer diameter 63 mm, wall thickness 6 mm) of the present invention as shown in FIG. 5, in which the reinforcing layer sheet was wound one layer after another at symmetric angles relative to the axis of the pipe, substantially in a gapless manner. In FIG. 5, the inner layer, the reinforcing layer and the outer layer were indicated at 39, 40 and 41, respectively.

Example 7

Manufacture of a Reinforcing Layer Sheet

A reinforcing layer sheet comprising a stretched composite sheet was obtained in the same manner as in Example 1.

Manufacture of a High-pressure Composite Pipe

The operation of Example 6 was followed except for replacing the spiral winders with a sheet braider. As the sheet braider, a braiding machine (braider) which is usually used for the production of a high-pressure hose was utilized by converting its payout apertures from the fiber payout specification to the sheet payout specification. The payout capacity was 32 sheets.

Figure 6:
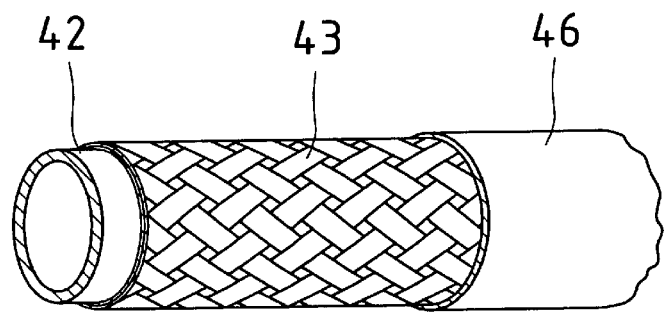
FIG. 6 is a perspective view showing the structure of the high-pressure composite pipe manufactured in Example 7.

Thirty-two (32) elongated reinforcing layer tapes were prepared by slitting the above reinforcing layer sheet into a width of 8 mm. Using the sheet braider, the tapes were wound on the inner layer pipe in a braided manner, at an angle of ±45° each relative to the axis of the pipe. Thereafter, the process of Example 6 was followed to produce a high-pressure composite pipe as illustrated in FIG. 6. In FIG. 6, the inner layer, the reinforcing layer and the outer layer were indicated at 42, 43 and 46, respectively.

Example 8

Manufacture of a Reinforcing Layer Sheet

A reinforcing layer sheet comprising a stretched composite sheet was obtained in the same manner as in Example 1.

Manufacture of a High-pressure Composite Pipe

Figure 7:
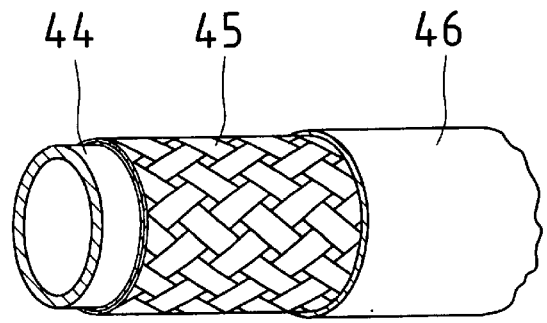
FIG. 7 is a perspective view showing the structure of the high-pressure composite pipe manufactured in Example 8.

Sixteen (16) elongated reinforcing layer tapes were prepared by slitting the above reinforcing layer sheet into a width of 12 mm. Using 16 of the 32 payout apertures in the sheet braider, these tapes were wound on the inner layer pipe in a braided manner, at an angle of ±60° each relative to the axis of the pipe. Thereafter, the process of Example 7 was followed to give a high-pressure composite pipe illustrated in FIG. 7. In FIG. 7, the inner layer, the reinforcing layer and the outer layer were indicated at 44, 45 and 46, respectively.

As described above, each of Examples 6 to 8 provided a high-pressure composite pipe of the present invention, in which the reinforcing layer sheet was wound one layer after another at symmetric angles relative to the axis of the pipe, substantially in a gapless manner. In a one-meter-long segment of the high-pressure composite pipe, the reinforcing layer weighed about 60 grams.

Comparative Example 2

Manufacture of a Reinforcing Layer Sheet

No reinforcing layer sheet was employed.

Manufacture of a High-pressure Composite Pipe

The process of Example 6 was followed without using the spiral winders. After the inner layer was formed by extrusion, the outer layer was extruded from the coating die, without winding the reinforcing layer sheet. Thus obtained was a pipe-shaped element composed of two resin layers.

Comparative Example 3

Manufacture of a Reinforcing Layer Sheet

As the reinforcing layer sheet, use was made of a polyester fiber with a strength of 4.8 g/denier.

Manufacture of a High-pressure Composite Pipe

The resins for the inner layer and the outer layer were the same as those used in Example 1. Following the extrusion forming of the inner layer, the polyester fiber was wound in a braided manner at ±60° relative to the axis of the pipe-shaped element. Similar to Example 8, the weight of the polyester fiber was adjusted to about 60 grams in a one-meter segment of the pipe-shaped element.

Comparative Example 4

Manufacture of a Reinforcing Layer Sheet

As the reinforcing layer sheet, use was made of a stainless steel wire with a strength of 3.0 g/denier.

Manufacture of a High-pressure Composite Pipe

The resins for the inner layer and the outer layer were the same as those used in Example 1. Following the extrusion forming of the inner layer, the stainless steel wire was wound in a braided manner at ±60° relative to the axis of the pipe-shaped element. Similar to Example 8, the weight of the stainless steel wire was adjusted to about 60 grams in a one-meter segment of the pipe-shaped element.

Example 9

Manufacture of a Reinforcing Layer Sheet

A reinforcing layer sheet was manufactured in the same manner as in Example 1, except that the adhesive sheet was not laminated.

Manufacture of a High-pressure Composite Pipe

Figure 8:
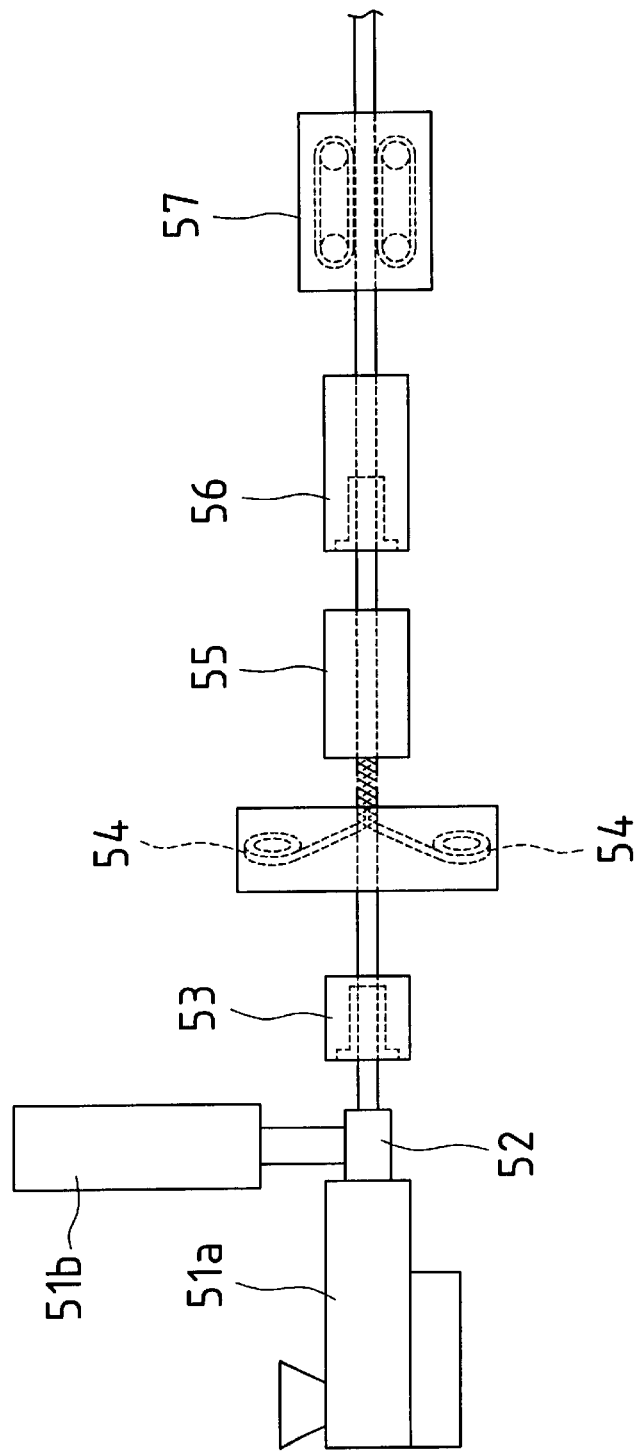
FIG. 8 schematically shows the structure of the apparatus used in Example 9 for manufacturing the high-pressure composite pipe according to the present invention.

FIG. 8 is an illustration of an apparatus for manufacturing the high-pressure composite pipe according to this Example.

FIG. 8 shows a first single-screw extruder 51a, a second single-screw extruder 51b, a two-layer two-component extrusion die 52 located at their ends, a cooling die 53, a pair of spiral winders 54, a hot air oven 55, a cooling water pool 56, and a takeup machine 57.

In the above-structured apparatus for manufacturing a high-pressure composite pipe, polyolefin resins were supplied into the first single-screw extruder 51a and the second single-screw extruder 51b. By means of the extrusion die 52 equipped at their ends and the cooling die 53, the resins were molded into a double pipe having a 60 mm outer diameter and a 3-mm-thick wall. In this double pipe, the internal part constituted a 2.7-mm-thick inner layer of high-density polyethylene, and the external part established a 0.3-mm-thick adhesion layer. Next, two elongated reinforcing layer tapes, obtained by slitting the above reinforcing layer sheet into a width of 90 mm, were wound one after another on the double pipe at ±60° each relative to the axis of the pipe, using a pair of spiral winders 54. The tape-wound resin pipe was carried through the hot air oven 55 and heated to the surface temperature of 130° C., and then cooled in the cooling water pool 56.

Figure 9:
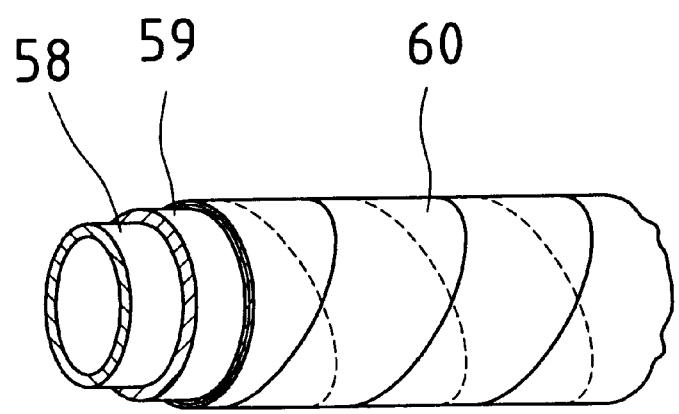
FIG. 9 is a perspective view showing the structure of the high-pressure composite pipe manufactured in Example 9.

The above process gave a high-pressure composite pipe of the present invention as shown in FIG. 9, in which the reinforcing layer sheet was wound one layer after another at symmetric angles relative to the axis of the pipe, substantially in a gapless manner. In FIG. 9, the inner layer, the adhesion layer and the reinforcing layer were indicated at 58, 59 and 60, respectively.

The adhesion layer was made by using an adhesive polyethylene (Admer HF500, manufactured by Mitsui Chemicals, Inc.). For the inner layer and the adhesion layer, high-density polyethylene resins were extruded under the condition where the temperatures of the extruder barrel and the die were both 200° C.

Example 10

Manufacture of a Reinforcing Layer Sheet

A reinforcing layer sheet comprising a stretched composite sheet was obtained in the same manner as in Example 1, except that the lamination was applied on both surfaces instead of one surface.

Manufacture of a High-pressure Composite Pipe

A high-pressure composite pipe shown in FIG. 9 was manufactured in the same manner as in Example 9, except that the reinforcing layer sheet was made of the stretched composite sheet obtained as above.

Example 11

Manufacture of a Reinforcing Layer Sheet

A reinforcing layer sheet was manufactured in the same manner as in Example 1, except for omitting the lamination of the adhesive sheet.

Manufacture of a High-pressure Composite Pipe

Figure 10:
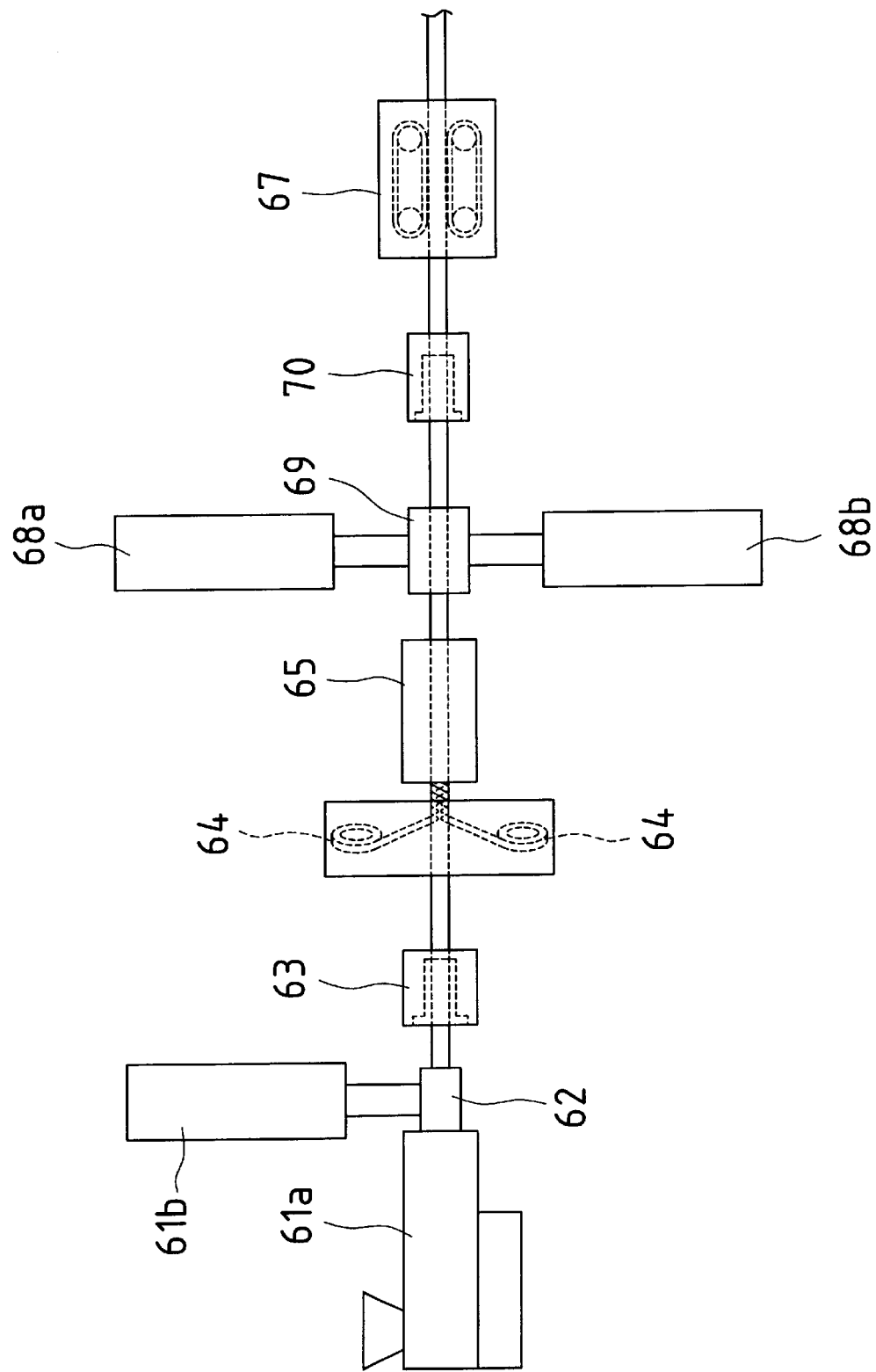
FIG. 10 schematically shows the structure of the apparatus used in Example 11 for manufacturing the high-pressure composite pipe according to the present invention.

FIG. 10 is an illustration of an apparatus for manufacturing the high-pressure composite pipe according to this Example.

FIG. 10 shows a first single-screw extruder 61a, a second single-screw extruder 61b, a two-layer two-component extrusion die 62 located at their ends, a cooling die 63, a pair of spiral winders 64, a hot air oven 65, a pair of late-stage single-screw extruders 68a, 68b, a two-layer two-component extrusion coating die 69 located at their ends, a cooling die 70, and a takeup machine 67.

In the above-structured apparatus for manufacturing a high-pressure composite pipe, polyolefin resins were supplied into the first single-screw extruder 61a and the second single-screw extruder 61b. By means of the extrusion die 62 equipped at their ends and the cooling die 63, the resins were molded into a double pipe having a 60 mm outer diameter and a 3-mm-thick wall. In this double pipe, the internal part constituted a 2.7-mm-thick inner layer of high-density polyethylene, and the external part established a 0.3-mm-thick inner adhesion layer. Next, two elongated reinforcing layer tapes, obtained by slitting the above reinforcing layer sheet into a width of 60 mm, were wound one after another on the double pipe at ±60° each relative to the axis of the pipe, using a pair of spiral winders 64. The tape-wound resin pipe was carried through the hot air oven 65 and heated to the surface temperature of 130° C. Thus obtained was a reinforcing layer-wound composite pipe.

Thereafter, by means of the two-layer two-component extrusion coating die 69 equipped at the ends of a pair of late-stage single-screw extruders 68a, 68b, and the cooling die 70, two species of resins were extruded in two layers to coat the reinforcing layer-wound composite pipe, and thereby formed a double layer. In this double layer, the internal part constituted a 0.3-mm-thick outer adhesion layer, and the external part established a 1.2-mm-thick outer layer of high-density polyethylene. The outer layer and the outer adhesion layer were made of the high-density polyethylene and the adhesive polyethylene used in Example 10, respectively. The resins for the outer layer and the adhesion layer were extruded under the condition where the temperatures of the extruder barrel and the die were both 200° C.

Figure 11:
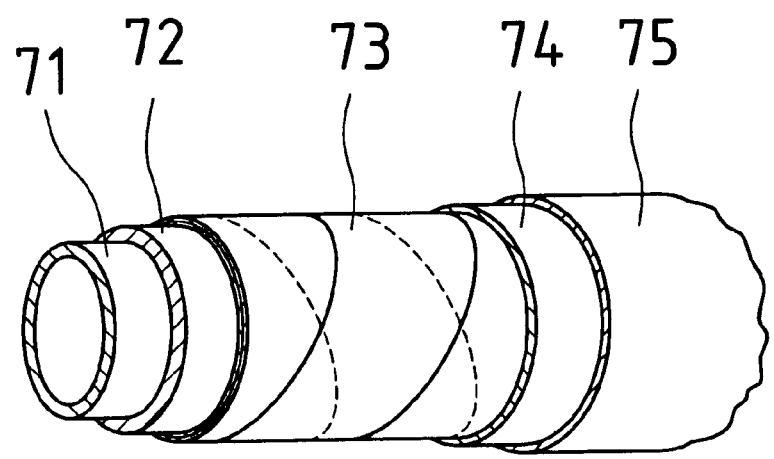
FIG. 11 is a perspective view showing the structure of the high-pressure composite pipe manufactured in Example 11.

This process gave a high-pressure composite pipe (outer diameter 63 mm, wall thickness 4.5 mm) of the present invention, as shown in FIG. 11. FIG. 11 illustrates the inner layer 71, the inner adhesion layer 72, the reinforcing layer 73, the outer adhesion layer 74 and the outer layer 75.

Example 12

Manufacture of a Reinforcing Layer Sheet

A reinforcing layer sheet comprising a stretched composite sheet was obtained in the same manner as in Example 10.

Manufacture of a High-pressure Composite Pipe

A high-pressure composite pipe shown in FIG. 11 was obtained in the same manner as in Example 11.

As described above, each of Examples 9 to 12 provided a high-pressure composite pipe (outer diameter 63 mm, wall thickness 4.5 mm) of the present invention, in which the reinforcing layer sheet was wound one layer after another at symmetric angles relative to the axis of the pipe, substantially in a gapless manner.

Comparative Example 5

The high-density polyethylene pipe with a 60 mm outer diameter and a 3-mm-thick wall, which was molded in Example 9 as the inner layer, was subjected to the performance evaluation tests.

Example 13

Manufacture of a Reinforcing Layer Sheet

A reinforcing layer sheet comprising a stretched composite sheet was obtained in the same manner as in Example 10.

Manufacture of a High-pressure Composite Pipe

Figure 12:
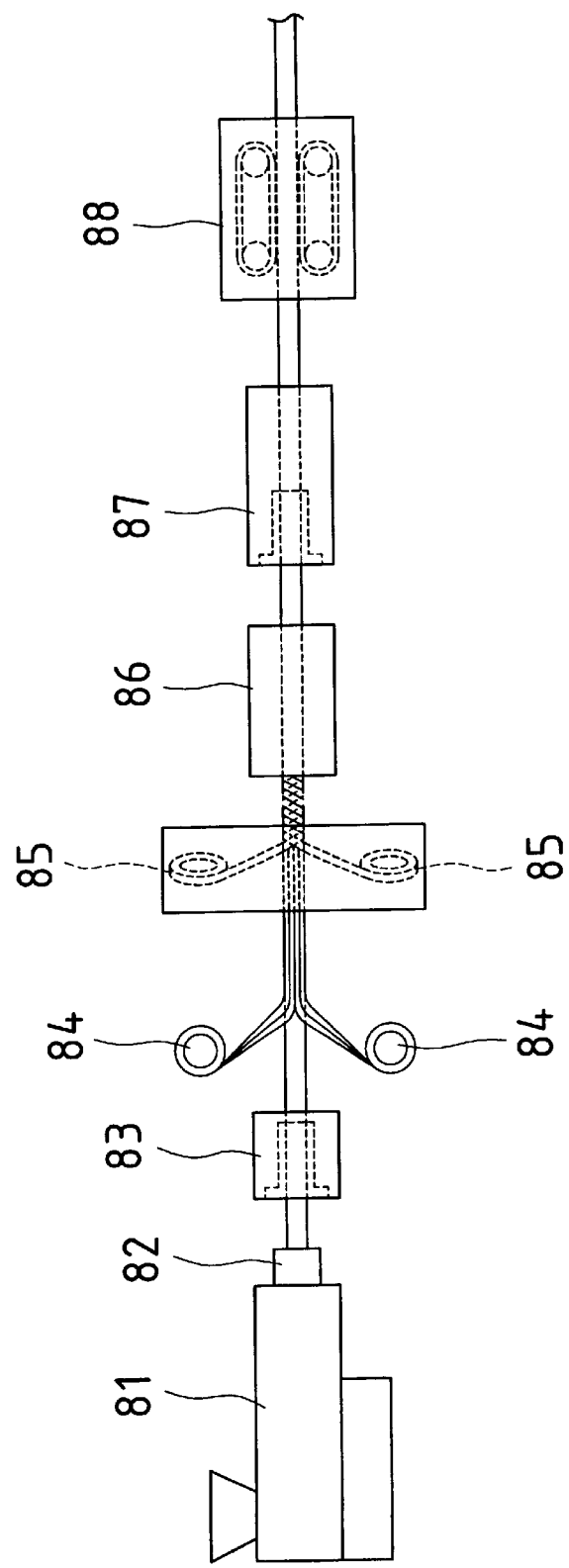
FIG. 12 schematically shows the structure of the apparatus used in Example 13 for manufacturing the high-pressure composite pipe according to the present invention.

FIG. 12 is an illustration of an apparatus for manufacturing the high-pressure composite pipe according to this Example.

FIG. 12 shows a single-screw extruder 81 whose end is equipped with an extrusion die 82, a cooling die 83, a pair of payout rolls 84, a pair of spiral winders 85, a far-infrared heating oven 86, a cooling die 87, and a takeup machine 88.

In the above-structured apparatus for manufacturing a high-pressure composite pipe, a thermoplastic polyolefin resin was supplied into the single-screw extruder 81. By means of the extrusion die 82 equipped at its end and the cooling die 83, the resin was molded into an inner layer pipe having a 60 mm outer diameter and a 3-mm-thick wall. Next, stretched composite sheets with a width of 94.2 mm were fed from a pair of payout rolls 84 and laminated such that the stretching direction was oriented along the axis of the pipe. Two elongated reinforcing layer tapes, obtained by slitting the above reinforcing layer sheet into a width of 90 mm, were wound one after another on the inner layer pipe at ±60° each relative to the axis of the pipe, using a pair of spiral winders 85. The tape-wound resin pipe was carried through the far-infrared heating oven 86 and heated to the surface temperature of 130° C. Thereafter, the pipe was cooled in the cooling die 87 to give a high-pressure composite pipe. As the thermoplastic polyolefin resin for the inner layer, use was made of a high-density polyethylene (melting point 135° C., melt index MI=0.5 g/10 mins.), which was extruded under the condition where the temperatures of the extruder barrel and the die were both 200° C. As mentioned above, the reinforcing layer sheet was made up of a stretched composite sheet.

Figure 13:
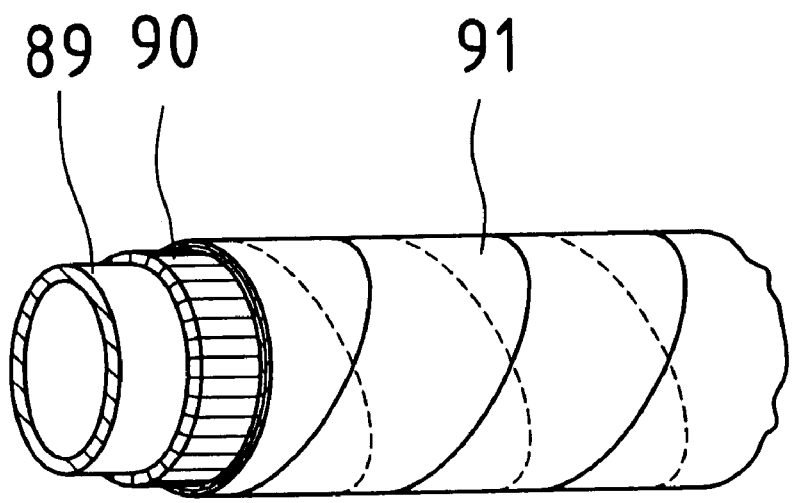
FIG. 13 is a perspective view showing the structure of the high-pressure composite pipe manufactured in Example 13.

The above process gave a high-pressure composite pipe of the present invention as shown in FIG. 13, in which the reinforcing layer sheet was wound such that one layer was laid along the axis of the pipe and each one layer was laid at symmetric angles relative to the axis of the pipe and substantially in a gapless manner. FIG. 13 illustrates the inner layer 89, the reinforcing layer 90 for axial reinforcement, and the reinforcing layer 91 chiefly for circumferential reinforcement.

Example 14

Manufacture of a Reinforcing Layer Sheet

A reinforcing layer sheet comprising a stretched composite sheet was obtained in the same manner as in Example 1.

Manufacture of a High-pressure Composite Pipe

Figure 14:
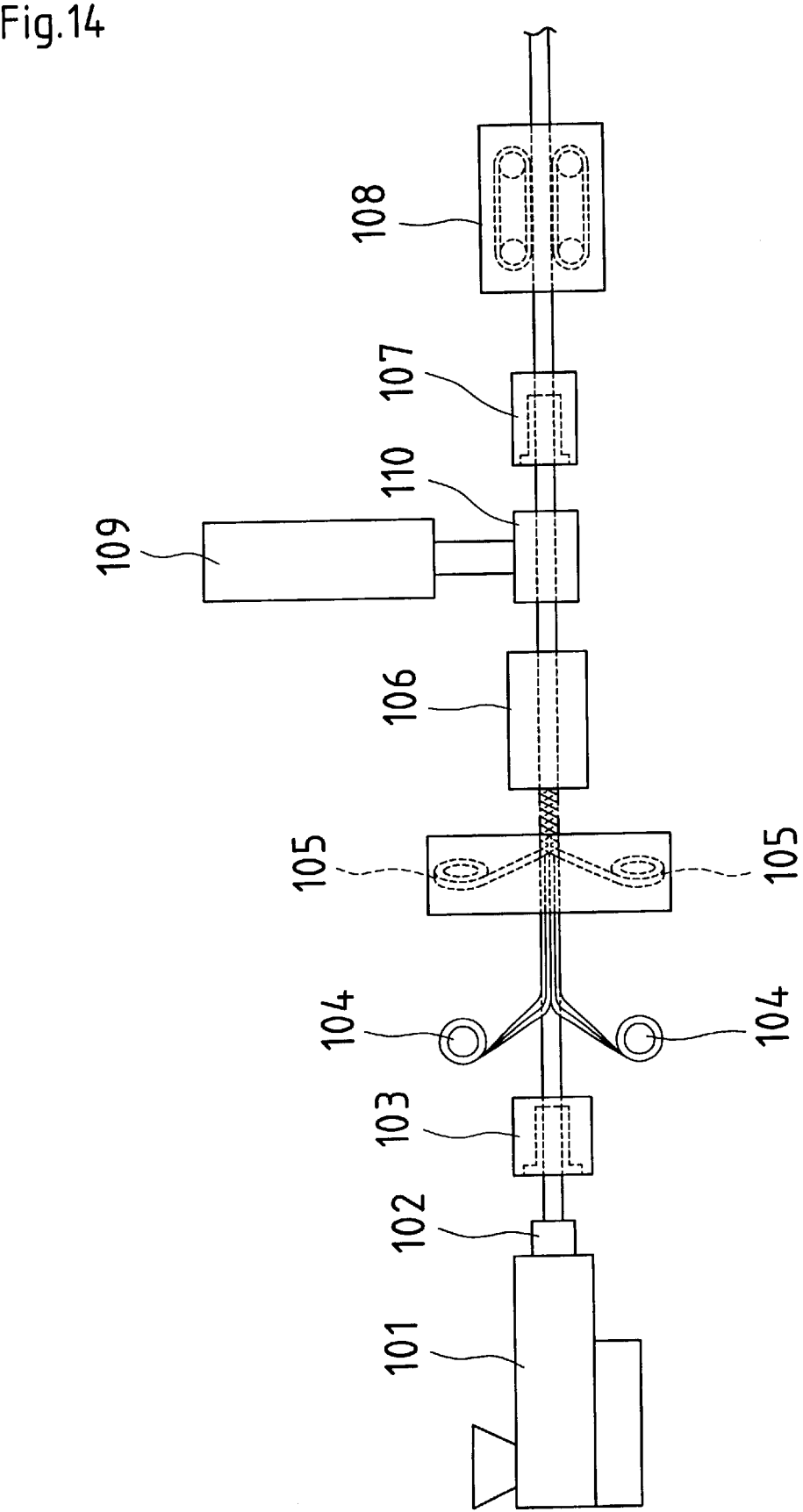
FIG. 14 schematically shows the structure of the apparatus used in Example 14 for manufacturing the high-pressure composite pipe according to the present invention.

FIG. 14 is an illustration of an apparatus for manufacturing the high-pressure composite pipe according to this Example.

FIG. 14 shows an early-stage single-screw extruder 101 whose end is equipped with an extrusion die 102, a cooling die 103, payout rolls 104, a pair of spiral winders 105, a far-infrared heating oven 106, a late-stage single-screw extruder 109 whose end is equipped with an extrusion die 110, a cooling die 107, and a takeup machine 108.

In the above-structured apparatus for manufacturing a high-pressure composite pipe, a thermoplastic polyolefin resin was supplied into the early-stage single-screw extruder 101. By means of the extrusion die 102 equipped at the end thereof and the cooling die 103, the resin was molded into an inner layer pipe having a 60 mm outer diameter and a 3-mm-thick wall. Next, fir stretched composite sheets with a width of 94.2 mm were fed from the payout rolls 104 and laminated such that the stretching direction was oriented along the axis of the pipe. Two elongated reinforcing layer tapes, obtained by slitting the above reinforcing layer sheet into a width of 90 mm, were wound one after another on the inner layer pipe at ±60° each relative to the axis of the pipe, using a pair of spiral winders 105. The tape-wound resin pipe was carried through the far-infrared heating oven 106 and heated to the surface temperature of 130° C. Thereafter, while the tape-wound resin pipe was led through the extrusion coating die 110 of the late-stage single-screw extruder 109, the pipe was coated, as the outer layer, with a polyolefin resin extruded from the late-stage single-screw extruder 109, and later cooled in the cooling die 107 to give a high-pressure composite pipe.

As the thermoplastic polyolefin resin for the inner and outer layers, use was made of a high-density polyethylene (melting point 135° C., melt index MI=0.5 g/10 mins.), which was extruded under the condition where the temperatures of the extruder barrel and the die were both 200° C. As mentioned above, the reinforcing layer sheet was made up of a stretched composite sheet.

Figure 15:
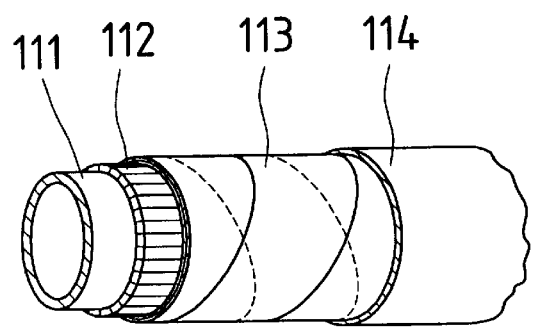
FIG. 15 is a perspective view showing the structure of the high-pressure composite pipe manufactured in Example 14.

The above process resulted in a high-pressure composite pipe of the present invention as shown in FIG. 15, in which the reinforcing layer sheet was wound such that one layer was laid along the axis of the pipe and each one layer was laid at symmetric angles relative to the axis of the pipe and substantially in a gapless manner. FIG. 15 illustrates the inner layer 111, the reinforcing layer 112 for axial reinforcement, the reinforcing layer 113 chiefly for circumferential reinforcement, and the outer layer 114.

As described above, each of Examples 13 and 14 provided a high-pressure composite pipe (outer diameter 63 mm, wall thickness 4.5 mm) of the present invention, in which the reinforcing layer sheet was wound such that one layer was laid along the axis of the pipe and each one layer was laid at a symmetric angle relative to the axis of the pipe and substantially in a gapless manner.

Comparative Example 6

The high-density polyethylene pipe having a 60 mm outer diameter and a 3-mm-thick wall, which was molded in Example 13 as the inner layer, was subjected to the performance evaluation tests.

Performance Evaluation Tests

The high-pressure composite pipes obtained in Examples and Comparative Examples were tested for the following items to evaluate their performance.

a) Internal Pressure Destructive Test

Figure 16:
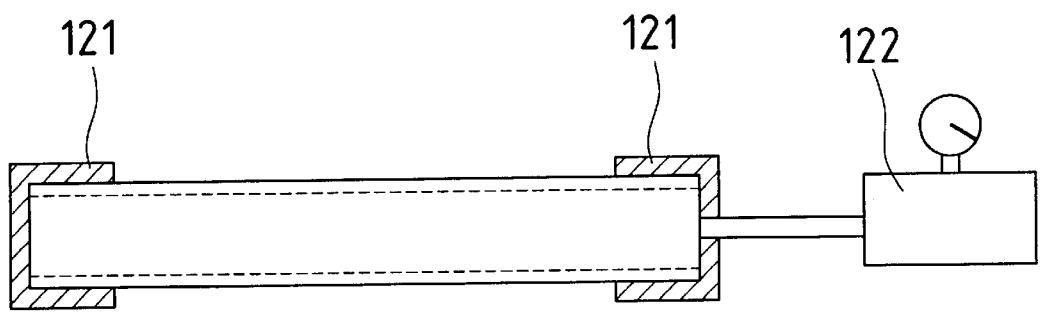
FIG. 16 schematically shows the measurement apparatus for evaluation of the pipe-shaped composite elements manufactured in Examples and Comparative Examples.

Using a measuring apparatus illustrated in FIG. 16, a 1000-mm-long high-pressure composite pipe was fixed at both ends by measurement jigs 121. Pressure was applied inside the pipe by a pump 122 to measure a destructive internal pressure of the pipe. The pressure was raised at a rate of 5 kgf/min., until the pressure could not be raised any further or the pressure dropped. The internal pressure measured at that moment was determined as the destructive internal pressure.

b) Internal Pressure Creep Rupture Test

Using the apparatus for the internal pressure destructive test, the high-pressure composite pipe was continuously subjected to an internal pressure of 12 kgf/cm2 by 80° C. water under an 80° C. atmosphere. Under these conditions, each pipe was measured for the pressure endurance time.

c) Pipe Bending Test

Each pipe was subjected to the three-point bending test. The distance between the supports was 1000 mm.

The test results were compiled in Tables 1 to 4.

TABLE 1

|  | Winding Method | Winding Angle | Destructive Internal Pressure (kgf/cm$^2$) | Internal Pressure Endurance Time (hr) |
|---|---|---|---|---|
| Ex. 1 | Winding | 60° | 66 | ≧200 |
| Ex. 2 | Winding | 60° | 67 | ≧200 |
| Ex. 3 | Braiding | 45° | 60 | ≧200 |
| Ex. 4 | Braiding | 60° | 69 | ≧200 |
| Ex. 5 | Braiding | 60° | 56 | ≧200 |
| Comp. Ex. 1 | N/A | N/A | 38 | 105 |

Table 1 confirmed that the high-pressure composite pipes of the present invention were excellent in destructive internal pressure property, which indicated their high internal pressure resistance.

TABLE 2

|  | Reinforcing Layer Material | Winding Method | Winding Angle | Destructive Internal Pressure (kgf/cm$^2$) | Internal Pressure Endurance Time (hr) |
|---|---|---|---|---|---|
| Ex. 6 | Stretched PE sheet | Winding | 60° | 70 | ≧200 |
| Ex. 7 | Stretched PE sheet | Braiding | 45° | 62 | ≧200 |
| Ex. 8 | Stretched PE sheet | Braiding | 60° | 73 | ≧200 |
| Comp. Ex. 2 | N/A | N/A | — | 38 | 105 |
| Comp. Ex. 3 | Polyester fiber | Braiding | 60° | 42 | 87 |
| Comp. Ex. 4 | Stainless steel wire | Braiding | 60° | 47 | 70 |

PE: high-density polyethylene

Table 2 proved that the high-pressure composite pipes of the present invention were excellent in destructive internal pressure property, which indicated their high internal pressure resistance. During the internal pressure creep rupture test, the pipe-shaped element of Comparative Example 3 cracked due to weeping from between stiches of the polyester fiber, and the pipe-shaped element of Comparative Example 4 broke due to the water penetrating from the pipe ends into the interface between the stainless steel wire and the outer layer resin. On the contrary, none of the high-pressure composite pipes of Examples suffered from any such rupture.

TABLE 3

|  | Winding Method | Winding Angle | Destructive Internal Pressure (kgf/cm$^2$) | Internal Pressure Endurance Time (hr) |
|---|---|---|---|---|
| Ex. 9 | Winding | 60° | 74 | ≧200 |
| Ex. 10 | Winding | 60° | 76 | ≧200 |
| Ex. 11 | Winding | 60° | 76 | ≧200 |
| Ex. 12 | Winding | 60° | 80 | ≧200 |
| Comp. Ex. 5 | N/A | N/A | 38 | 105 |

Table 3 confirmed that the high-pressure composite pipes of the present invention were excellent in destructive internal pressure property, which indicated their high internal pressure resistance.

TABLE 4

|  | Winding Method | Winding Angle | Destructive Internal Pressure (kgf/cm$^2$) | Internal Pressure Endurance Time (hr) | Modulus of Bending Elasticity (kgf/cm$^2$) |
|---|---|---|---|---|---|
| Ex. 13 | Winding | 60° | 65 | ≧200 | 13000 |
| Ex. 14 | Winding | 60° | 71 | ≧200 | 13500 |
| Comp. Ex. 6 | N/A | N/A | 38 | 105 | 7500 |

Table 4 proved that the high-pressure composite pipes of the present invention were excellent in destructive internal pressure property, which indicated their high internal pressure resistance.

The high-pressure composite pipes of the present invention can be embodied in further different ways as described below.

Figure 17:
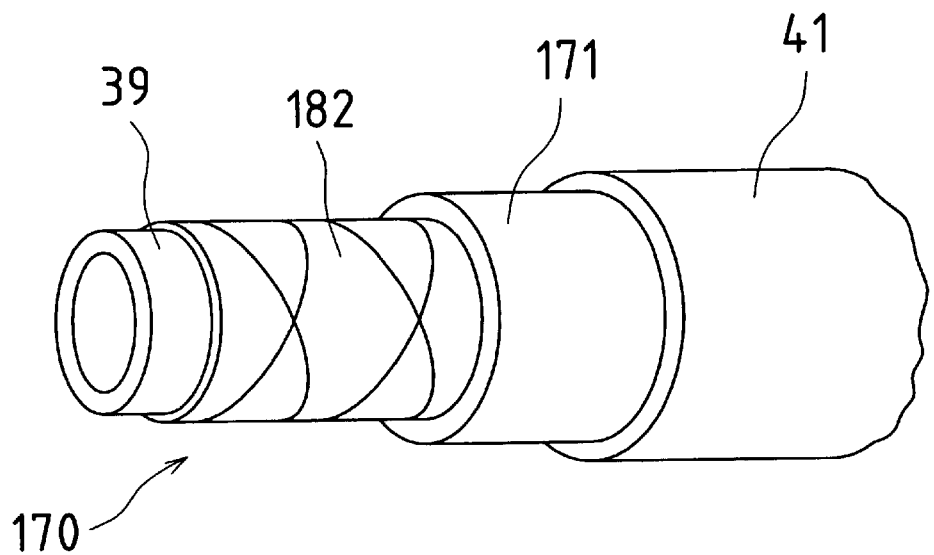
FIG. 17 is a perspective view showing the structure of the high-pressure composite pipe manufactured in another embodiment of the present invention.

FIG. 17 schematically shows the structure of an embodiment which corresponds to the high-pressure composite pipe of Invention 6.

A high-pressure composite pipe 170 comprises a pipe-shaped inner layer 39 made of a polyethylene resin, a reinforcing layer 182 formed by spirally winding a stretched polyethylene resin sheet (i.e. a stretched polyolefin resin sheet) on an external circumferential surface of the inner layer 39, an insulating layer 171 made of a foamable polyethylene resin and laminated on the reinforcing layer 182, and an outer layer 41 made of a polyethylene resin and laminated on the insulating layer 171.

The reinforcing layer 182 laminated on the inner layer 39 has a two-layer structure, wherein a stretched polyethylene resin sheet, prepared in a strip of proper width, is spirally wound at an inclination angle between 30° and 90° relative to the axis of the inner layer 39, and another stretched polyethylene resin sheet is spirally wound thereon in the reverse inclination direction.

Owing to the insulating layer 171 which is made of a polyethylene resin foam and interposed between the reinforcing layer 182 and the outer layer 41, the high-pressure composite pipe 170 of this structure acquires a remarkable insulating property, thereby being suitable for use as a hot-water pipe or water supply pipe.

Figure 18:
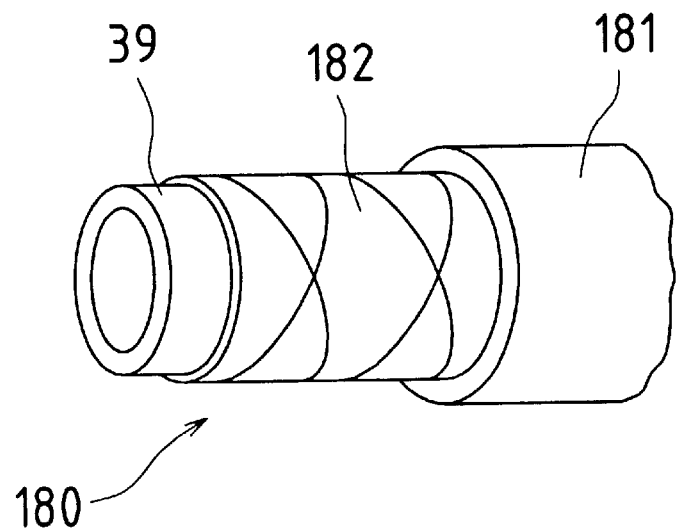
FIG. 18 is a perspective view showing the structure of the high-pressure composite pipe manufactured in yet another embodiment of the present invention.

FIG. 18 schematically shows the structure of an embodiment which corresponds to the high-pressure composite pipe of Invention 9.

A high-pressure composite pipe 180 comprises a pipe-shaped inner layer 39 made of a polyethylene resin, a reinforcing layer 182 formed by spirally winding a stretched polyolefin resin sheet on an external circumferential surface of the inner layer 39, and an outer layer 181 made of a polyethylene resin foam and laminated on the reinforcing layer 182.

The reinforcing layer 182 laminated on the inner layer 39 has a two-layer structure, wherein a stretched polyethylene resin sheet, prepared in a strip of proper width, is spirally wound at an inclination angle between 300 and 900 relative to the axis of the inner layer 39, and another stretched polyethylene resin sheet is spirally wound thereon in the reverse inclination direction.

The high-pressure composite pipe 180 of the above structure is manufactured in the following manner.

First of all, to form the inner layer 39, a polyethylene resin is extruded in pipe form by a single-screw extruder. Then, using spiral winders, stretched polyethylene resin sheets, prepared in a strip of predetermined width, are spirally wound around the external circumferential surface of the inner layer 39 to provide the reinforcing layer 182. The stretched polyethylene resin sheet is made by stretching a high-density polyethylene sheet, under heating, at a stretching ratio of about 30, followed by a crosslinking treatment.

After the inner layer 39 of a polyethylene resin is laminated with the reinforcing layer 182 made of a stretched polyethylene resin sheet, the laminate is introduced into an extrusion coating die. While the laminate passes through the extrusion coating die, a foamable polyethylene resin is extruded into the extrusion coating die and allowed to foam. Thus formed is the outer layer 181, made of a polyethylene resin foam, which coats the reinforcing layer 182. When the laminate comes out of the extrusion coating die, it is cooled in the cooling water pool to give the high-pressure composite pipe 180 shown in FIG. 18.

In the obtained high-pressure composite pipe 180, the polyethylene inner layer 39 is spirally wrapped by the stretched polyethylene resin sheet having a remarkable tensile strength, whereby the inner layer 39 is fortified by the reinforcing layer 182. Besides, owing to the outer layer 181 which is made of a polyethylene resin foam with a superior insulating property, the pipe can be used as a hot-water pipe or as a water supply pipe. During the winter in the cold region, such a water supply pipe can prevent water therein from freezing, without an aid of a heat insulating material.

In addition, the outer layer 181 made of a polyethylene resin foam covers and protects the reinforcing layer 182 which is formed by spirally winding the stretched polyethylene resin sheet. Since the reinforcing layer 182 is not directly exposed to an external pressure, the reinforcing layer 182 is allowed to reinforce the inner layer 39 in a stable manner over a long period.

The outer layer 181 of the high-pressure composite pipe 180 may be made of various synthetic resin foams, instead of the polyethylene resin foam. Nevertheless, when the polyethylene resin foam is of the same species as the polyethylene resin for the inner layer 39 and the stretched polyethylene resin sheet for the reinforcing layer 182, the high-pressure composite pipe 180 can be readily recycled.

In this embodiment, a polyethylene resin foam is utilized exclusively for the outer layer 181. Alternatively, the inner layer 39 may be composed of a polyethylene resin foam. In the latter case, the inner layer 39 made of a highly insulative polyethylene resin foam can be also used suitably in a pipe arrangement for water or hot-water supply.

Further, both the inner layer 39 and the outer layer 181 may be made of a polyethylene resin foam. This structure apparently enhances the insulating effect to an extended degree.

Figure 19:
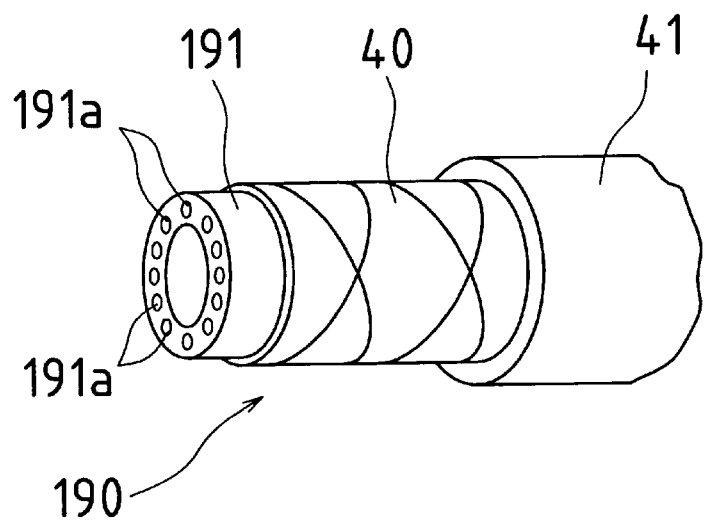
FIG. 19 is a perspective view showing the structure of the high-pressure composite pipe manufactured in another different embodiment of the present invention.
Figure 20:
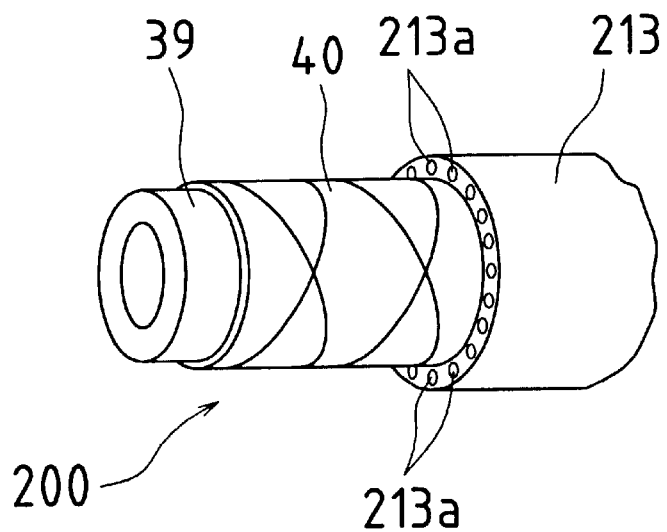
FIG. 20 is a perspective view showing the structure of the high-pressure composite pipe manufactured in still another embodiment of the present invention.
Figure 21:
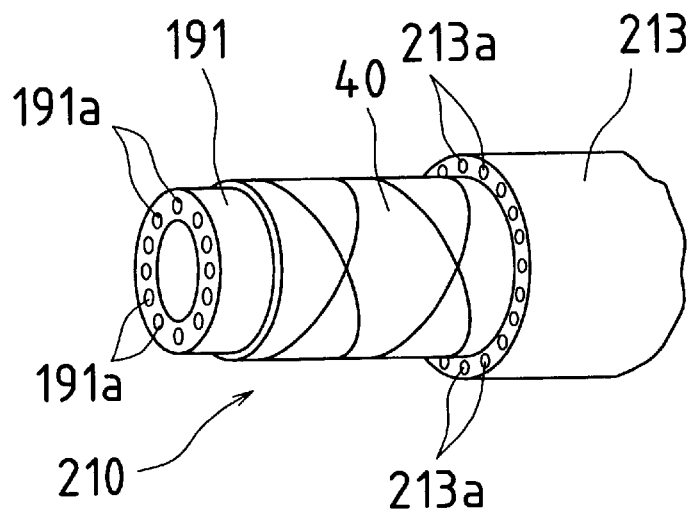
FIG. 21 is a perspective view showing the structure of the high-pressure composite pipe manufactured in further another embodiment of the present invention.

FIG. 19 to FIG. 21 schematically show the structures of embodiments which correspond to the high-pressure composite pipe of Invention 10.

A high-pressure composite pipe 190, shown in FIG. 19, comprises a pipe-shaped inner layer 191 made of a polyethylene resin, a reinforcing layer 40 obtained by spirally winding a stretched polyethylene resin sheet (i.e. a stretched polyolefin resin sheet) on an external circumferential surface of the inner layer 191, and an outer layer 41 made of a polyethylene resin and laminated on the reinforcing layer 40.

The inner layer 191 of a polyethylene resin includes a plurality of hollow portions 191a, which extend along the axis as equally spaced along the circumference.

The reinforcing layer 40 laminated on the inner layer 191 has a two-layer structure, wherein a stretched polyethylene resin sheet, prepared in a strip of proper width, is spirally wound at an inclination angle between 30° and 90° relative to the axis of the inner layer 191, and another stretched polyethylene resin sheet is spirally wound thereon in the reverse inclination direction.

The high-pressure composite pipe 190 of the above structure is manufactured in the following manner.

To begin with, a polyethylene resin is extruded in pipe form by a single-screw extruder to form the inner layer 191, through which a plurality of hollow portions 191a extend along the axis as equally spaced along the circumference. Then, using spiral winders, a stretched polyethylene resin sheet, prepared in a strip of predetermined width, is wound spirally at a given angle around the external circumferential surface of the inner layer 191. On top of this, another stretched polyethylene resin sheet is wound spirally in the reverse inclination direction to provide the reinforcing layer 40. The stretched polyethylene resin sheet is made by stretching a high-density polyethylene sheet, under heating, at a stretching ratio of about 30, followed by a crosslinking treatment.

After the inner layer 191 of a polyethylene resin is laminated with the reinforcing layer 40 made of a stretched polyethylene resin sheet, the laminate is introduced into an extrusion coating die. While the laminate passes through the extrusion coating die, the reinforcing layer 40 is coated with a polyethylene resin, as the outer layer 41, which is extruded into the extrusion coating die. When the laminate comes out of the extrusion coating die, it is cooled in the cooling water pool to give the high-pressure composite pipe 190 shown in FIG. 19.

In the obtained high-pressure composite pipe 190, the polyethylene inner layer 191 is spirally wrapped by the stretched polyethylene resin sheet having a remarkable tensile strength, whereby the inner layer 191 is fortified with the reinforcing layer 40. Besides, while a plurality of hollow portions 191a extend along the axis as equally spaced along the circumference, reinforcement is provided by partitions between adjacent hollow portions 191a. Consequently, the high-pressure composite pipe 190 acquires an excellent pressure resistance, which wipes out a fear of rupture even when a high-pressure fluid flows in the inner layer 191. Further, due to the plurality of hollow portions 191a formed in the inner layer 191, the high-pressure composite pipe 190 has its weight reduced on the whole, thereby ensuring easy handlability. Further, in terms of economical production, the inner layer 191 requires a less amount of polyethylene resin. In another aspect, the reinforcing layer 40, prepared by spirally winding the stretched polyethylene resin sheet, is covered and protected by the outer layer 41 made of a polyethylene resin. Free from direct exposure to an external pressure, the reinforcing layer 40 is prevented from rupture or the like. Furthermore, since the inner layer 191, the reinforcing layer 40 and the outer layer 41 are made of the same species of polyethylene resin, this high-pressure composite pipe 190 is readily recyclable and, compared with a vinyl chloride resin pipe, superior in quakeproof property.

FIG. 20 schematically illustrates the structure of another embodiment which corresponds to the high-pressure composite pipe of Invention 10.

In a high-pressure composite pipe 200, the pipe-shaped inner layer 39 made of a polyethylene resin contains no hollow portions. Instead, an outer layer 213 of polyethylene resin is provided with a plurality of hollow portions 213a which extend along the axis and which are spaced along the circumference at an equal distance. Except this modification, the structure is the same as that of the high-pressure composite pipe 190 shown in FIG. 19.

In the high-pressure composite pipe 200 of this structure, owing to the hollow portions 213a which locate inside the outer layer 213 for protecting the reinforcing layer 40, the outer layer 213 is obtainable in a reduced weight using a less amount of resin, which results in economical production. In addition, partitions between adjacent hollow portions 213a provide reinforcement, whereby the outer layer 213 does not break under an external pressure.

FIG. 21 schematically shows the structure of yet another embodiment which corresponds to the high-pressure composite pipe of Invention 10.

In a high-pressure composite pipe 210, the inner layer 191 of a polyethylene resin includes a plurality of hollow portions 191a extending along the axis and spaced along the circumference at an equal distance, and the outer layer 213 of a polyethylene resin has a plurality of hollow portions 213a extending along the axis and spaced along the circumference at an equal distance. Between the inner layer 191 and the outer layer 213, there is the reinforcing layer 40 formed by spirally winding a stretched polyethylene resin sheet on the inner layer 191.

In comparison with the former high-pressure composite pipes 190 and 200, the high-pressure composite pipe 210 weighs less and can be manufactured more economically.

Figure 22:
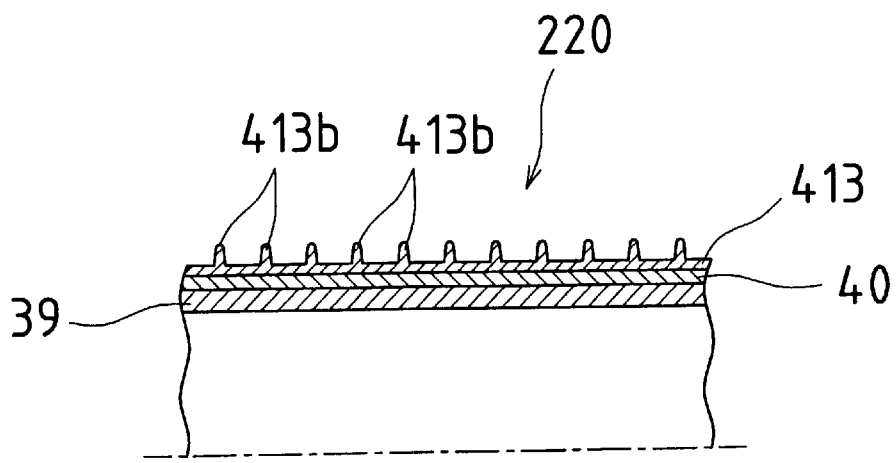
FIG. 22 is a sectional view showing the structure of the high-pressure composite pipe manufactured in a yet further embodiment of the present invention.

FIG. 22 is a sectional view showing an embodiment which corresponds to the high-pressure composite pipe of Invention 11.

In a high-pressure composite pipe 220, the external circumferential surface of the outer layer 413 is provided with a plurality of reinforcing ribs 413b, each of which projects radially and circumferentially and is equally spaced from the others along the axis. No hollow portions are formed in the inner layer 39 and the outer layer 413. Except for this modification, its structure is the same as the high-pressure composite pipe 190 shown in FIG. 19.

This high-pressure composite pipe 220 allows the outer layer 413 to be fortified by the reinforcing ribs 413b located on the external circumferential surface of the outer layer 413. Hence, the outer layer 413 is unlikely to break under an external pressure. As a result, the outer layer 413 covers and protects the intermediate layer 40 made of a stretched polyethylene resin sheet in a stable state over a long time. In the meantime, the reinforcing layer 40 can exhibit its reinforcing effect for the inner layer 39 over a prolonged period.

With regard to the above high-pressure composite pipes 190, 200, 210 and 220, it is favorable that the inner layer and the outer layer should be made of the same polyolefin resin as the stretched polyolefin resin sheet for the reinforcing layer 40, which results in good adhesion to the reinforcing layer 40. This arrangement also simplyfies the recycling of the high-pressure composite pipe itself. If each of the inner layers 39, 191 and the outer layers 41, 213, 413 is composed of a polyethylene resin and the reinforcing layer 40 is made of a stretched polyolefin resin sheet, it is advisable to preform a polyethylene resin layer on either or both surfaces of the stretched polyethylene resin sheet for the intermediate layer 40. This arrangement secures tight adhesion to the polyethylene resin which forms each of the inner layers 39, 191 and the outer layers 41, 213, 413.

In addition, if the inner layers 39, 191 and the outer layers 41, 213, 413 are poorly adhesive to the reinforcing layer 40, an adhesion layer may be interposed in-between. In this case, the adhesion layer can be prelaminated on the external circumferential surface of the inner layers 39, 191, or laminated on the reinforcing layer 40 formed by winding a stretched polyolefin resin sheet, or, otherwise, prelaminated on one or both surfaces of the stretched polyolefin resin sheet which constitutes the reinforcing layer 40. In this manner, the adhesion layer is disposed between the reinforcing layer 40, and any of the inner layers 39, 191 and the outer layers 41, 213, 413.

Next, high-pressure composite pipes of Inventions 16, 17 are described with reference to Examples 15, 16.

Example 15

The manufacture process of Example 1 was followed exactly, except that the adhesive sheet used was a 200-$\mu$m-thick sheet of a thermoplastic elastomer (Milastomer 5030N, Mitsui Chemicals, Inc.). The thermoplastic elastomer had a modulus of tensile elasticity of 300 kgf/cm$^2$.

Example 16

The manufacture process of Example 1 was followed exactly, except that the adhesive sheet used was a 25-$\mu$m-thick sheet of a silane crosslinkable low-density polyethylene (LINKLON XF800T, MITSUBISHI CHEMICAL CORPORATION).

The resulting high-pressure composite pipes were immersed in 80° C. hot water for one hour, in order to effect crosslinking at the adhesion layer. The crosslinking degree was about 80%, as evaluated in terms of gel fraction.

The high-pressure composite pipes obtained in Examples 15, 16 as well as Example 1 were tested for the following items to evaluate their performance. The results are given in Table 5.

<Performance Evaluation Tests> a) Internal Pressure Destructive Test

Using a measuring apparatus illustrated in FIG. 16, a 1000-mm-long high-pressure composite pipe was fixed at both ends by measurement jigs 121. Pressure was applied inside the pipe by a pump 122 to measure a destructive internal pressure of the pipe. The pressure was raised at a rate of 5 kgf/min., until the pressure could not be raised any further or the pressure dropped. The internal pressure measured at that moment was determined as the destructive internal pressure.

b) Internal Pressure Creep Rupture Test

Using the apparatus for the internal pressure destructive test, the high-pressure composite pipe was continuously subjected to an internal pressure of 12 kgf/cm$^2$ by 80° C.

water under an 80° C. atmosphere. Under these conditions, each pipe was measured for the pressure endurance time.

c) Pulsation Pressure Test

Using an apparatus for a pulsation destructive test, the high-pressure composite pipe was continuously subjected to internal pressures of 0 kgf/cm² and 40 kgf/cm² which were applied at a cycle of 1 Hz, by 23° C. water under a 23° C. ambient atmosphere. Under these conditions, each high-pressure composite pipe was measured for the cycles of enduring the pressure.

TABLE 5

|  | Destructive Internal Pressure (kgf/cm²) | Internal Pressure Endurance Time (hr) | Pulsation Cycles |
|---|---|---|---|
| Ex. 1 | 66 | ≧200 | ≧10000 |
| Ex. 15 | 64 | ≧200 | ≧18000 |
| Ex. 16 | 65 | ≧400 | ≧15000 |

Next, the high-pressure composite pipe of Invention 12 is described by means of Example 17.

Example 17

A high-pressure composite pipe was manufactured in the same manner as in Example 1, except that the reinforcing sheet used in Example 1 was replaced by a sheet treated as below.

Figure 23:
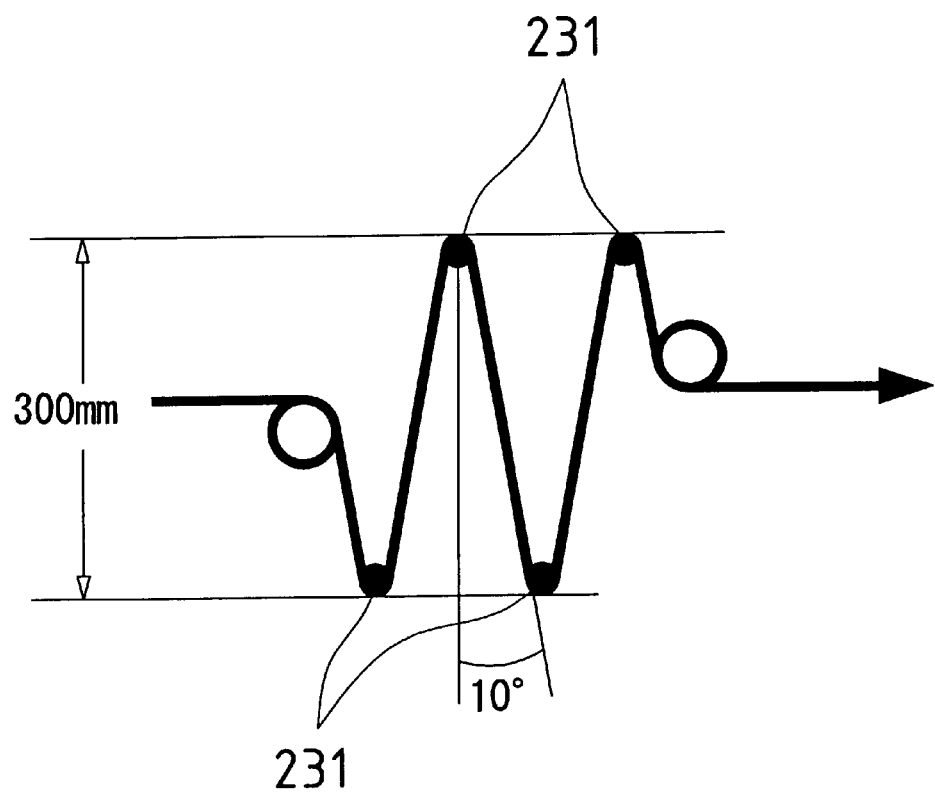
FIG. 23 is an illustrated description of the structure of the apparatus used in Example 17 for manufacturing the high-pressure composite pipe according to the present invention.

The reinforcing sheet used in Example 1 was fed into an apparatus shown in FIG. 23 which comprises a combination of four 10-mm-diameter iron rolls 231 ... 231, in which the sheet was guided along a zigzag pass line. The thus treated reinforcing sheet was a tensile material which had a low modulus of initial tensile elasticity, as found in Table 6.

The performance evaluation tests conducted for Examples 15 and 16 were carried out with regard to Examples 1 and 17. The results were compiled in Table 7. As evident from Table 7, in the high-pressure composite pipe of Example 17, the stretched polyolefin resin sheet, which had high initial stretchability by nature, received a small stress even under a repetitive high internal pressure such as pulsation pressure. Hence, the stretched sheet showed an improved durability against pulsation pressure.

TABLE 6

|  | Modulus of Initial Elasticity* | Modulus of Elasticity* | Breaking Elasticity |
|---|---|---|---|
| Reinforcing sheet (before treatment) | 2 GPa | 6 GPa | 13% |
| Reinforcing sheet (after treatment) | 23 GPa | 10 GPa | 8% |

*in 0–2% strain range

TABLE 7

|  | Destructive Internal Pressure (kgf/cm²) | Internal Pressure Endurance Time (hr) | Pulsation Cycles |
|---|---|---|---|
| Ex. 1 | 66 | ≧200 | ≧10000 |
| Ex. 17 | 60 | ≧400 | ≧18000 |

Now, in addition to the above Examples, yet another Example and its Comparative Example are discussed. From the viewpoint of improving adhesive property of the stretched polyolefin resin sheet, the stretched polyolefin resin sheet was arranged to show a gel fraction of not less than 20% and a shrinkage stress of not less than 0.1 MPa. The measurement results are shown in Table 8. For comparison, the results of Example 1, which showed a gel fraction of not less than 20% and a shrinkage stress of not less than 0.1 MPa, were also included.

Example 18

Manufacture of a Stretched Polyolefin Resin Sheet for a High-pressure Composite Pipe A stretched polyolefin resin sheet for a high-pressure composite pipe was obtained in the same manner as in Example 1, except that the materials therefor also contained 3 parts by weight of ethyl 4-dimethylaminobenzoate. In addition, the irradiation time of the high pressure mercury lamp was altered to 20 seconds.

Manufacture of a High-pressure Composite Pipe

A high-pressure composite pipe was manufactured in the same manner as in Example 1.

Comparative Example 7

Manufacture of a Stretched Polyolefin Resin Sheet for a High-pressure Composite Pipe A stretched polyolefin resin sheet for a high-pressure composite pipe was obtained in the same manner as in Example 1, except that the material therefor was comprised singly of a high-density polyethylene. In addition, this process omitted crosslinking by irradiation of the high pressure mercury lamp.

Manufacture of a High-pressure Composite Pipe

A high-pressure composite pipe was manufactured in the same manner as in Example 1.

TABLE 8

|  | Shrinkage Stress at 130° C. (MPa) | Melting Point by DSC Measurement (° C.) | Gel Fraction (%) | Destructive Hydraulic Pressure (kgf/cm²) | Internal Pressure Endurance Time (hr) |
|---|---|---|---|---|---|
| Ex. 1 | 0.30 | 144 | 30 | 66 | ≧200 |
| Ex. 18 | 0.42 | 149 | 64 | 66 | ≧400 |
| Comp. Ex. 7 | 0.15 | 139 | 0 | 64 | ≧120 |

As apparent from Table 8, the high-pressure composite pipe of Example 18 exhibited a high gel fraction. This means the stretched polyolefin resin sheet exhibits sufficient creep characteristics to reinforce the inner layer over a long period. Besides, during the step of integrally laminating the sheet on the inner layer, the sheet can retain its reinforcing effect, with being protected from elution caused by a solvent or melting under heating.

Further, the high-pressure composite pipe of Invention 7 is described with reference to Examples 19 and 20.

Example 19

Manufacture of a Reinforcing Layer Sheet

The same sheet as used in Example 1 was employed.

Manufacture of a High-pressure Composite Pipe

Figure 24:
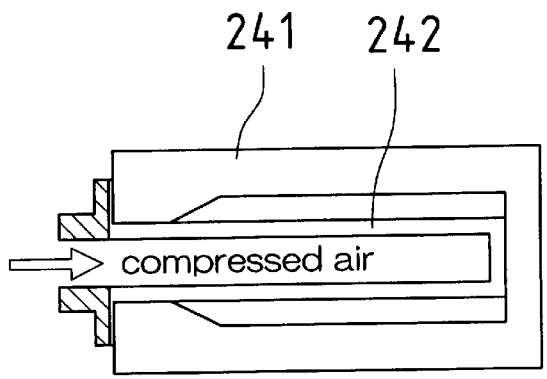
FIG. 24 illustrates the structure of the inner layer stretching machine used in Example 19 for manufacturing the high-pressure composite pipe according to the present invention.
Figure 25:
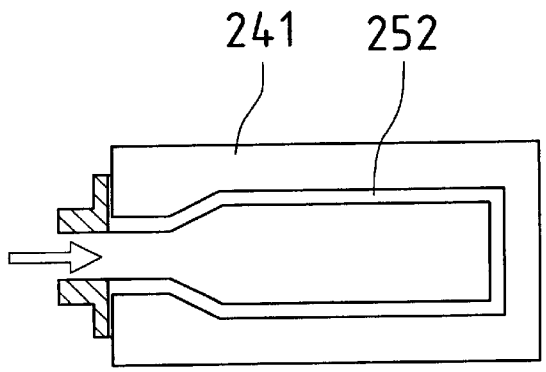
FIG. 25 illustrates the operation of the inner layer stretching machine used in Example 19 for manufacturing the high-pressure composite pipe according to the present invention.

The inner layer was stretched only in the circumferential direction. FIG. 24 and FIG. 25 are schematic views of the inner layer stretching machine.

As for this stretching machine, referring to FIG. 24, an inner layer pipe 242 is placed in a die 241, and, thereafter, compressed air heated approximately to 125° C. is injected. This process provides an inner pipe 252 which is stretched only in the circumferential direction, as shown in FIG. 25.

In this Example, a high-density polyethylene (melting point 135° C., melt index MI=0.5 g/10 mins.) was formed by extrusion into a thick-walled inner layer pipe base (outer diameter 40 mm, wall thickness 4.9 mm). Using the inner layer stretching machine of FIG. 24, the thick-walled inner layer pipe base was stretched 1.6 times in the circumferential direction. Later, a tapered portion was cut off to obtain a stretched inner layer pipe (outer diameter 60 mm, wall thickness 3 mm).

Along the external circumference of this pre-formed stretched inner layer pipe, two elongated reinforcing layer tapes, prepared by slitting the above-mentioned reinforcing layer sheet into a width of 90 mm, were wound at an inclination angle of ±60° each relative to the axis of the stretched inner layer pipe. The tape-wound stretched inner layer pipe was heated in a far-infrared heating oven until its surface temperature reached 125°C., so that the reinforcing layer sheet was fused to the high-density polyethylene pipe for the inner layer. A high-pressure composite pipe was thus obtained.

Example 20

Manufacture of a Reinforcing Layer Sheet

The same sheet as used in Example 1 was employed.

Manufacture of a High-pressure Composite Pipe

Figure 26:
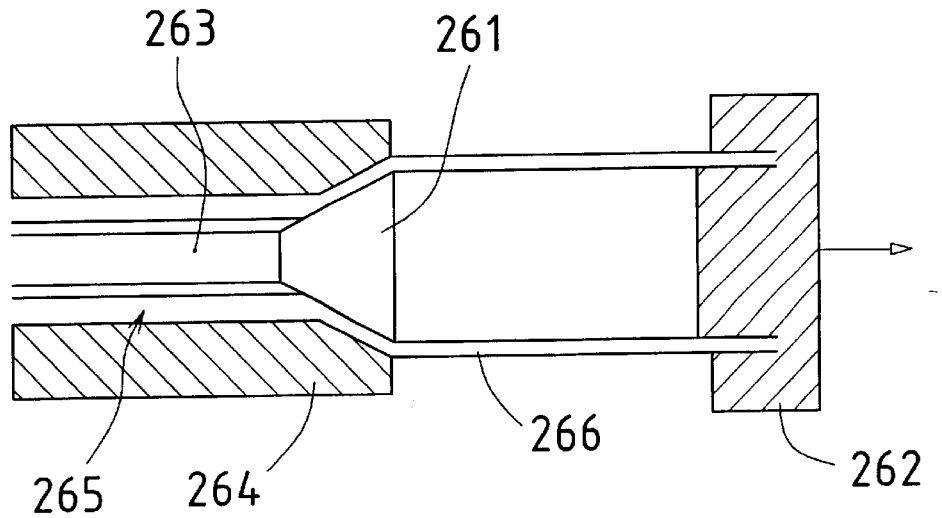
FIG. 26 illustrates the structure of the inner layer stretching machine used in Example 20 for manufacturing the high-pressure composite pipe according to the present invention.

The inner layer was stretched in the circumferential direction and the axial direction. FIG. 26 is a schematic view of the inner layer stretching machine.

Referring to FIG. 26, the inner layer stretching machine comprises a mandrel 261, a clamp 262, a shaft 263 for holding the mandrel 261, and a die 264. In this machine, while an inner layer pipe 265 is kept heated at 125° C., the inner layer pipe 265 is pulled by the clamp 262 along the mandrel 261. This process provides a stretched inner layer pipe 266 which is stretched both axially and circumferentially.

In this Example, a high-density polyethylene (melting point 135° C., melt index MI=0.5 g/10 mins.) was formed by extrusion into a thick-walled inner layer pipe (outer diameter 50 mm, wall thickness 6 mm). Using the inner layer stretching machine of FIG. 26, the thick-walled inner layer pipe was stretched 1.5 times in the axial direction and 1.3 times in the circumferential direction. Thus obtained was a stretched inner layer pipe (outer diameter 60 mm, wall thickness 3 mm).

With the use of this stretched inner layer pipe, a high-pressure composite pipe was obtained in the same manner as in Example 19. The high-pressure composite pipes of Example 19 and Example 20 were subjected to the internal pressure destructive test, the internal pressure creep test and the pipe bending test. The results were shown in Table 9.

TABLE 9

| | Destructive Hydraulic Pressure (kgf/cm$^2$) | Internal Pressure Endurance Time (hr) | Modulus of Bending Elasticity (kgf/cm$^2$) |
|---|---|---|---|
| Ex. 19 | 77 | ≧300 | 9000 |
| Ex. 20 | 75 | ≧300 | 12000 |

Table 9 proved that the high-pressure composite pipes of these Examples exhibited prominent performances in all test items. It should be emphasized that such results are attributed to stretching. Namely, circumferential stretching enhances the hydraulic pressure resistance and the creep resistance of the synthetic resin which constitutes the inner layer. At the same time, axial stretching improves the tensile strength (rigidity) in the axial direction, thereby suppressing its self-weight deflection.

Figure 27:
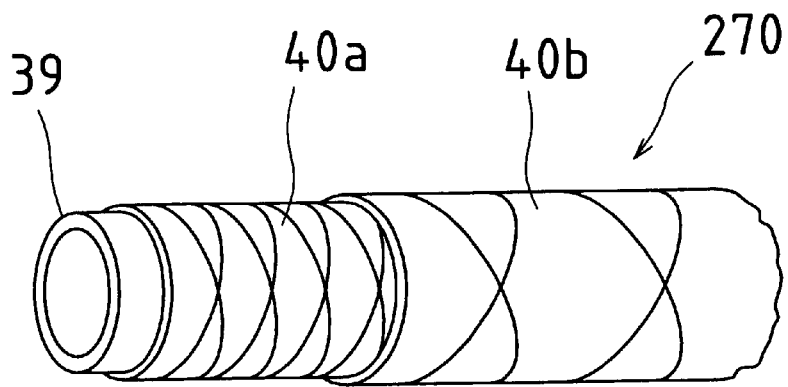
FIG. 27 is a perspective view showing the structure of the high-pressure composite pipe manufactured in Example 21.
Figure 28:
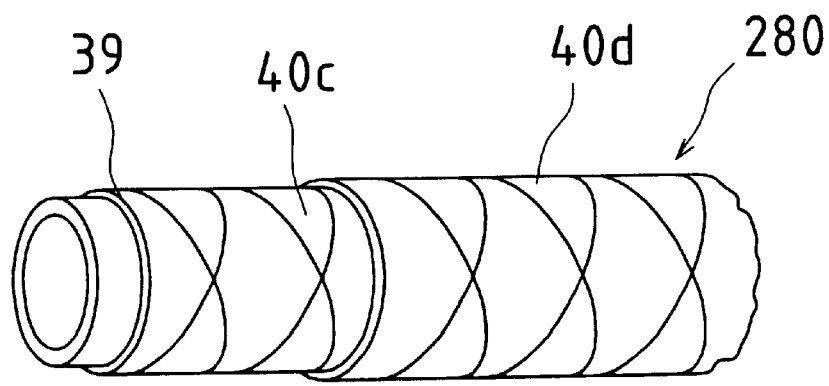
FIG. 28 is a perspective view showing the structure of the high-pressure composite pipe manufactured in Comparative Example 8.

Now; the high-pressure composite pipe of Invention 15 is mentioned with reference to Example 21 and Comparative Example 8. FIG. 27 and FIG. 28 are perspective views showing the structures of the high-pressure composite pipes of Example 21 and Comparative Example 8, respectively. Description is hereinafter made with reference to these drawings.

Example 21

Manufacture of a Reinforcing Layer Sheet

The same sheet as used in Example 1 was employed.

Manufacture of a High-pressure Composite Pipe

Referring to FIG. 27, an inner layer 39 (outer diameter 60 mm, wall thickness 3 mm) was preformed of a high-density polyethylene (melting point 135° C., melt index MI=0.5 g/10 mins. ) . Four reinforcing layer sheet strips were prepared by slitting the reinforcing layer sheet into widths of 16 mm and 64 mm. On the external circumference of the inner layer 39, the 16-mm-wide reinforcing layer sheets 40a were wound at ±85° each relative to the axis of the high-pressure composite pipe, with the adhesive sheets contacting on the inner layer. On this external circumference, the 64-mm-wide reinforcing layer sheets 40b were wound at ±70° each relative to the axis of the high-pressure composite pipe. Thus, the reinforcing layer sheets made a total of four layers. In the next step, the sheet-wound resin pipe 270 wrapped with these sheets was heated in a far-infrared oven until the surface temperature reached 130° C. Thereby, the reinforcing layer sheets 40a, 40b were fused on the high-density polyethylene pipe for the inner layer 39. Thus obtained was the high-pressure composite pipe of Invention 15.

Comparative Example 8

Manufacture of a Reinforcing Layer Sheet

The same sheet as used in Example 1 was employed.

Manufacture of a High-pressure Composite Pipe

Referring to FIG. 28, an inner layer 39 (outer diameter 60 mm, wall thickness 3 mm) was preformed of a high-density polyethylene (melting point 135° C., melt indexMI=0.5 g/10 mins.) . Four reinforcing layer sheet strips were prepared by slitting the reinforcing layer sheet into a width of 33 mm. Two of them, as reinforcing layer sheets 40c, were wound on the external circumference of the inner layer 39 at ±80° each relative to the axis of the high-pressure composite pipe, with the adhesive sheets contacting on the inner layer. On this external circumference, the remaining two reinforcing layer sheets 40*d* were wound at ±80° in the similar manner. Thus, the reinforcing layer sheets made a total of four layers. In the next step, the sheet-wound resin pipe 280 wrapped with these sheets was heated in a far-infrared oven until the surface temperature reached 130° C. Thereby, the reinforcing layer sheets 40*c*, 40*d* were fused on the high-density polyethylene pipe for the inner layer 39.

It should be noted that Comparative Example 8 structurally corresponds to the high-pressure composite pipe of Invention 1, whereas Example 21 (as the high-pressure composite pipe of Invention 15) contains a limitation on the reinforcing layer. The instant comparison of Comparative Example 8 with Example 21 is intended in terms of destructive pressure and pulsation cycles. The performance evaluation tests were conducted in the same manner as the above-mentioned tests.

The results were compiled in Table 10. As indicated in Table 10, Example 21 was superior to Comparative Example 8 in the pulsation resistance performance.

TABLE 10

|  | Winding Angle | Destructive Internal Pressure (kgf/cm$^2$) | Pulsation Cycles |
| --- | --- | --- | --- |
| Ex. 21 | ±85°, ±70° | 92 | 18000 |
| Comp. Ex. 8 | ±80° | 90 | 10000 |

The high-pressure composite pipes of the present invention are specifically described with reference to the embodiments and Examples 1 to 21 as detailed above. As additional Examples, the method and apparatus for manufacturing these high-pressure composite pipes are described below in detail. It should be understood that the following Examples are designed to obtain the structure shown in FIG. 5 which corresponds to the high-pressure composite pipe of Invention 2.

Example 22

Manufacture of a Reinforcing Layer Sheet

The same sheet as used in Example 1 was employed.

Manufacture of a High-pressure Composite Pipe

Figure 29:
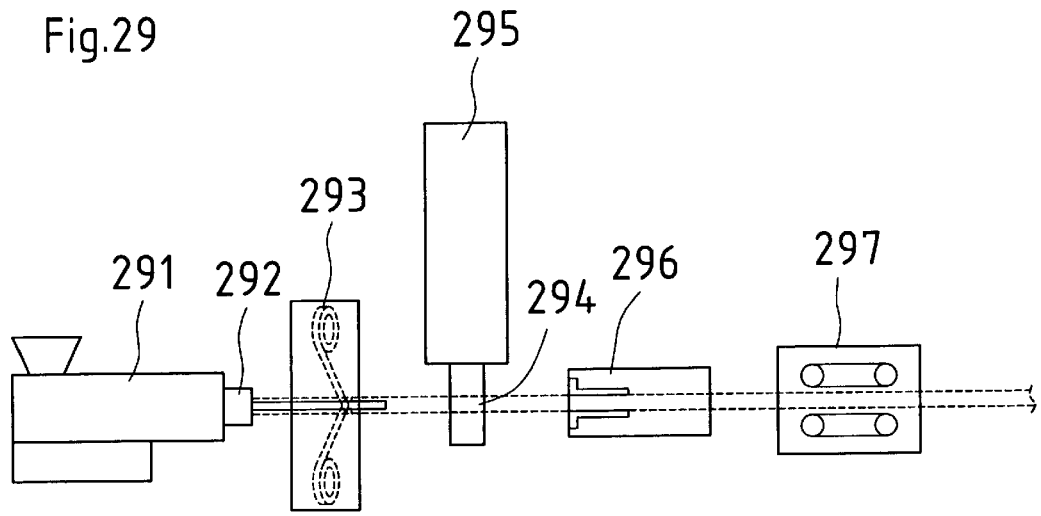
FIG. 29 schematically shows the structure of the apparatus used in Example 22 for manufacturing the high-pressure composite pipe according to the present invention.

An apparatus for manufacturing the high-pressure composite pipe is illustrated in FIG. 29. An inner layer pipe having a 51 mm inner diameter and a 3-mm-thick wall was formed through an extrusion die 292 equipped at the end of a single-screw extruder 291. The core of the extrusion die 292 protrudes in the downstream side of the manufacturing apparatus, serving as a mandrel for the winding. Then, stretched composite sheet strips, slit into a predetermined width, were wound around the inner layer pipe, using spiral winders 293. Afterwards, while being led through an extrusion coating die 294, a resin was extruded from a single-screw extruder 295 and coated as the outer layer. Followed by cooling in a cooling die 296, there was produced a high-pressure composite pipe having a 63 mm outer diameter and a 6-mm-thick wall. The high-pressure composite pipe was taken out by a takeup machine 297.

This process provided the high-pressure composite pipe illustrated in FIG. 5. In this Example, the inner layer was made of a high-density polyethylene (melting point 135° C., melt index MI=0.5 g/10 mins.), and the outer layer was composed of another high-density polyethylene (melting point 135° C., melt index MI=1.0 g/10 mins.). The resins for the inner and outer layers were extruded under the condition where the temperatures of the extruder barrel and the die were both 200° C. As for the stretched polyolefin resin sheet, 60-mm-wide strips were wound in two layers at ±70° relative to the axis of the high-pressure composite pipe. During the winding, the surface temperature of the inner layer was kept at 150° C.

Example 23

Manufacture of a Reinforcing Layer Sheet

The same sheet as used in Example 1 was employed.

Manufacture of a High-pressure Composite Pipe

Figure 30:
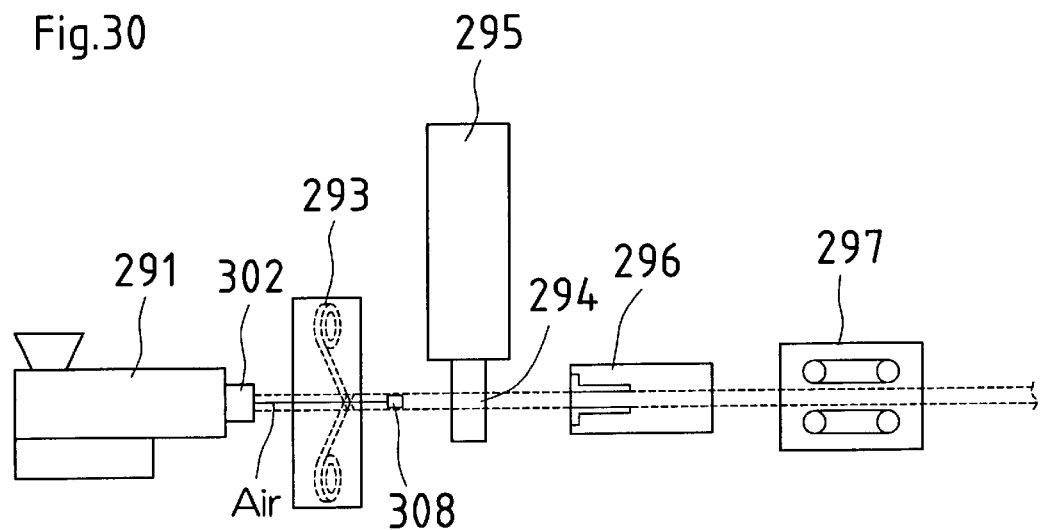
FIG. 30 schematically shows the structure of the apparatus used in Example 23 for manufacturing the high-pressure composite pipe according to the present invention.

An apparatus for manufacturing a high-pressure composite pipe is illustrated in FIG. 30. This manufacturing apparatus is different from the one shown in FIG. 29, in that air is supplied from the core projecting from an extrusion die 302, thereby raising the pressure in a space closed by a plug 308 which is disposed in the downstream side of the manufacturing apparatus in such a manner as to establish close contact with the inner layer. According to this arrangement, a lamination pressure is applied to the inner layer and the stretched polyolefin resin sheet wound thereon. Apart from these points, the manufacture process in Example 23 was the same as in Example 22.

Example 24

Manufacture of a Reinforcing Layer Sheet

To manufacture a stretched composite sheet, the stretched polyolefin resin sheet obtained in Example 1 was thermally fused on one surface of a preformed 2.5-mm-thick polyethylene sheet. As the polyethylene sheet material, a high-density polyethylene (melting point 135° C., melt index MI=1.0 g/10 mins.) was employed.

Manufacture of a High-pressure Composite Pipe

Figure 31:
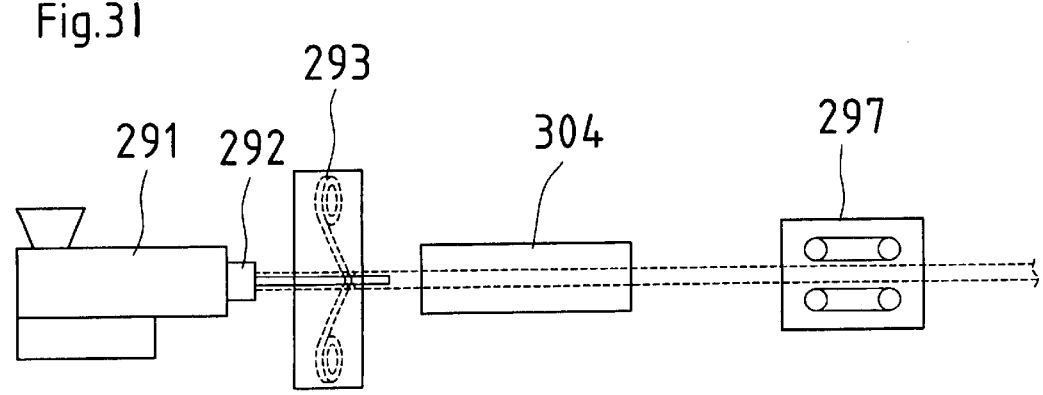
FIG. 31 schematically shows the structure of the apparatus used in Example 24 for manufacturing the high-pressure composite pipe according to the present invention.

An apparatus for manufacturing the high-pressure composite pipe is illustrated in FIG. 31. An inner layer pipe having a 51 mm inner diameter and a 3-mm-thick wall was formed through an extrusion die 292 equipped at the end of a single-screw extruder 291. The core of the extrusion die 292 protrudes in the downstream side of the manufacturing apparatus, serving as a mandrel for the winding. Then, using spiral winders 293, the inner layer pipe was wrapped by a stretched composite sheet strip slit into a predetermined width, and another stretched composite sheet. Following passage through a far-infrared heater 304, there was produced a high-pressure composite pipe having a 63 mm outer diameter and a 6-mm-thick wall. The high-pressure composite pipe was taken out by a takeup machine 297.

In this Example, the inner and outer layers were made of the same resins as used in Example 1. As for the stretched composite sheet, a 60-mm-wide strip was wound on the inner layer pipe at ±70° relative to the axis of the high-pressure composite pipe, and, on this sheet, another stretched composite sheet was wound at −70°. During the winding, the surface temperature of the inner layer was kept at 150° C. Thereafter, in the far-infrared heater 304 heated at an atmospheric temperature of 165° C., heating was evenly applied in the circumferential direction of the pipe to give a high-pressure composite pipe.

Example 25

Manufacture of a Reinforcing Layer Sheet

The same sheet as used in Example 1 was employed.

Manufacture of a High-pressure Composite Pipe

Figure 32:
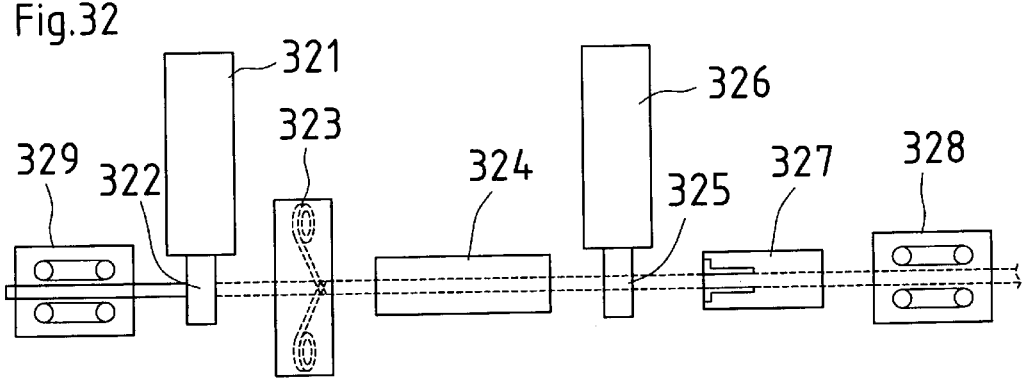
FIG. 32 schematically shows the structure of the apparatus used in Example 25 for manufacturing the high-pressure composite pipe according to the present invention.

An apparatus for manufacturing the high-pressure composite pipe is illustrated in FIG. 32. In order to form an inner layer pipe having a 51 mm inner diameter and a 3-mm-thick wall, a cut iron mandrel was supplied by an iron mandrel feeder 329 in the upstream side of the manufacturing apparatus, and coating was effected on the mandrel by means of an extrusion coating die 322 equipped at the end of a single-screw extruder 321. Next, using spiral winders 323, stretched composite sheet strips, slit into a predetermined width, were wound on the inner layer pipe. The sheet-wound pipe was carried through a far-infrared heater 324. Afterwards, while being guided through an extrusion coating die 325, the pipe was coated, as the outer layer, with a resin extruded from a single-screw extruder 326. Subsequent cooling in a cooling die 327 gave a high-pressure composite pipe having a 63 mm outer diameter and a 6-mm-thick wall. The high-pressure composite pipe was taken out by a takeup machine 328. In this Example, the inner and outer layers were made of the same resins as used in Example 22. As for the stretched composite sheet, 60-mm-wide strips were wound on the inner layer pipe in two layers at ±70° relative to the axis of the high-pressure composite pipe. The far-infrared heater 324 was adjusted to an atmospheric temperature of 165° C. The iron mandrel was removed after the resulting high-pressure composite pipe was cut off at the joint of the iron mandrel.

Example 26

Manufacture of a Reinforcing Layer Sheet

The same sheet as used in Example 1 was employed.

Manufacture of a High-pressure Composite Pipe

Figure 33:
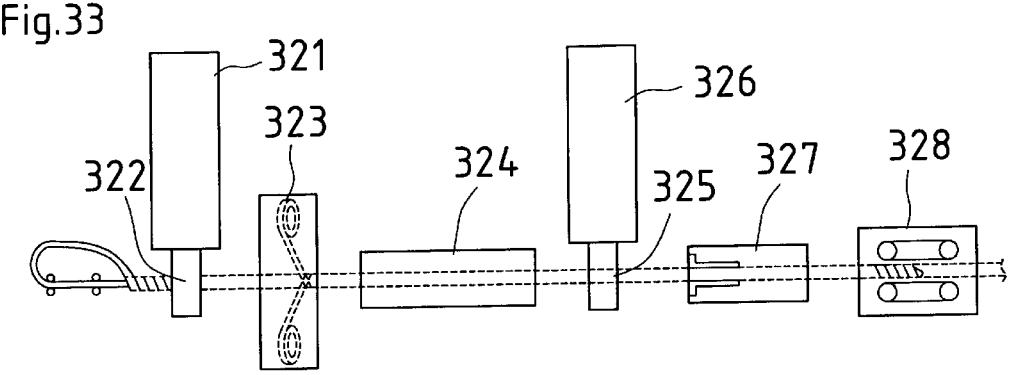
FIG. 33 schematically shows the structure of the apparatus used in Example 26 for manufacturing the high-pressure composite pipe according to the present invention.

An apparatus for manufacturing the high-pressure composite pipe is illustrated in FIG. 33. In order to form an inner layer pipe having a 51 mm inner diameter and a 3-mm-thick wall, a coiled iron mandrel was supplied in the upstream side of the manufacturing apparatus, and coating was effected on the mandrel by means of an extrusion coating die 332 equipped at the end of a single-screw extruder 331. The later-stage of the manufacturing apparatus is the same as in Example 25 shown in FIG. 32, and not described any further at the moment. As for the coiled iron mandrel, an endless iron sheet was supplied in spiral tubular form, with the edges slightly overlapping on each other. In the middle of the takeup machine 328, the tubular mandrel was returned into sheet form and carried back to the upstream of the manufacturing apparatus via a hollow space inside the mandrel.

In this Example, the inner and outer layers were made of the same resins as used in Example 22. As for the stretched composite sheet, 60-mm-wide strips were wound on the inner layer pipe in two layers at ±70° relative to the axis of the high-pressure composite pipe. The far-infrared heater 324 was adjusted to an atmospheric temperature of 165° C.

Example 27

Manufacture of a Reinforcing Layer Sheet

The same sheet as used in Example 1 was employed.

Manufacture of a High-pressure Composite Pipe

Figure 34:
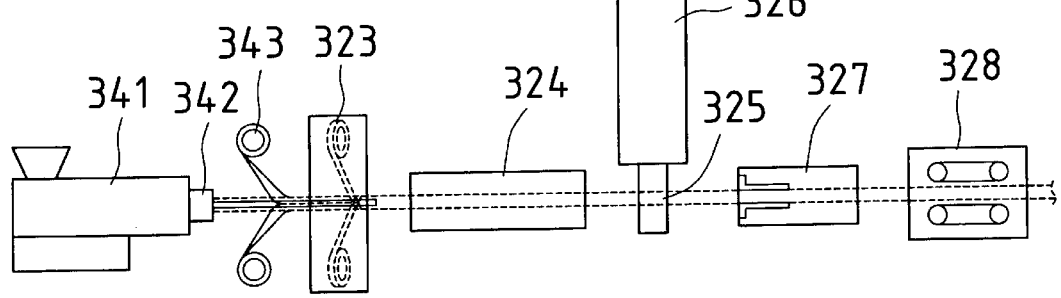
FIG. 34 schematically shows the structure of the apparatus used in Example 27 for manufacturing the high-pressure composite pipe according to the present invention.

An apparatus for manufacturing the high-pressure composite pipe is illustrated in FIG. 34. This apparatus is capable of forming a pipe-form extrudate through an extrusion coating die 342 equipped at the end of a single-screw extruder 341. The external circumference of a core protruding from the extrusion coating die 342 was utilized as a mandrel, which was wrapped by stretched composite sheets fed from a stretched composite sheet payout machine 343 and by stretched composite sheets fed from spiral winders 323. During passage through the extrusion coating die 325, which followed the passage through the far-infrared heater 324, a resin was extruded from the single-screw extruder 326 and coated as the outer layer. Thereafter, the inner layer was extruded in tubular form into the stretched composite sheet. Subsequent cooling in the cooling die 327 provided a high-pressure composite pipe having a 63 mm outer diameter and a 6-mm-thick wall. The high-pressure composite pipe was taken out by the takeup machine 328.

In this Example, the inner and outer layers were made of the same resins as used in Example 22. As for the stretched composite sheet, 60-mm-wide strips were wound on the inner layer pipe in two layers at ±70° relative to the axis of the high-pressure composite pipe, and another layer was wound therein along the axis. The far-infrared heater 324 was adjusted to an atmospheric temperature of 165° C.

Example 28

Manufacture of a Reinforcing Layer Sheet

The same sheet as used in Example 1 was employed.

Manufacture of a High-pressure Composite Pipe

Figure 35:
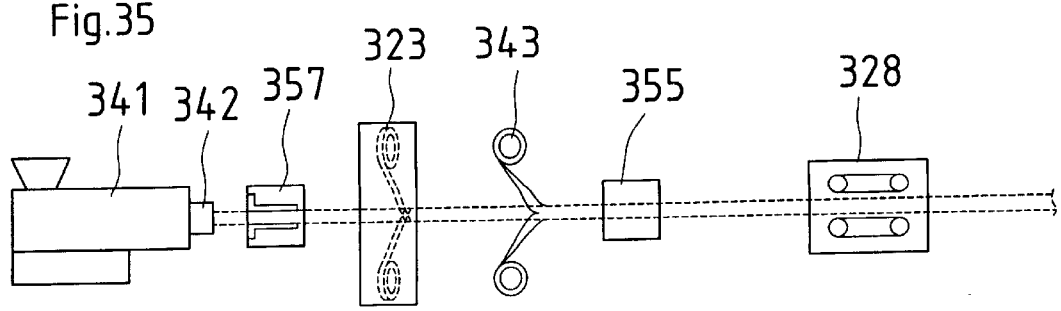
FIG. 35 schematically shows the structure of the apparatus used in Example 28 for manufacturing the high-pressure composite pipe according to the present invention.

An apparatus for manufacturing the high-pressure composite pipe is illustrated in FIG. 35. An inner layer pipe having a 51 mm inner diameter and a 3-mm-thick wall was formed through an extrusion coating die 342 equipped at the end of a single-screw extruder 341, and a cooling die 357. Then, stretched composite sheet strips, slit into a predetermined width, were wound around the inner layer pipe, using spiral winders 323. A polyethylene sheet was paid out from a sheet payout machine 343 in such a manner as to envelop the external circumference. The sheet-covered pipe was led through a heating die 355 to produce a high-pressure composite pipe having a 63 mm outer diameter and a 6-mm-thick wall. The high-pressure composite pipe was taken out by the takeup machine 328.

In this Example, the inner layer was made of the same resin as used in Example 22. The material for the polyethylene sheet was the outer layer resin employed in Example 22. As for the stretched composite sheet, 60-mm-wide strips were wound on the inner layer pipe in two layers at ±70° relative to the axis of the high-pressure composite pipe. The temperature of the heating die 355 was adjusted to 135° C.

With further reference to the drawings, the following description relates to embodiments of the method for joining the high-pressure composite pipes according to the present invention.

It should be understood that the embodiments of the joining method of the present invention are intended to join together such high-pressure composite pipes, for example, as shown in FIG. 5. This section skips descriptions for these high-pressure composite pipes.

Figure 36:
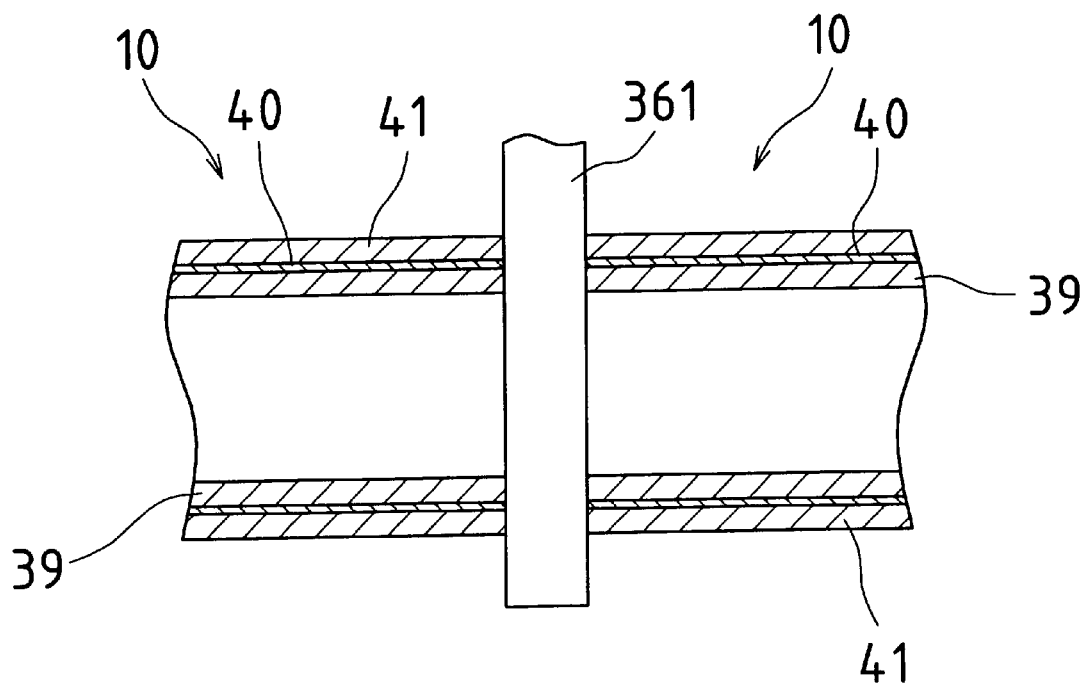
FIG. 36 is an essential sectional view describing the first step in the embodiment of the high-pressure composite pipe joining method according to the present invention.
Figure 37:
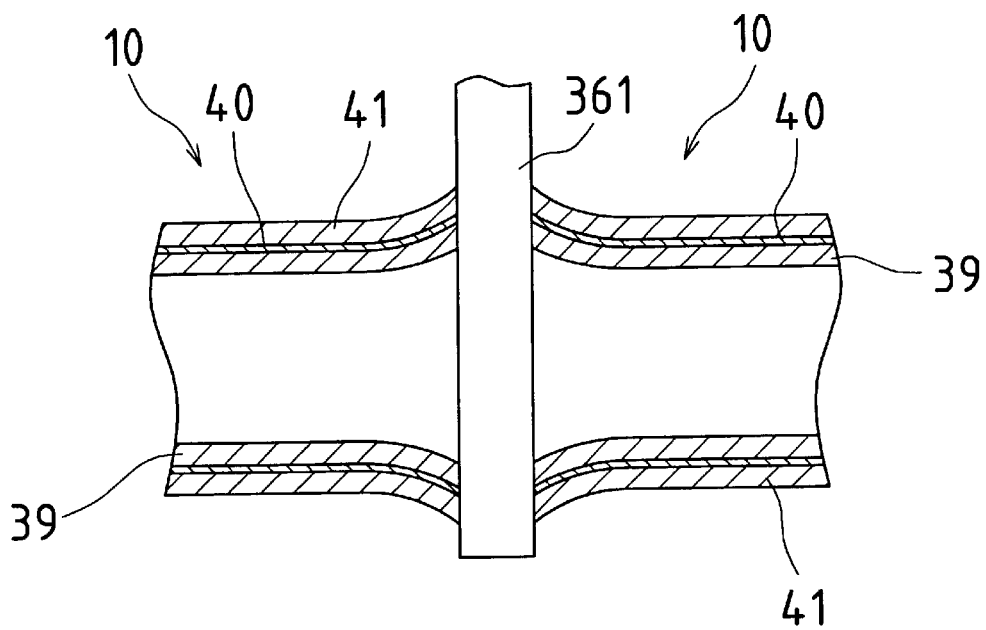
FIG. 37 is an essential sectional view describing the second step in the embodiment of the high-pressure composite pipe joining method according to the present invention.
Figure 38:
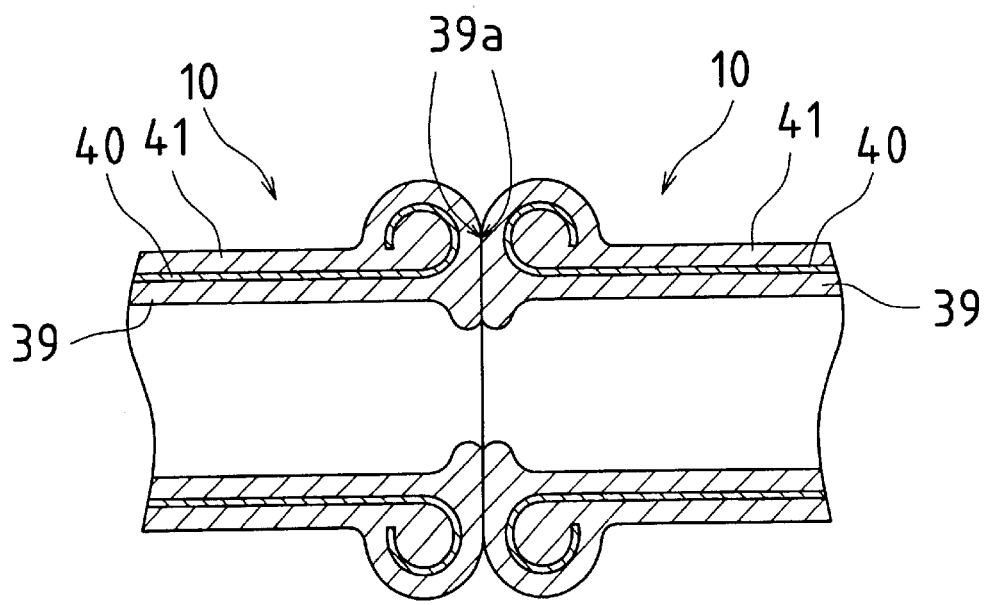
FIG. 38 is an essential sectional view describing the last step in the embodiment of the high-pressure composite pipe joining method according to the present invention.

FIG. 36, FIG. 37 and FIG. 38 are essential sectional views which respectively describe the first, second and last steps in an embodiment of the method of the present invention for joining the high-pressure composite pipes.

According to the joining method of this embodiment, firstly as shown in FIG. 36, an end of each high-pressure composite pipe 10 is heated through contact with a heated hot plate 361. At this stage, each high-pressure composite pipe 10 is not forcibly pressed against the hot plate 361, but allows its end to be heated into a melted state by a certain length.

Secondly, referring to FIG. 37, the melted end of each high-pressure composite pipe 10 is pressed against the heated hot plate 361, so as to flare like a bell. In each high-pressure composite pipe 10, the reinforcing layer 40 made of the stretched polyethylene resin sheet also flares like a bell, when heated to a melted state and pressed against the heated hot plate 361. Besides, while the reinforcing layer 40 flares in bell form, the inner layer 39 and the outer layer 41 laminated on the reinforcing layer 40 are allowed to flare together with the reinforcing layer 40.

Lastly, referring to FIG. 38, the ends of the high-pressure composite pipes 10 are concentrically butted and pressed against each other. As a result, at the end of each high-pressure composite pipe 10, the melted reinforcing layer 40 made of the stretched polyethylene resin sheet is gradually flared outwardly into an outwardly curled state. At the same time, the inner layer 39 and the outer layer 41, which are melted on both sides of the reinforcing layer 40, are gradually curled in conformity with the curled reinforcing layer 40. Thereby, the inner layers 39 of both high-pressure composite pipes 10 have their internal circumferential surfaces 39a . . . 39a pressed into mutual contact. As a result, the curled inner layers 39 of the high-pressure composite pipes 10 are fused to each other. In the meantime, the outwardly curled outer layer 41 of each high-pressure composite pipe 10 allows its end face to be fused on the external circumferential surface of the same outer layer 41, so that the high-pressure composite pipes 10 are joined together.

Along the entire circumference of the thus joined high-pressure composite pipes 10, the mutually fused inner layers 39 of the high-pressure composite pipes 10 create a thick-walled bead, which serves to join the high-pressure composite pipes 10 firmly to each other. Hence, in the case where the high-pressure composite pipes 10 are laid as a water supply pipe or the like through which high-pressure fluid flows, the joining method of the present invention can be applied to join a pair of high-pressure composite pipes 10. Since the joint area is joined strongly along the entire circumference, there is no fear of water leakage or fracture at the joint area.

Figure 39:
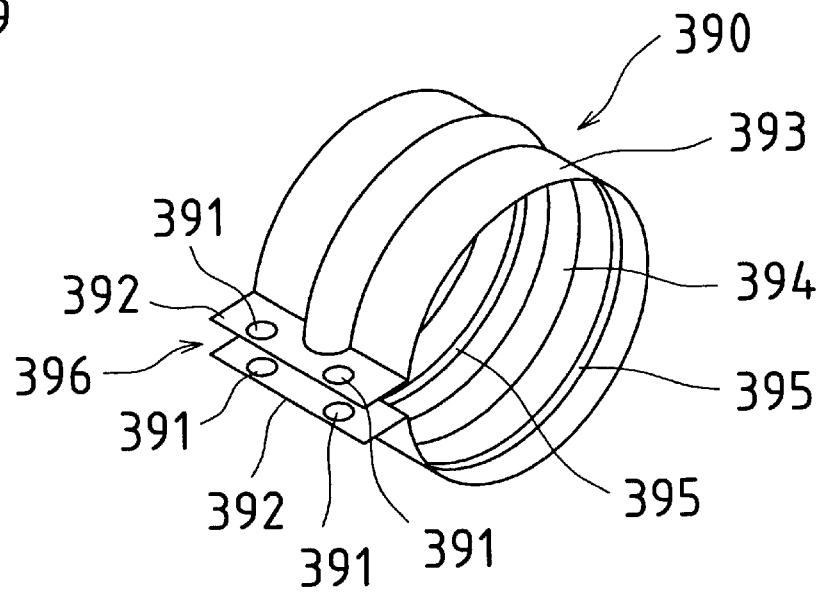
FIG. 39 is a perspective view showing an example of the annular band used in another embodiment of the high-pressure composite pipe joining method according to the present invention.
Figure 40:
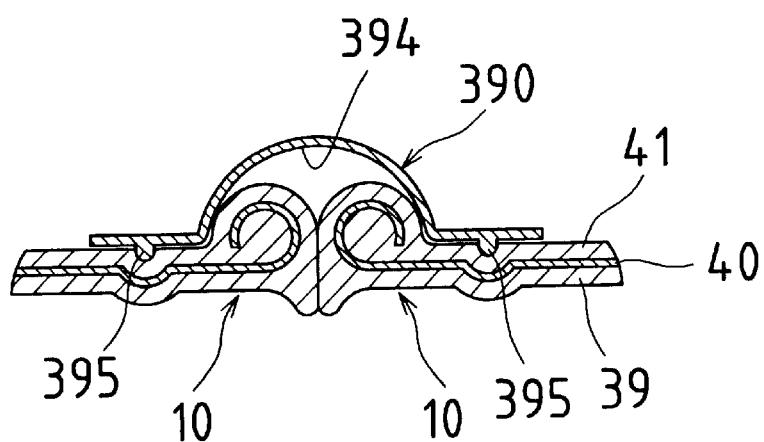
FIG. 40 is an essential sectional view describing a step in another embodiment of the high-pressure composite pipe joining method according to the present invention, wherein the annular band shown in FIG. 39 is employed.

FIG. 39 is a perspective view showing an example of an annular band to be used in another embodiment of the method of the present invention for joining the high-pressure composite pipes. FIG. 40 is an essential sectional view for describing a step in the embodiment using the annular band shown in FIG. 39.

As shown in FIG. 39, an annular band 390 is disconnected by a slit 396. An annular band base 393 is equipped with collars 392, 392 which are bent externally and project from both ends of the annular band base 393. The collars 392, 392 include bolt holes 391 . . . 391 for fastening.

In the annular band base 393, a groove 394 runs circumferentially in the middle of the internal circumferential surface. Ridges 395, 395, each having a round tip, extend circumferentially along both side edges of the internal circumferential surface. The ridges 395 only need to have their tips rounded. As illustrated in FIG. 40, when the annular band 390 is fastened on the fusion point of the high-pressure composite pipes 10, 10, the annular band 390 can fix the high-pressure composite pipes 10, 10 by biting, in an indenting manner, into the entirety of the pipes 10, 10.

Additionally, the slit in the annular band base 393 should not be limited at one position. The annular band base may be constituted with two or more sections.

The annular band 390 is applicable to the joint area created by the method for joining the high-pressure composite pipes, as described with reference to FIG. 38. In this joining method, as shown in FIG. 40, while the slit 394 in the annular band base 393 is forced open, mounting is effected such that the groove 394 can house a bulge which protrudes outwardly and circumferentially along the fusion point, and that the tips of the ridges 395 can contact, on both sides of the bulge, with the external circumferential surfaces of the high-pressure composite pipes 10, 10. To fasten the collars 392, 392 together, bolts are inserted through the bolt holes 391 . . . 391 and screwed with nuts. Consequently, the annular band 390 can fix the high-pressure composite pipes 10, 10, wherein the round-tipped ridges 395, 395 can bite, in an indenting manner, not only into the outer layer 41 but also into the whole of the inner layer 39, the reinforcing layer 40 and the outer layer 41.

Figure 46:
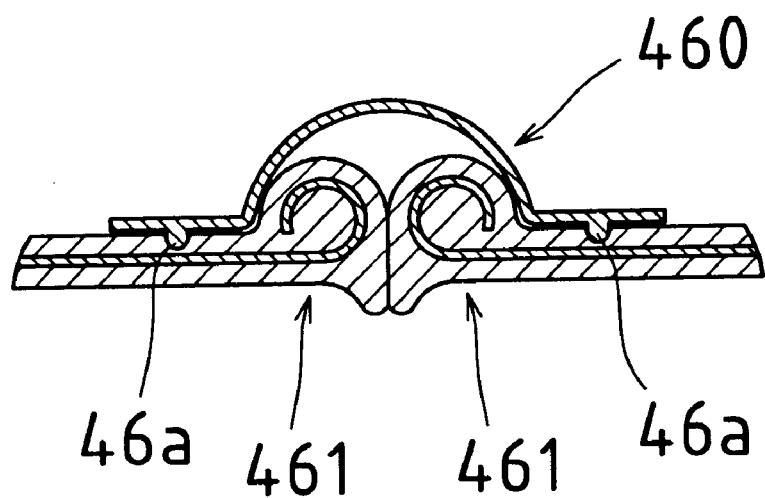
FIG. 46 is an essential sectional view exemplifying a method of reinforcing the fusion point of pipes, wherein a conventional annular band is employed.

In contrast, FIG. 46 shows a joining method using an old-fashioned annular band, in which a conventional annular band 460 has ridges 46a, 46a with pointed tips. In this case, the ridges 46a, 46a cannot bite in any deeper than the outer layers of high-pressure composite pipes 461, 461, and the outer layers are likely to be cut and peeled off at the bitten positions. Thus, the annular band 460 fails to provide satisfactory fixation.

FIGS. 41(a)–(d) describe a series of steps for preparing the tube-shaped element to be used in yet another embodiment of the high-pressure composite pipe joining method according to the present invention.

The tube-shaped element constitutes a reinforcing material to be applied at a joint area of the high-pressure composite pipes. To obtain this reinforcing material, referring first to FIG. 41(a), a monoaxially stretched polyethylene resin sheet 412 is wound on a core 411 in one turn, with the stretching direction A being-perpendicular to the axis of the core 411. The sheet was reformed into the wound shape under heating at a temperature not higher than its heat shrinkage temperature, and removed thereafter. Secondly, referring to FIG. 41(b), its ends are ultrasonically fused together to form a tube-shaped element 433 shown in FIG. 41(c). Further, as shown in FIG. 41(d), the tube-shaped elements 413 are laminated in several layers, with the ultrasonic fusion points 414 414 staggered from each other. Thereby produced is a laminated tube-shaped element 410.

FIGS. 42(a)–(c) are essential sectional views describing a series of steps in another different embodiment of the high-pressure composite pipe joining method according to the present invention, wherein the tube-shaped element illustrated in FIG. 41(d) is employed.

In this joining method, the tube-shaped element 410 shown in FIG. 41(d) is applied to the fusion point of the high-pressure composite pipes formed in the joining method described with reference to FIG. 38. Prior to the joining step, the tube-shaped element 410 is positioned to accommodate one of the high-pressure composite pipes 10, as illustrated in FIG. 42(a). Turning to FIG. 42(b), the tube-shaped element 410 is displaced and approximately centered over the fusion point of the high-pressure composite pipes 10, 10, on which the tube-shaped element 410 is tightly attached by heat shrinkage, as shown in FIG. 42(c).

FIGS. 43(a)–(c) are essential sectional views describing a series of steps in still another embodiment of the high-pressure composite pipe joining method according to the present invention, wherein the tube-shaped element illustrated in FIG. 41(d) is employed.

This joining method includes the step of removing a bulge 431 which projects outwardly and circumferentially along the fusion point in the joint area of the high-pressure composite pipes 10, 10. Afterwards, the tube-shaped element 410 is placed over the periphery of the removal area, which is covered tightly by thermally shrinking the tube-shaped element 410.

As a result, the shrunk tube-shaped element 410 can attach more tightly on the surface of the joint area.

FIGS. 44(a) and (b) are illustrated descriptions of a series of steps for manufacturing the tube-shaped element to be used in further another embodiment of the high-pressure composite pipe joining method according to the present invention.

A tube-shaped element 440 constitutes a reinforcing material to be used at a joint area between the high-pressure composite pipes. To obtain this reinforcing material, referring first to FIG. 44(a), monoaxially stretched polyethylene resin sheets 442, 442 are spirally wound on a core 441 in a plurality of layers, in reverse inclination directions from each other. The sheets were integrated by heating at a temperature below the heat shrinkage temperature. After core removal and cutting steps, tube-shaped elements 440 as shown in FIG. 44(b) were obtained as the constitutents of the reinforcing material.

Figure 42:
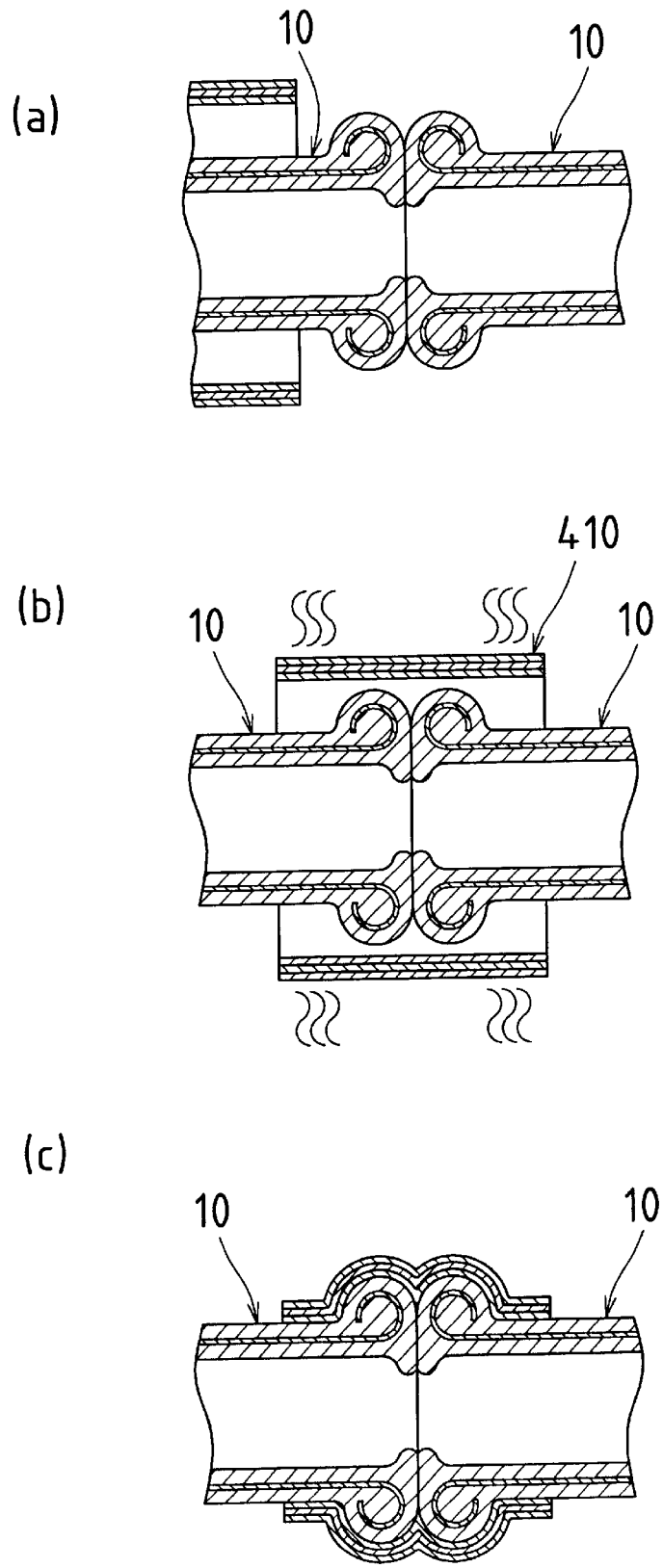
FIGS. 42(a)–(c) are essential sectional views describing a series of steps in another different embodiment of the high-pressure composite pipe joining method according to the present invention, wherein the tube-shaped element illustrated in FIG. 41(d) is employed.
Figure 43:
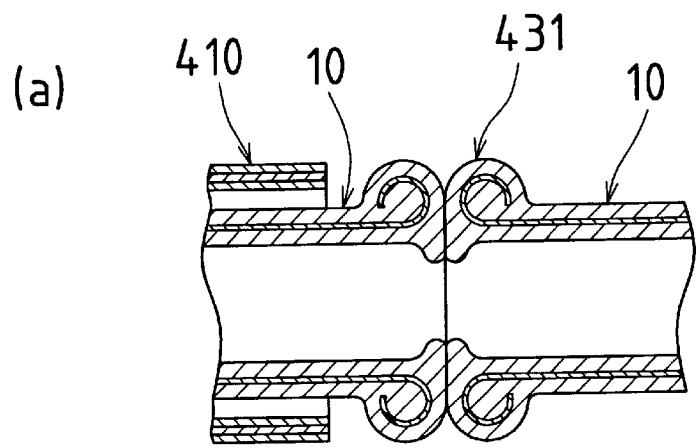
FIGS. 43(a)–(c) are essential sectional views describing a series of steps in still another embodiment of the high-pressure composite pipe joining method according to the present invention, wherein the tube-shaped element illustrated in FIG. 41(d) is employed.
Figure 43:
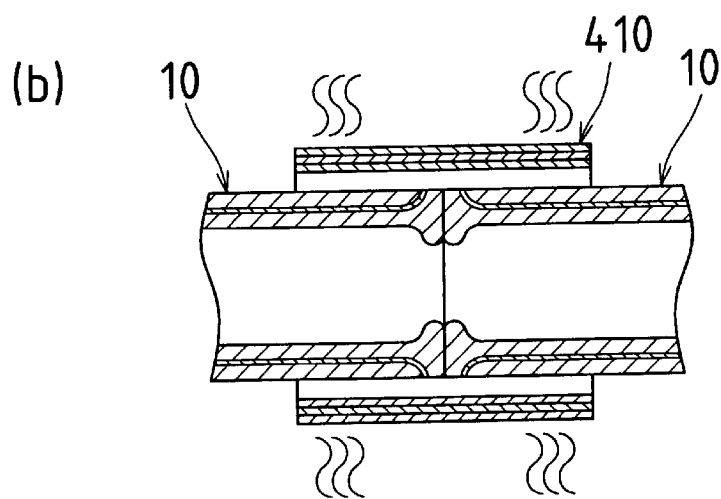
Figure 43:
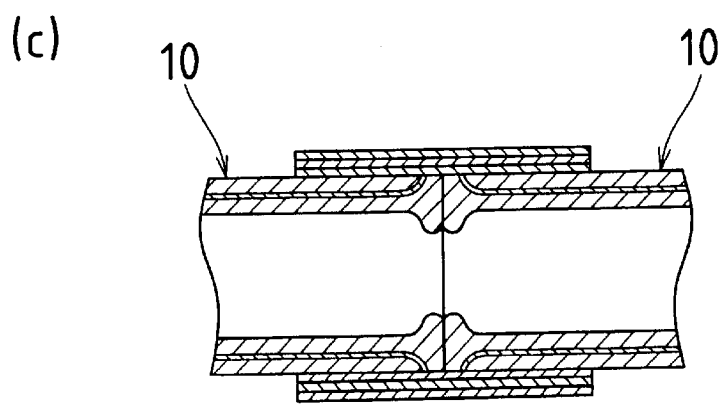

This tube-shaped element 440 can also reinforce the fusion point between the high-pressure composite pipes, as described in relation to FIG. 42 and FIG. 43.

Figure 41:
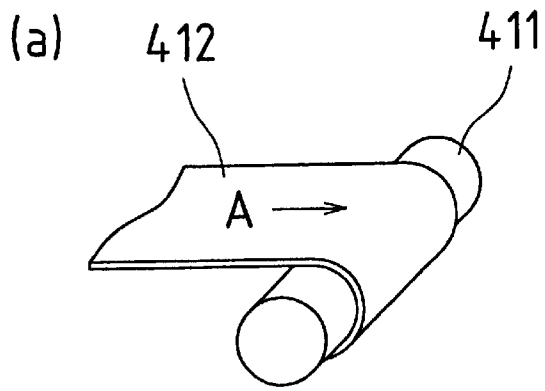
FIGS. 41(a)–(d) describe a series of steps for preparing the tube-shaped element to be used in yet another embodiment of the high-pressure composite pipe joining method according to the present invention.
Figure 41:
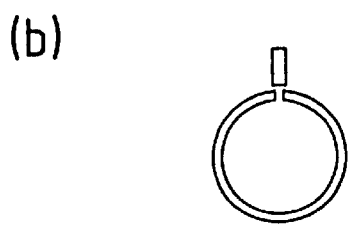
Figure 41:
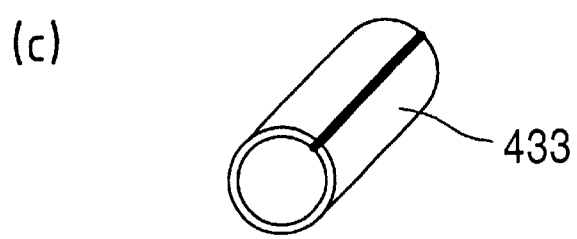
Figure 41:
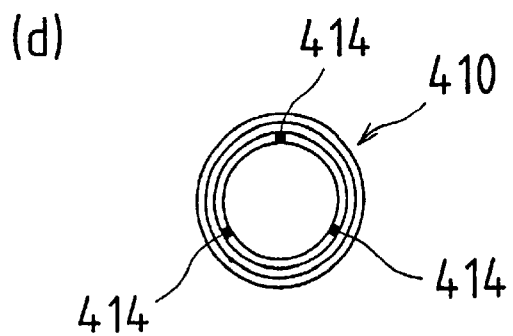
Figure 44:
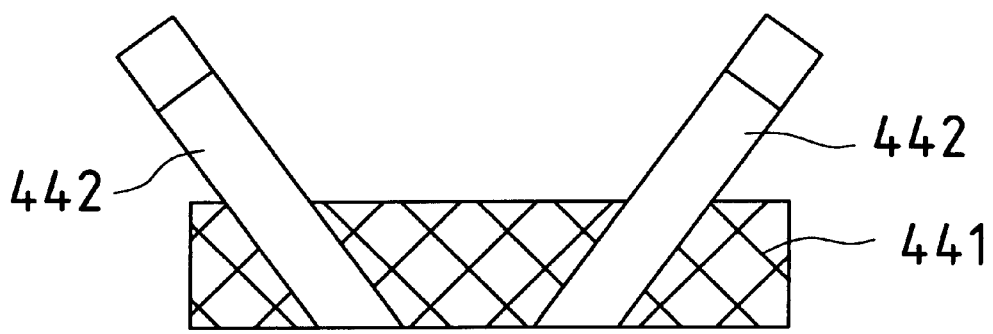
FIGS. 44(a) and (b) are illustrated descriptions of a series of steps for manufacturing the tube-shaped element to be used in further another embodiment of the high-pressure composite pipe joining method according to the present invention.
Figure 44:
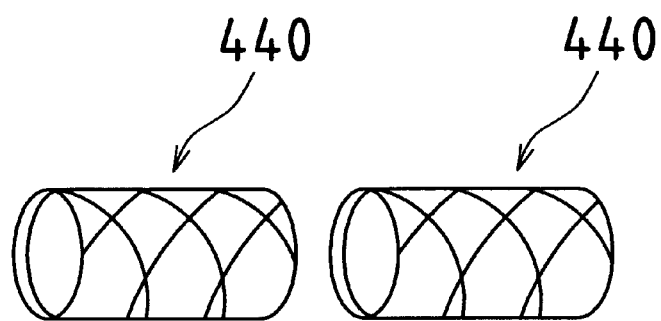

In regard to the tube-shaped elements described with reference to FIG. 41 and FIG. 44, a tube-shaped element for serving as the reinforcing material is made of a monoaxially stretched polyolefin resin sheet. In lieu of a monoaxially stretched polyolefin resin sheet, a biaxially stretched polyolefin resin sheet can be also employed to prepare a similar tube-shaped element which is capable of serving as the reinforcing material.

FIGS. 45(a)–(e) are illustrated descriptions of a series of steps for manufacturing the tube-shaped element to be used in a yet further embodiment of the high-pressure composite pipe joining method according to the present invention.

Figure 45:
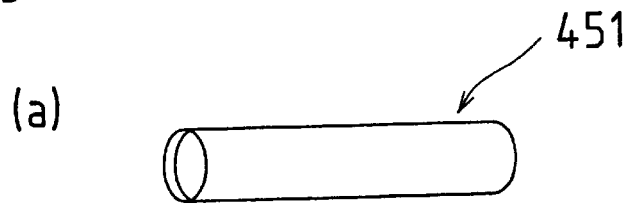
FIGS. 45(a)–(e) are illustrated descriptions of a series of steps for manufacturing the tube-shaped element to be used in a yet further embodiment of the high-pressure composite pipe joining method according to the present invention.
Figure 45:
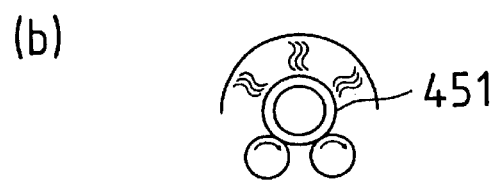
Figure 45:
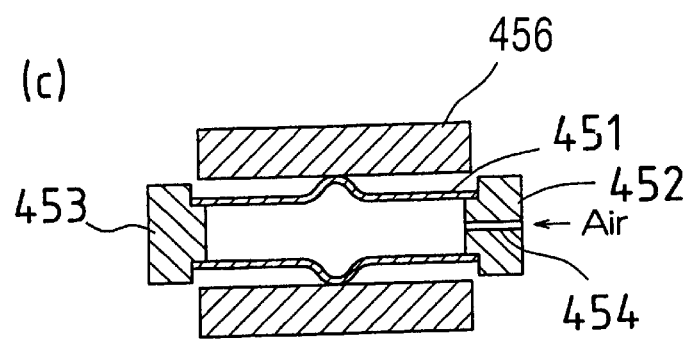
Figure 45:
Figure 45:
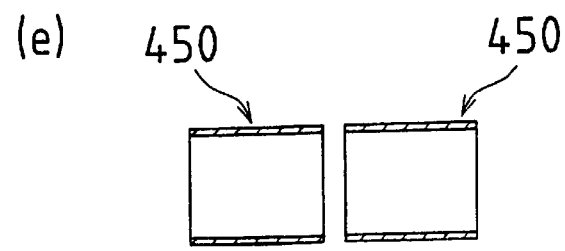

This tube-shaped element constitutes a reinforcing material to be used at a joint area between the high-pressure composite pipes. The reinforcing material is prepared with the use of an extrusion-molded thermoplastic resin pipe 451 shown in FIG. 45(a). First, referring to FIG. 45(b), the thermoplastic resin pipe 451 is rotated under heating-by a heater. Then, as shown in FIG. 45(c), the heated thermoplastic resin pipe 451 is placed in an external mold 456, with both ends thereof being sealed by covers 452, 453. Under this condition, pressure is raised by introducing air from an air hole 454 in the cover 452, so that the thermoplastic resin pipe 451 can enlarge diametrically until its external circumferential surface establishes full contact with the internal circumferential surface of the external mold 456. Afterwards, as illustrated in FIGS. 45(d) and (e), a pipe 455 is removed and cut to give tube-shaped elements 450, each of which is oriented in the circumferential direction.

The tube-shaped element 450 can also reinforce the fusion point between the high-pressure composite pipes, as described in relation to FIG. 42 and FIG. 43.

INDUSTRIAL APPLICABILITY

Because of its remarkable pressure resistance and economical efficiency, the high-pressure composite pipes of the present invention are useful and advantageous in various applications. The present invention also provides a method for firmly joining high-pressure composite pipes in a simple manner. This method is effective for reliable construction of high-pressure composite pipes, by making such joining adjustable to high-pressure composite pipes of any configuration.

What is claimed is:

1. A high-pressure composite pipe which comprises a pipe-shaped inner layer made of a synthetic resin, and a reinforcing layer which is made of a crosslinked stretched polyolefin resin sheet longitudinally stretched at a ratio of 10 or higher and which is wound on an external circumferential surface of the inner layer, with a winding direction of the reinforcing layer being oriented at a predetermined angle in a longitudinal direction of the pipe.

2. A high-pressure composite pipe which comprises a pipe-shaped inner layer made of a synthetic resin, a reinforcing layer which is made of a crosslinked stretched polyolefin resin sheet longitudinally stretched at a ratio of 10 or higher and which is wound on an external circumferential surface of the inner layer, and an outer layer made of a synthetic resin and laminated on the reinforcing layer, with a winding direction of the reinforcing layer being oriented at a predetermined angle in a longitudinal direction of the pipe.

3. A high-pressure composite pipe which comprises a pipe-shaped inner layer made of a synthetic resin, a reinforcing layer which is made of a crosslinked stretched polyolefin resin sheet longitudinally stretched at a ratio of 10 or higher and which is wound on an external circumferential surface of the inner layer, and an adhesion layer having affinity to the inner layer and the reinforcing layer and disposed between the inner layer and the reinforcing layer, with a winding direction of the reinforcing layer being oriented at a predetermined angle in a longitudinal direction of the pipe.

4. A high-pressure composite pipe which comprises a pipe-shaped inner layer made of a synthetic resin, a reinforcing layer which is made of a crosslinked stretched polyolefin resin sheet longitudinally stretched at a ratio of 10 or higher and which is wound on an external circumferential surface of the inner layer, an outer layer made of a synthetic resin and laminated on the reinforcing layer, an inner adhesion layer having affinity to the inner layer and the reinforcing layer and disposed between the inner layer and the reinforcing layer, and an outer adhesion layer having affinity to the outer layer and the reinforcing layer and disposed between the outer layer and the reinforcing layer, with a winding direction of the reinforcing layer being oriented at a predetermined angle in a longitudinal direction of the pipe.

5. A high-pressure composite pipe which comprises a pipe-shaped inner layer made of a synthetic resin, a first reinforcing layer which is made of a crosslinked stretched polyolefin resin sheet longitudinally stretched at a ratio of 10 or higher and which is wound in a circumferential direction, and a second reinforcing layer which is made of a crosslinked stretched polyolefin resin sheet longitudinally stretched at a ratio of 10 or higher and which is laminated along an axis of the pipe, with a winding direction of the first reinforcing layer being oriented at a predetermined angle relative to the axis of the pipe.

6. A high-pressure composite pipe which comprises a pipe-shaped inner layer made of a synthetic resin, a reinforcing layer which is made of a crosslinked stretched polyolefin resin sheet longitudinally stretched at a ratio of 10 or higher and which is wound on an external circumferential surface of the inner layer, an outer layer made of a synthetic resin and laminated on the reinforcing layer, and an insulating layer made of a synthetic resin foam and disposed between the inner layer and the reinforcing layer and/or between the outer layer and the reinforcing layer.

7. A high-pressure composite pipe according to any of claims 1 to 6, wherein the inner layer is stretched in at least one direction of an axial direction and a circumferential direction of the pipe.

8. A high-pressure composite pipe according to any of claims 1 to 6, wherein the inner layer, or each of the inner and outer layers, comprises a polyolefin resin.

9. A high-pressure composite pipe according to any of claims 1 to 6, which comprises a pipe-shaped inner layer made of a synthetic resin, a reinforcing layer made of a crosslinked stretched polyolefin resin sheet and wound on an external circumferential surface of the inner layer, and an outer layer made of a synthetic resin and laminated on the reinforcing layer, wherein at least one of the inner layer and the outer layer comprises a synthetic resin foam.

10. A high-pressure composite pipe according to any of claims 1 to 6, wherein at least one of the inner layer and the outer layer includes a plurality of hollow portions which extend along an axis of the pipe and which are spaced along a circumference of the pipe at a predetermined distance.

11. A high-pressure composite pipe according to any of claims 2, 4 and 6, wherein an external circumferential surface of the outer layer is equipped with a plurality of ribs which project radially relative to an axis of the pipe and which are spaced along the axis at a predetermined distance.

12. A high-pressure composite pipe according to any of claims 1 to 6, wherein the stretched polyolefin resin sheet shows a lower modulus of tensile elasticity in a 0–2% strain range than in a 2–5% strain range.

13. A high-pressure composite pipe according to any of claims 1 to 6, wherein the winding direction of the reinforcing layer is inclined 30° to 90° relative to the mounting axis of the pipe, and the reinforcing layer is laminated on the inner layer and/or the outer layer at symmetric inclination angles relative to the mounting axis of the pipe.

14. A high-pressure composite pipe according to any of claims 1 to 6, wherein a plurality of reinforcing layers are braided.

15. A high-pressure composite pipe according to any of claims 1 to 6, wherein the reinforcing layer is laminated on the inner layer and/or the outer layer, in such winding directions that winding angles relative to the mounting axis of the pipe, in absolute value, are varied in the range of 5° to 30°.

16. A high-pressure composite pipe according to claim 3 or 4, wherein a material for the adhesion layer is composed of an elastomer with a modulus of tensile elasticity in the range of 100 to 2000 kgf/cm$^2$.

17. A high-pressure composite pipe according to claim 3 or 4, wherein a material for the adhesion layer has a crosslinked structure.

18. A high-pressure composite pipe according to any one of claims 1 to 6, wherein the polyolefin resin sheet is crosslinked to show a gel fraction of 20% by weight or higher.

19. A high-pressure composite pipe according to any one of claims 1 to 6, wherein the polyolefin resin sheet is crosslinked by adding a photopolymerization initiator and irradiating an electron ray or an ultraviolet ray.

* * * * *